(12) United States Patent
Tomita et al.

(10) Patent No.: US 8,588,340 B2
(45) Date of Patent: Nov. 19, 2013

(54) RECEIVING DEVICE

(75) Inventors: Yasumoto Tomita, Kawasaki (JP);
Hisakatsu Yamaguchi, Kawasaki (JP);
Satoshi Kawahara, Yokohama (JP)

(73) Assignees: Fujitsu Limited, Kawasaki (JP); Fujitsu Semiconductor Limited, Yokohama (JP)

( * ) Notice: Subject to any disclaimer, the term of this patent is extended or adjusted under 35 U.S.C. 154(b) by 245 days.

(21) Appl. No.: 13/153,195

(22) Filed: Jun. 3, 2011

(65) Prior Publication Data

US 2011/0299585 A1    Dec. 8, 2011

(30) Foreign Application Priority Data

Jun. 3, 2010    (JP) ................................ 2010-127915
Oct. 29, 2010   (JP) ................................ 2010-243358
May 26, 2011    (JP) ................................ 2011-118416

(51) Int. Cl.
*H03K 9/00*      (2006.01)
*H04L 27/00*     (2006.01)

(52) U.S. Cl.
USPC ........................... 375/316; 375/229; 375/350

(58) Field of Classification Search
USPC ................. 375/229–230, 232, 285, 350, 316;
333/18, 28 R; 708/300, 322–323
See application file for complete search history.

(56) References Cited

U.S. PATENT DOCUMENTS 3,593,142 A  *  7/1971  Freeny et al. .................. 375/230
3,742,360 A  *  6/1973  Ragsdale ....................... 375/231
5,475,710 A     12/1995 Ishizu et al.
6,097,767 A  *  8/2000  Lo et al. ........................ 375/327
6,798,832 B1 *  9/2004  Nakata et al. ................. 375/233
2003/0133467 A1  7/2003  Molina Navarro et al.
2007/0297209 A1  12/2007 Hidaka

FOREIGN PATENT DOCUMENTS

JP    6-103696 A     4/1994
JP    2005-517325 A  6/2005
JP    2007-325263 A  12/2007

OTHER PUBLICATIONS

U.S. Non-Final Office Action issued in U.S. Appl. No. 13/071,205, dated May 6, 2013.

* cited by examiner

*Primary Examiner* — Jean B Corrielus
(74) *Attorney, Agent, or Firm* — Arent Fox LLP

(57) ABSTRACT

To optimize an adaptive equalizer with a simple controlling circuit, the receiving device includes a number counting part counting, in a range of detection having a predetermined width, a sampling result corresponding to the input signal being shaped by an equalizer circuit at a determination timing indicated by a clock signal obtained in a CDR circuit, a zone scanning part scanning the range of detection in a scanning zone including a variation range of the input signal; a coefficient altering part altering an equalizer coefficient set to the equalizer circuit; a peak detecting part detecting a peak value of a number of appearances of the sampling result according to alteration of the equalizer coefficient and scanning of the range of detection; and a coefficient specifying part specifying the equalizer coefficient being used when detecting the peak value in the peak detecting part as a first coefficient.

7 Claims, 46 Drawing Sheets

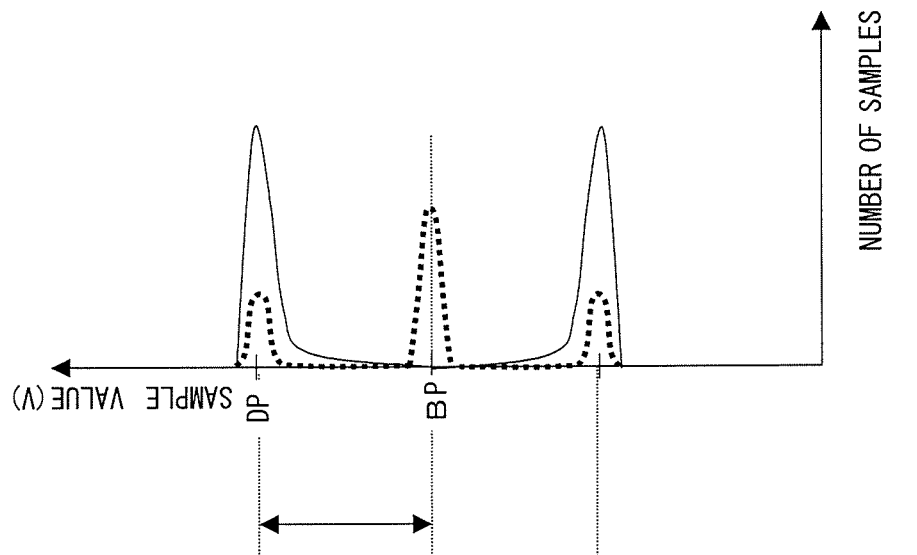
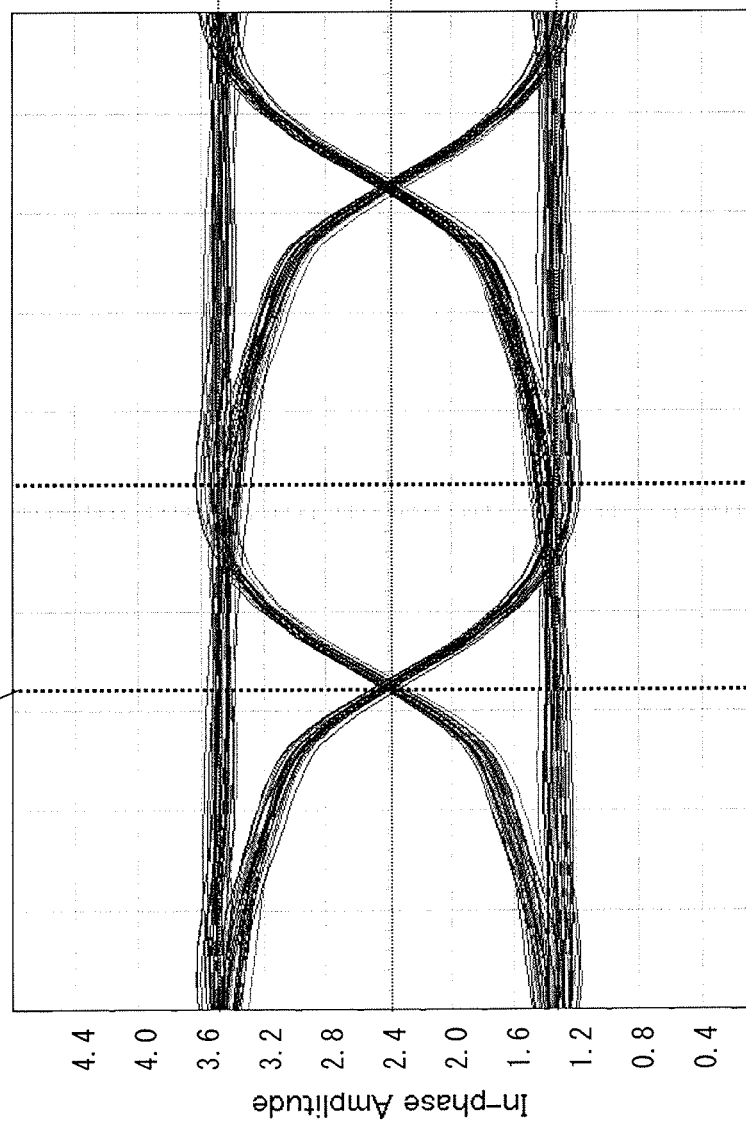
FIG. 41A
FIG. 41B

FIG. 44

| | | T01 | T02 | T03 | T04 | T05 | T11 | T12 | T13 | T14 | T15 | ... | T71 | T72 | T73 | T74 | T75 |
|---|---|---|---|---|---|---|---|---|---|---|---|---|---|---|---|---|---|
| START SIGNAL ST | | | | | | | | | | | | | | | | | |
| EQ CONTROLLING CODE Ce | 000 | | | | | | 001 | | | | | | 111 | | | | |
| REF VOLTAGE CONTROLLING CODE Cr | | 001 | 010 | 011 | 100 | 101 | 001 | 010 | 011 | 100 | 101 | | 001 | 010 | 011 | 100 | 101 |
| NUMBER Nd OF D SAMPLES | | 105 | 45 | 15 | 40 | 95 | 180 | 15 | 0 | 100 | 100 | | 80 | 60 | 60 | 50 | 50 |
| NUMBER Nb OF B SAMPLES | | 60 | 20 | 120 | 30 | 70 | 70 | 5 | 150 | 5 | 70 | | 20 | 180 | 100 | 0 | 0 |
| CONTENT OF COEFFICIENT STORING PART | | 000 | 000 | 000 | 000 | 000 | 001 | 001 | 001 | 001 | 001 | | 001 | 001 | 001 | 001 | 001 |
| D-PEAK POSITION | | 001 | 001 | 001 | 001 | 001 | 001 | 001 | 001 | 001 | 001 | | 001 | 001 | 001 | 001 | 001 |
| TEMPORARY B-PEAK POSITION | | 001 | 001 | 011 | 011 | 011 | 001 | 001 | 011 | 011 | 011 | | 001 | 010 | 010 | 010 | 010 |
| B-PEAK POSITION | | — | — | — | — | 011 | 011 | 011 | 011 | 011 | 011 | | 011 | 011 | 011 | 011 | 011 |

RECEIVING DEVICE

CROSS-REFERENCE TO RELATED APPLICATIONS

This application is based upon and claims the benefit of priority of the prior Japanese Patent Application No. 2011-118416, filed on May 26, 2011, Japanese Patent Application No. 2010-127915, filed on Jun. 3, 2010, and the Japanese Patent Application No. 2010-243358, filed on Oct. 29, 2010, the entire contents of which are incorporated herein by reference.

FIELD

The disclosure of the present application relates to a receiving device having an adaptive equalizer provided in a high speed interface for connection in an integrated circuit chip, between chips, and the like, and to a receiving method.

BACKGROUND

To connect chips in an integrated circuit chip or board and chips mounted on different boards, various high speed interfaces are used widely. Examples of such high speed interfaces include Serial-ATA (Advanced Technology Attachment), PCI (Peripheral Component Interconnect)-Express, USB3.0 and 10 Gbit-Ethernet (registered trademark).

A receiving device provided in a high speed interface as described above may have a function to shape the waveform of a received signal which is deteriorated due to attenuation in a transmission path. The function to shape the waveform is achieved by disposing a digital equalizer in a subsequent stage of an analog/digital converting part, or by passing an analog signal which is input via a transmission path to an adaptive equalizer (see, for example, Japanese National Publication of International Patent Application No. 2005-517325 and Japanese Laid-open Patent Publication No. 2007-325263).

FIG. 45 illustrates an example of a conventional receiving device having an adaptive equalizer. Further, FIG. 46 illustrates a diagram describing altering processing in a conventional adaptive equalizer.

In the receiving device having the conventional adaptive equalizer, a high frequency component of an input signal in which the high frequency component has attenuated in the process of passing through a transmission path is emphasized by an adaptive equalizer (equalizer) 401. By this emphasizing operation, the waveform of the input signal is corrected. This corrected signal is input to a CDR (clock and data recovery) circuit 402 and an ADC (analog digital converter) 403. The CDR circuit 402 alters a phase relation between the input signal received via the equalizer 401 and an internal clock of the receiving device. Thus, a clock signal indicating determination timing for determining a logical value of received data is obtained. Further, based on this clock signal, received data containing a correctly determined logical value is output. On the other hand, the ADC 403 samples and quantizes an output of the equalizer 401 in synchronization with the above-described clock signal, and passes the quantization result to a dispersion calculating circuit 404. This dispersion calculating circuit 404 counts the quantization result received from the ADC 403. From a result of this counting, a distribution of signal levels as illustrated in FIG. 46 is obtained. The dispersion calculating circuit 404 calculates a dispersion value with respect to this distribution. Based on the obtained dispersion value, an equalizer coefficient set to the equalizer 401 is controlled. Note that the equalizer coefficient will be abbreviated to EQ coefficient in the following description. For example, the dispersion calculating circuit 404 monitors a change in the above-described dispersion value while varying the EQ coefficient in response to a start signal from a controlling unit, so as to search for the EQ coefficient with which the dispersion value becomes minimum. Completion of this search is notified to the controlling unit by an end flag. After completion of the search, the optimum EQ coefficient found by the search is set fixedly to the equalizer 401. In this way, the amount of the high frequency signal emphasized by the equalizer 401 is altered optimally (Japanese Laid-open Patent Publication No. 06-103696).

Now, in the above-described conventional receiving device, an output voltage value of the equalizer 401 is converted into digital data of a plurality of bits. For this conversion, the ADC 403 having a plurality of comparators is provided in the receiving device. To the comparators provided in the ADC 403, the output of the equalizer 401 and the clock signal generated in the CDR circuit 402 are distributed. Accordingly, for the purpose of ensuring a necessary current amount, a buffer is provided in the conventional receiving device. Further, in the dispersion calculating circuit 404, a complicated calculation circuit is provided for counting the distribution of signal levels and calculating the dispersion thereof. Thus, in the conventional receiving device, numerous comparators, buffers, and calculation circuits are provided for control of the EQ coefficient set to the adaptive equalizer. Large power is consumed by these comparators and calculation circuits.

SUMMARY

A receiving device according to one aspect includes an equalizer circuit shaping a waveform of an input signal according to a equalizer coefficient being set; a CDR circuit recovering, from the input signal being shaped by the equalizer circuit, received data represented by the input signal and a clock signal which indicates a determination timing of the received data; a number counting part counting, in a range of detection having a predetermined width, a sampling result obtained by sampling the input signal being shaped by the equalizer circuit at the determination timing; a zone scanning part scanning the range of detection in a scanning zone including a variation range of a voltage value of the input signal; a coefficient altering part altering the equalizer coefficient set to the equalizer circuit; a peak detecting part detecting a peak value of a number of appearances of the sampling result based on a change in a counting result obtained by the number counting part according to the alteration of the equalizer coefficient and the scanning of the range of detection; and a coefficient specifying part specifying the equalizer coefficient being set to the equalizer circuit when detecting the peak value in the peak detecting part as a first coefficient.

Further, a receiving method according to another aspect includes sampling an input signal shaped by an equalizer circuit at a predetermined determination timing; performing processing of counting the sampling result in a range of detection having a predetermined width which being scanned in a scanning zone including a variation range of a voltage value of the input signal every time an equalizer coefficient set to the equalizer circuit is altered; and performing an optimum control of the equalizer coefficient based on a change in a counting result obtained in the processing of counting according to the alteration of the equalizer coefficient and the scanning of the range of detection.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 41A and 41B are a diagram describing amplitude estimation of a single-ended signal;

FIG. 44 is a timing chart describing amplitude estimating operation;

DESCRIPTION OF EMBODIMENTS

Hereinafter, embodiments of the present invention will be described in detail based on drawings.

One Embodiment

Figure 1:
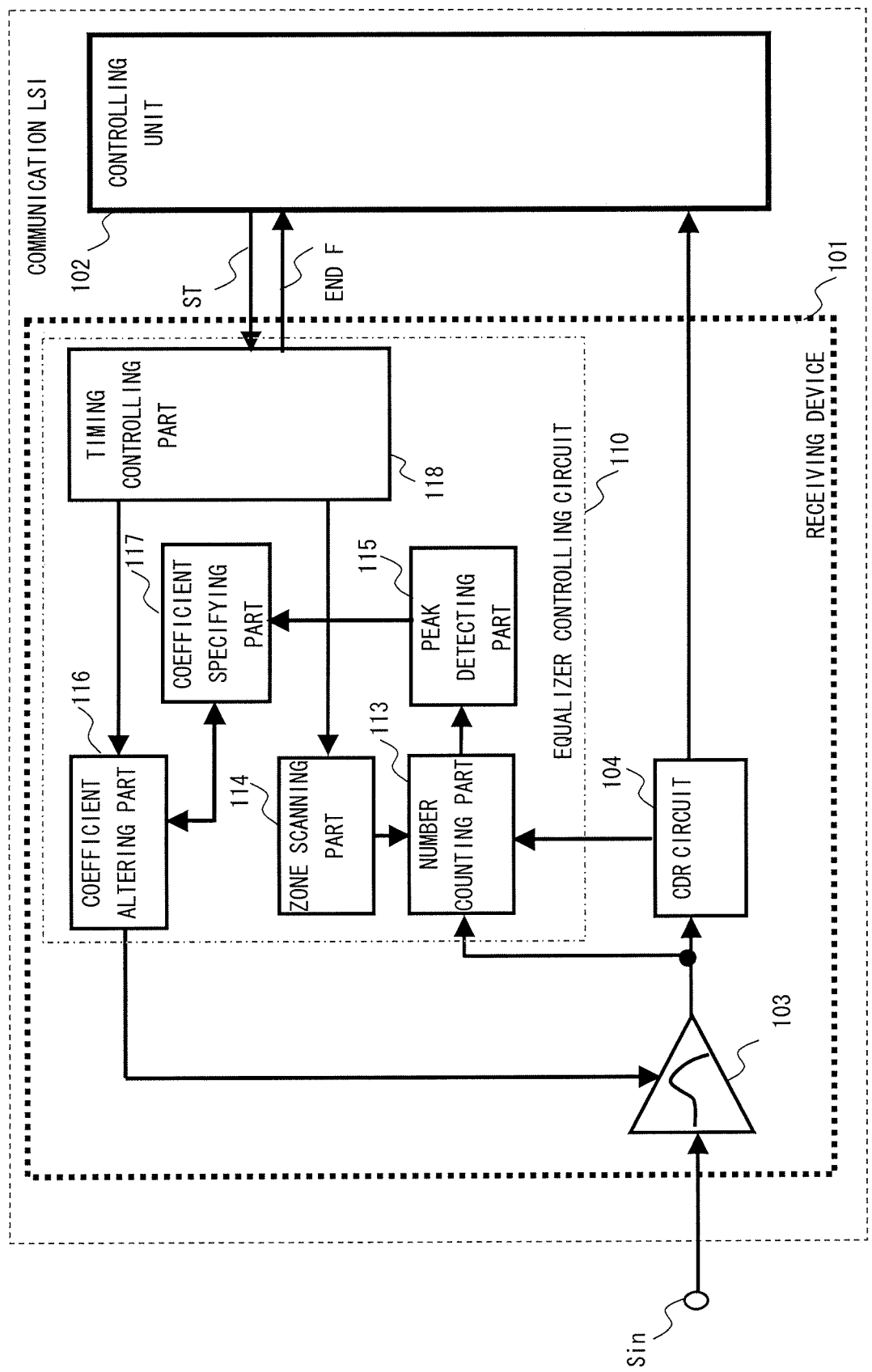
FIG. 1 is a diagram illustrating one embodiment of a receiving device.

FIG. 1 illustrates one embodiment of a receiving device.

A communication LSI illustrated in FIG. 1 has a receiving device 101 and a controlling unit 102. The controlling unit 102 controls the receiving device 101 and a not-illustrated transmitting device. The receiving device 101 has an equalizer 103, a CDR circuit 104, and an equalizer controlling circuit 110. A waveform of an input signal via port Pin to this receiving device 101 is shaped by the equalizer 103. The waveform-shaped input signal is input to the CDR circuit 104. The CDR circuit 104 performs processing of extracting received data from the input signal after being waveform shaped. The received data extracted by the CDR circuit 104 are then passed to the controlling unit 102.

In the equalizer controlling circuit 110, a number counting part 113 receives a clock signal indicating a determination timing used for determining the received data from the CDR circuit 104. This number counting part 113 samples an output signal of the equalizer 103 in synchronization with this clock signal. Further, among sample values obtained in this sampling, the number counting part 113 detects one having a voltage value in a range of detection equivalent to a range of voltage values specified by a zone scanning part 114. Then the number of appearances of a detected sample value is counted by the number counting part 113.

The zone scanning part 114 scans the range of detection indicating a range of sample values to be counted by the number counting part 113, according to an instruction from a timing controlling part 118. A scanning zone for this range of detection is the range corresponds to, for example, the maximum amplitude value of the input signal. Further, a coefficient altering part 116 sequentially outputs all equalizer coefficients (EQ coefficients) which can be set to the equalizer 103, according to an instruction from the timing controlling part 118. The output equalizer coefficients are set to the equalizer 103.

A peak detecting part 115 illustrated in FIG. 1 monitors a change appearing in a counting result output from the number counting part 113 in response to scanning of the range of detection by the above-described zone scanning part 114 and alteration of the EQ coefficient by the coefficient altering part 116. The peak detecting part 115 then detects a maximum counting result through, for example, scanning of the above-described range of detection and alteration of the EQ coefficient. Thus, it is possible to detect the maximum peak in variations of counting results corresponding to scanning of the above-described range of detection and alteration of the EQ coefficient.

When the maximum peak is thus detected by the peak detecting part 115, a coefficient specifying part 117 specifies as an optimum coefficient the EQ coefficient that is set to the equalizer 103 by the coefficient altering part 116 at this time point.

Here, the relation between the degree of achievement of waveform shaping by the equalizer and the counting result obtained by the number counting part 113 in each range of detection within the scanning zone will be described.

Figure 2:
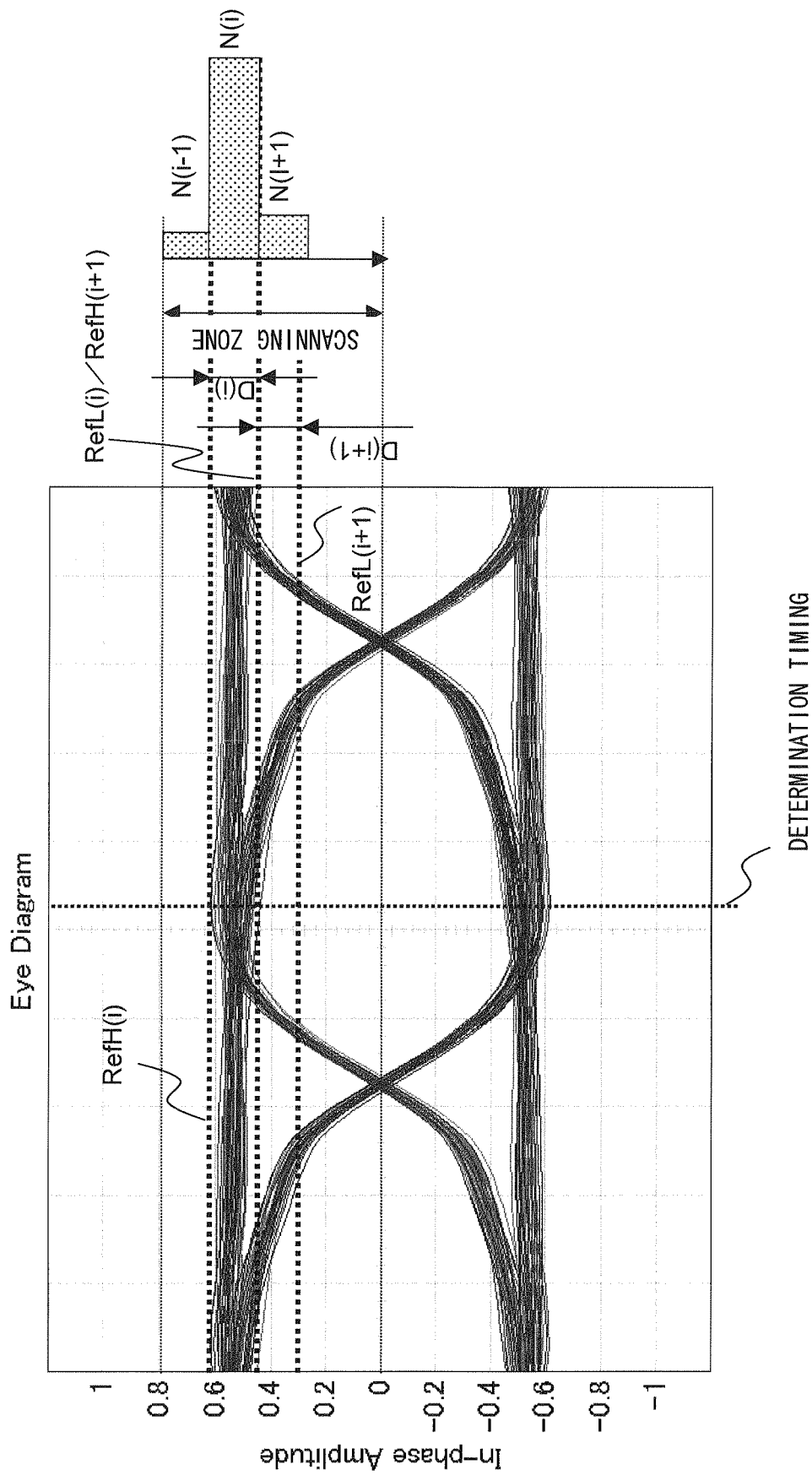
FIG. 2 is a diagram (part 1) describing counting in every range of detection.
Figure 3:
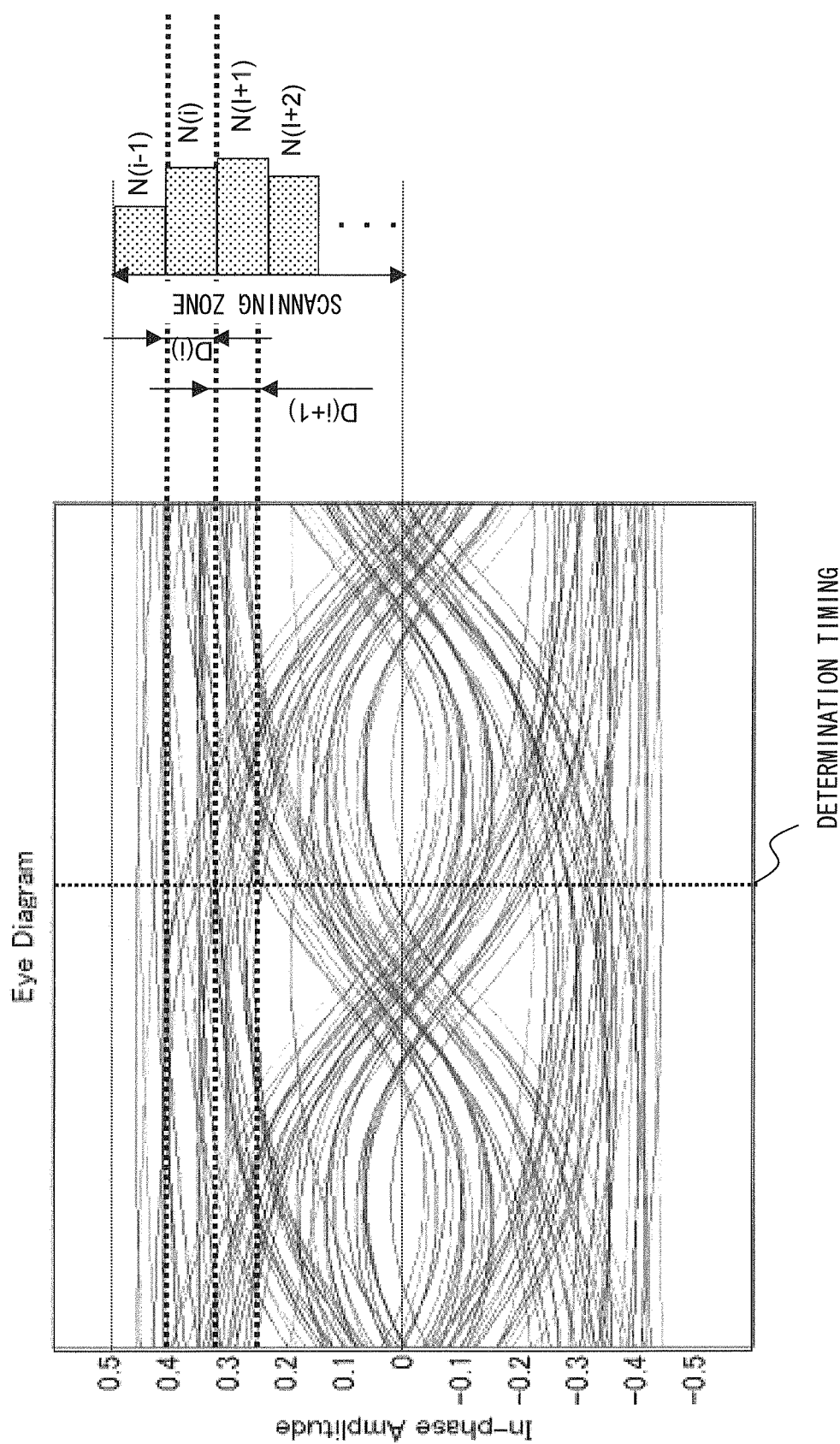
FIG. 3 is a diagram (part 2) describing counting in every range of detection.

FIG. 2 illustrates a diagram (part 1) describing counting in every range of detection. Further, FIG. 3 illustrates a diagram (part 2) describing counting in every range of detection. In FIG. 2 and FIG. 3, an upper-limit reference voltage and a lower-limit reference voltage of the i-th range of detection D(i) are denoted by adding symbols RefH(i), RefL(i), respectively. Similarly, an upper-limit reference voltage and a lower-limit reference voltage of the (i+1)-th range of detection D(i+1) are denoted by adding symbols RefH(i+1), RefL(i+1), respectively. In addition, in adjacent ranges of detection, the lower-limit reference voltage of the immediately preceding range of detection and the upper-limit reference voltage of the next range of detection coincide with each other, and thus are denoted as symbols RefL(i)/RefH(i+1) in FIG. 2 and FIG. 3.

In the eye diagram illustrated in FIG. 2, sample values obtained by sampling at the determination timing mostly converge to the range of detection D(i). In this example, the degree of achievement of waveform shaping on the input signal is high. Specifically, when the degree of achievement of waveform shaping is high, the appearance number distribution of sample values detected in respective ranges of detection has a sharp, high peak as in the histogram illustrated on the right side of the eye diagram in FIG. 2.

On the other hand, in the eye diagram illustrated in FIG. 3, sample values obtained by sampling at the determination timing are distributed to disperse across the entire scanning zone. When such an eye diagram is seen, it cannot be said that the degree of achievement of waveform shaping on the input signal is high. In this case, the appearance number distribution of sample values detected in respective ranges of detection changes gently as in the histogram illustrated on the right side of the eye diagram in FIG. 3. Moreover, the peak value thereof is clearly smaller than that in the histogram illustrated in FIG. 2.

Thus, the height of the peak of the number distribution obtained for sampling results at the determination timing has a high correlation with the degree of achievement of waveform shaping on the input signal. Therefore, instead of the dispersion of a number distribution in conventional techniques, the peak value of a number distribution may be used as an index when searching for an optimum EQ coefficient.

By using the peak value of number distribution obtained for sampling results at the determination timing as an index, the structure of the equalizer controlling circuit 110 can be simplified more than when the dispersion of a number distribution is obtained.

Hereinafter, a method of optimizing the EQ coefficient set to the equalizer 103 based on the peak value of the above-described number distribution will be described.

Another Embodiment

Figure 4:
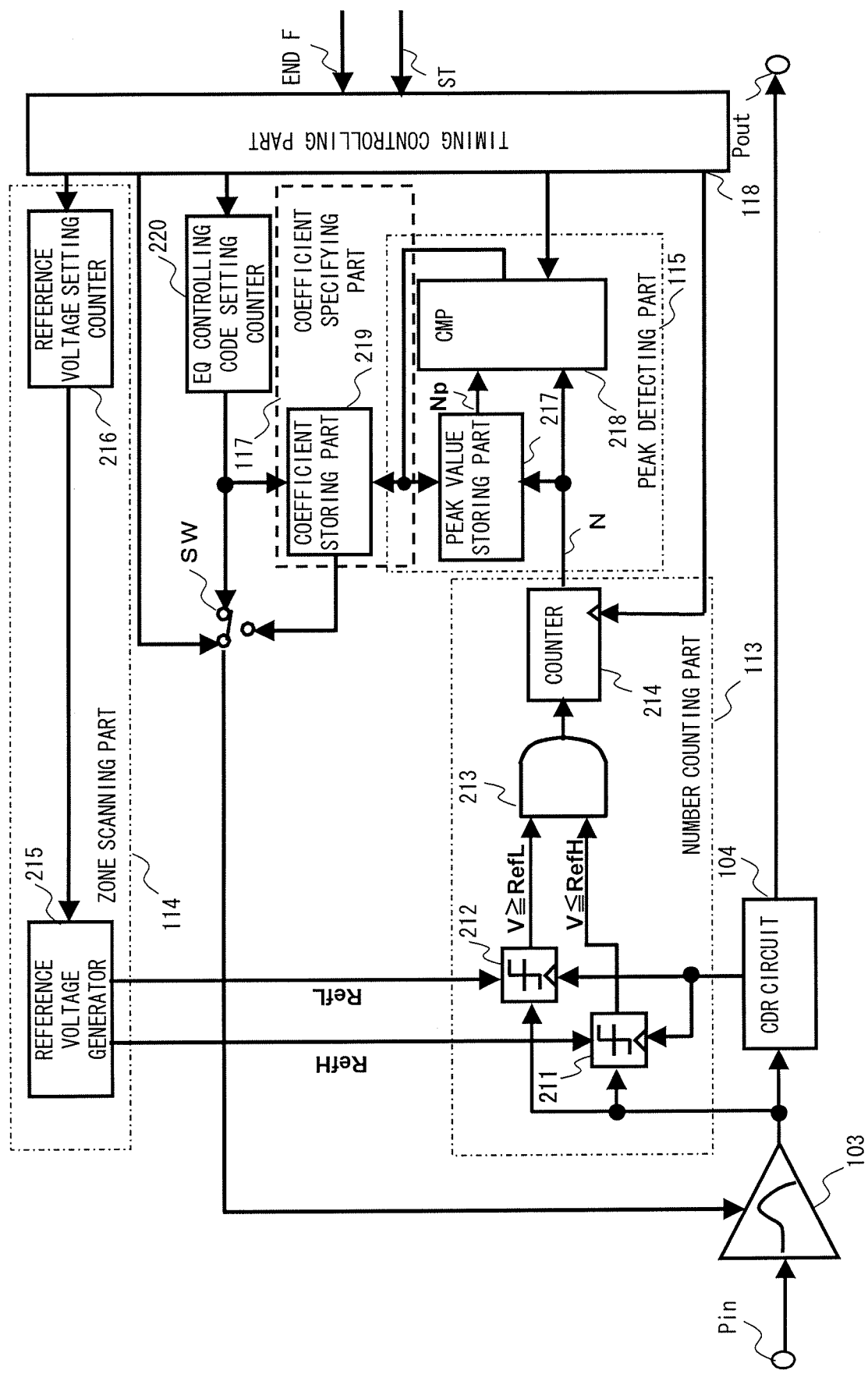
FIG. 4 is a diagram illustrating another embodiment of the receiving device.

FIG. 4 illustrates another embodiment of the receiving device. Note that among components illustrated in FIG. 4, components equivalent to those illustrated in FIG. 1 are denoted by the same symbols, and descriptions thereof are omitted. In FIG. 4, the CDR circuit 104 outputs the received data which being recovered via port denoted Pout.

The number counting part 113 illustrated in FIG. 4 includes two comparators 211, 212, an AND gate 213, and a counter 214. The above-described two comparators 211, 212 sample outputs of the equalizer 103 in synchronization with the clock signal received from the CDR circuit 104. Then the comparator 211 compares an upper-limit reference voltage RefH specified by the zone scanning part 114 with a sample value V obtained by sampling. When the sample value V is equal to or less than the upper-limit reference voltage RefH, logic "H" is output by the comparator 211. On the other hand, the comparator 212 compares a lower-limit reference voltage RefL specified by the zone scanning part 114 with the sample value V. When the sample value V is equal to or more than the lower-limit reference voltage RefL, logic "H" is output by the comparator 212. That is, the comparator 211 is an example of an upper-limit comparator comparing the sampling result with the upper-limit reference voltage. Further, the comparator 212 is an example of a lower-limit comparator comparing the sampling result with the lower-limit reference voltage.

Outputs of the two comparators 211, 212 are input to the counter 214 via the AND gate 213. Thus, the number of times of obtaining a sampling result having a voltage value within the range of detection indicated by the upper-limit reference voltage RefH and the lower-limit reference voltage RefL is counted. That is, this counter 214 is an example of a range counter selectively counting a sampling result within the range of detection indicated by the upper-limit reference voltage and the lower-limit reference voltage. In addition, the clock signal for counting the number is input from the timing control part 118 to this counter 214. Further, depending on the output logic of the comparators 211, 212, the input to the AND gate 213 may be negative logic.

Further, the zone scanning part 114 illustrated in FIG. 4 includes a reference voltage generator 215 and a reference voltage setting counter 216. The reference voltage generator 215 receives, for example, a count value of the reference voltage setting counter 216 as a reference voltage controlling code (REF controlling code). The reference voltage generator 215 then outputs the upper-limit reference voltage RefH and the lower-limit reference voltage RefL corresponding to the received REF controlling code.

Figures 5A, 5B:
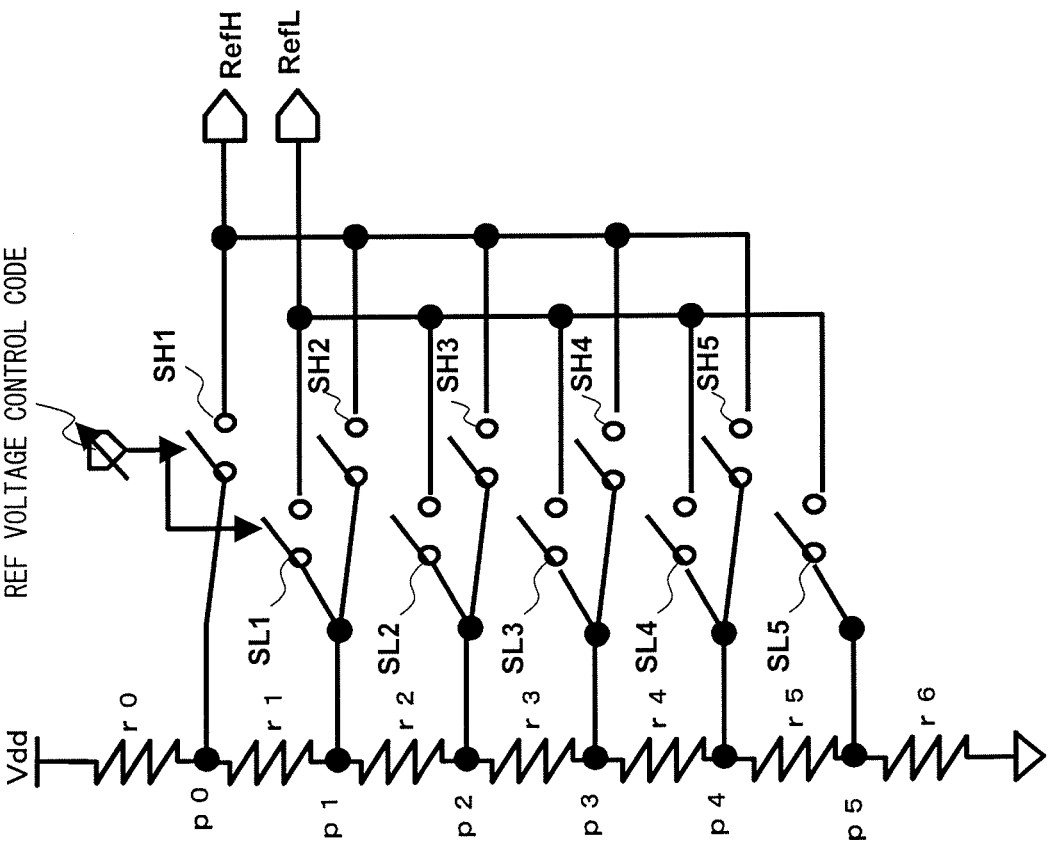
FIGS. 5A and 5B are a diagram and a table illustrating one embodiment of a reference voltage generator.

FIGS. 5A and 5B illustrate one embodiment of the reference voltage generator. Specifically, FIG. 5A illustrates an example of the reference voltage generator. Further, FIG. 5B illustrates a table describing a control example of the REF controlling code and the reference voltage generator.

In the reference voltage generator 215 illustrated in FIG. 5A, by resistor elements r0 to r6 coupled in series, terminals to which predetermined voltage Vdd is supplied and terminals to which ground potential is given are coupled. Among coupling points p0 to p5 of the resistor elements r0 to r6, coupling points p0 to p4 are coupled to an output terminal RefH via switches SH(i) (i=1 to 5). Further, coupling points p1 to p5 are coupled to an output terminal RefL via switches SL(i) (i=1 to 5). In response to input of the REF controlling code, a corresponding i-th pair of switches SL(i), SH(i) is selectively turned on. Accordingly, the potential corresponding to a coupling point $p_i$ and the potential corresponding to a coupling point $p_{i-1}$ are output as the lower-limit reference voltage RefL and the upper-limit reference voltage RefH, respectively.

In this manner, the upper-limit reference voltage RefH(i) and the lower-limit reference voltage RefL(i) which correspond to the range of detection D(i) indicated by the REF controlling code may be generated. The generated upper-limit reference voltage RefH(i) and the lower-limit reference voltage RefL(i) are input to the above-described two comparators 211, 212. In addition, in the examples illustrated in FIGS. 5A and 5B, there are five divisions between the potential appearing at the coupling point p0 and the potential appearing at the coupling point p5. An amount of dropped voltage due to the respective resistor elements r0 to r5 is correlated with each range of detection. The number of ranges of detection dividing the scanning zone is not limited to the example illustrated in FIGS. 5A and 5B, and the scanning zone may be divided into more ranges of detection.

Further, the peak detecting part 115 illustrated in FIG. 4 includes a peak value storing part 217 and a comparator (CMP) 218. To the peak value storing part 217 the count value from the above-described counter 214 is input. The comparator 218 instructs the peak value storing part 217 to perform update when the count value output newly from the counter 214 is larger than the peak value up to this point which is stored in the peak value storing part 217. Thus, it is possible to allow the peak value storing part 217 to store the maximum peak value. The structure to set the count value from the counter 214 in the peak value storing part 217 based on the output of the comparator 218 in this manner is an example of a peak updating part performing update of the peak value storing part 217.

On the other hand, to a coefficient storing part 219 provided in the coefficient specifying part 117 illustrated in FIG. 4, an equalizer controlling code (EQ controlling code) output from an equalizer (EQ) controlling code setting counter 220 is input. Incidentally, the EQ controlling code setting counter 220 is an example of the coefficient altering part 116. This coefficient storing part 219 stores the input EQ controlling code at a timing the above-described comparator 218 updates the peak value storing part 217. By this operation, the EQ controlling code corresponding to the detected maximum peak value is stored in the coefficient storing part 219. That is, the circuit structure which updates the coefficient storing part 219 based on the output of the comparator 218 is an example of a coefficient updating part which updates the coefficient storing part 219 in response to update of the above-described peak value storing part 217.

Here, the EQ controlling code corresponds to the equalizer coefficient set to the equalizer 103. For example, setting information of a variable capacitor and a variable resistor included in the equalizer 103 may be used as the EQ controlling code.

Figures 6A, 6B:
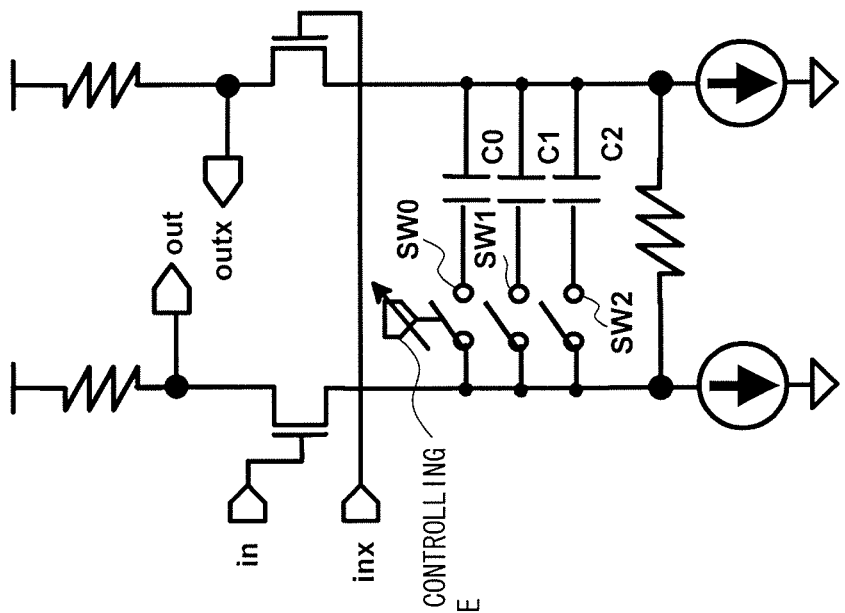
FIGS. 6A and 6B are a diagram and a table illustrating one embodiment of an equalizer.

FIGS. 6A and 6B illustrate one embodiment of the equalizer. In addition, in a structural example illustrated in FIG. 6A, the capacitance of a variable capacitor including three capacitors C0, C1, C2 is controlled by operating corresponding switches according to the EQ controlling code. Further, FIG. 6B illustrates an example of a correspondence between three-bit EQ controlling codes and respective capacitors.

In the example illustrated in FIGS. 6A and 6B, the EQ controlling code corresponding to the count values 0 to 7 of the EQ controlling code setting counter 220 is input. According to this EQ controlling code, the corresponding capacitors are selectively made to contribute to the waveform shaping operation by the equalizer 103, thereby setting the EQ coefficient. In addition, the variable capacitor provided in the equalizer 103 may also include a circuit in which three or more capacitors and corresponding switches are coupled in parallel between two transistors. Further, the equalizer 103 may include a variable resistor. In either case, the EQ coefficient corresponding to the EQ controlling code can be set by operating corresponding switches according to the EQ controlling code to make specified capacitor and resistor element to contribute to the function of the equalizer 103. That is, in the example of the equalizer illustrated in FIGS. 6A and 6B, the circuit switching ON/OFF of the three switches SW0, SW1, and Sw2 corresponding to the respective capacitors C0, C1, C2 is an example of a configuration changing part.

Next, a method of searching for the EQ controlling code corresponding to the optimum EQ coefficient will be described. In a search described below, scanning of the range of detection is performed by the reference voltage setting counter 216 while EQ controlling codes are generated in a round robin manner by the EQ controlling code setting counter 220.

Figure 7:
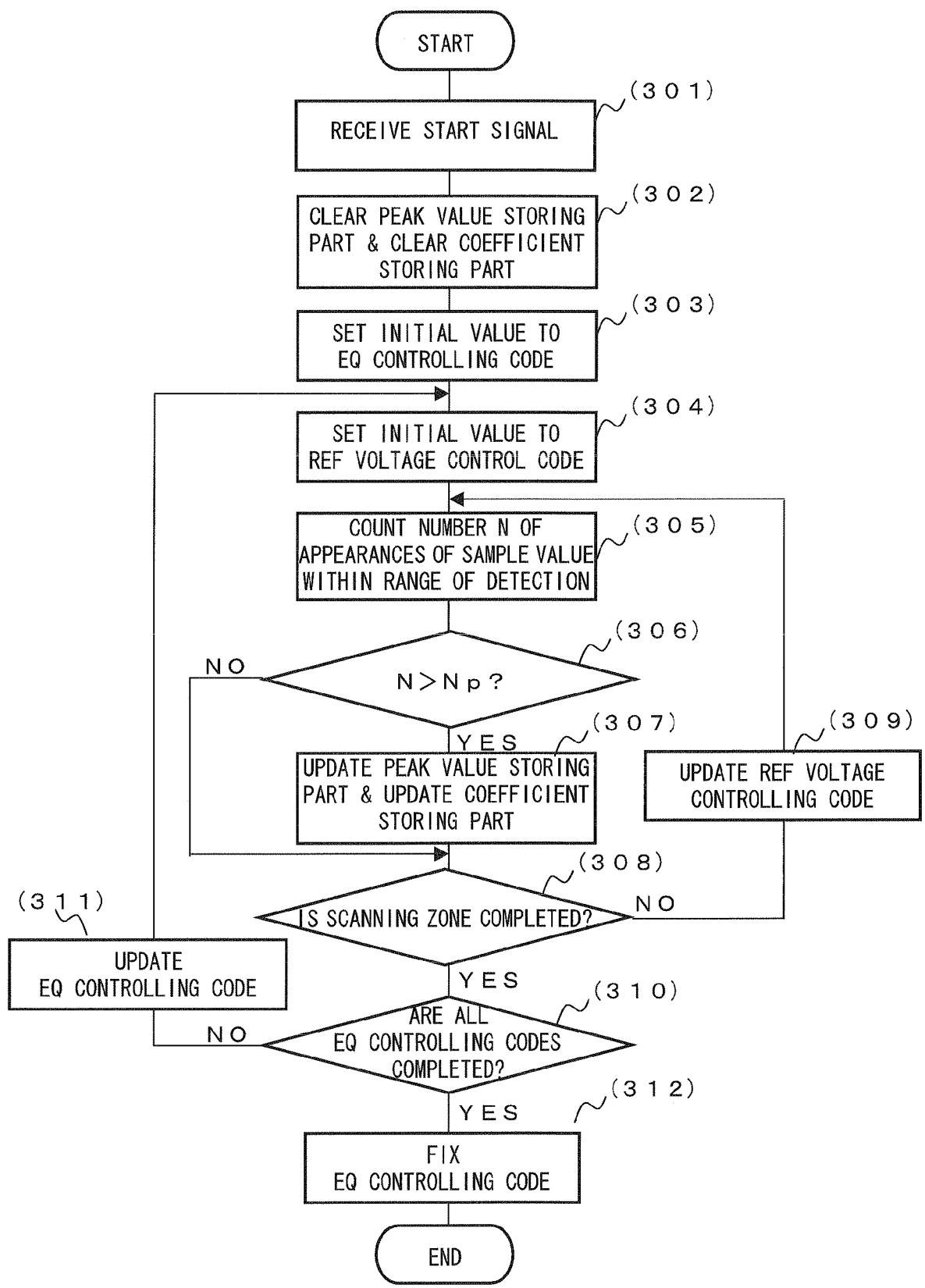
FIG. 7 is a flowchart representing optimum coefficient searching operation.
Figure 8:
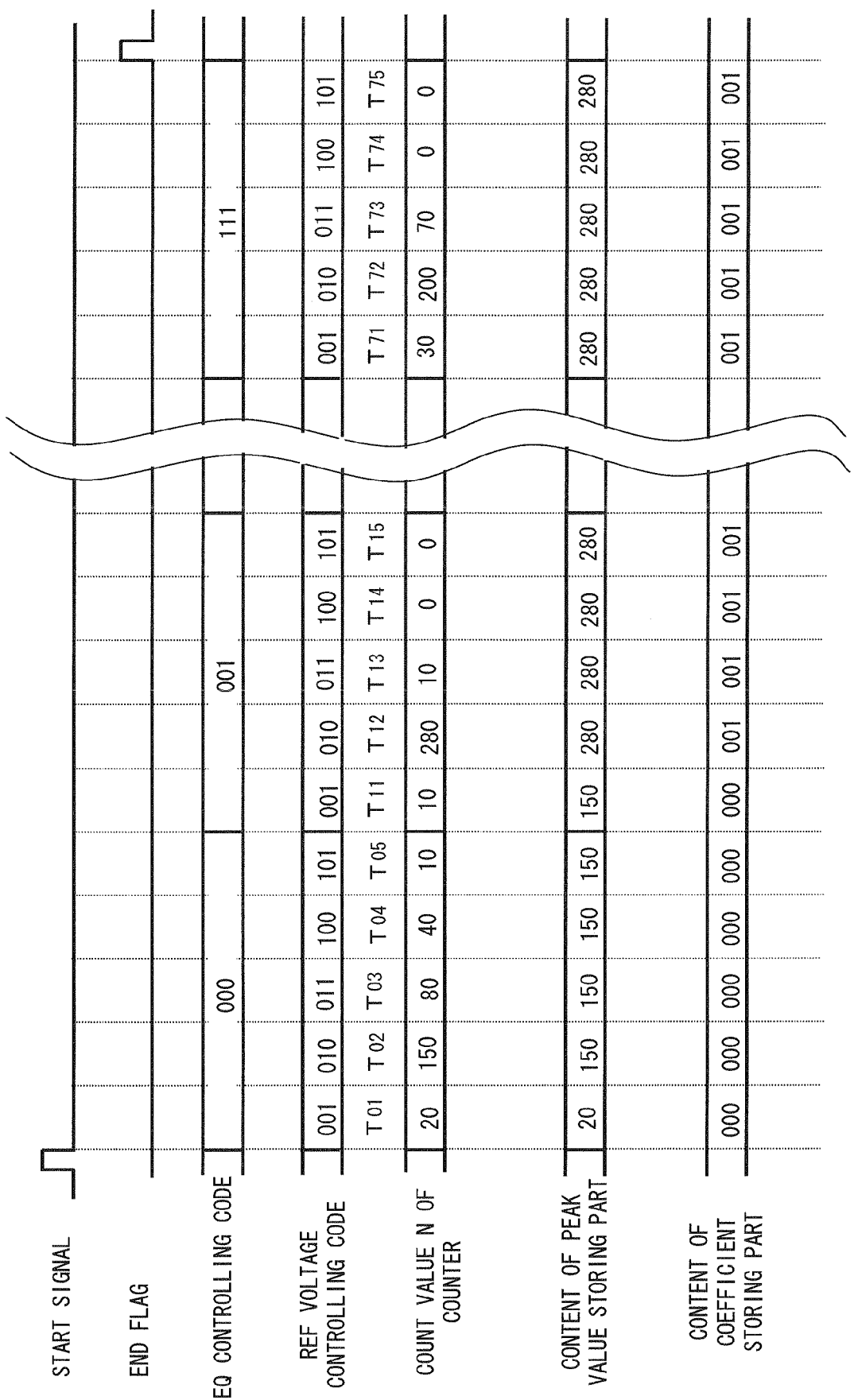
FIG. 8 is a timing chart describing the optimum coefficient searching operation.

FIG. 7 illustrates a flowchart representing processing of searching for the optimum coefficient. Further, FIG. 8 illustrates a timing chart describing processing of searching for the optimum coefficient. In the following description, there is illustrated an example of performing the processing of searching for the optimum coefficient while a test signal is input, which is used for training when altering the equalizer. However, it is needless to mention that similar processing may be performed by a signal other than the test signal used for training, for example, a data signal during a normal operation.

Prior to input of the test signal, a start signal (denoted ST in FIG. 1) is transmitted from the controlling unit 102 illustrated in FIG. 1. In response to this start signal, the timing controlling part 118 included in the equalizer controlling circuit 110 of the receiving device 101 clears the peak value storing part 217 and the coefficient storing part 219 (steps 301, 302). Thus, the peak value storing part 217 stores an initial value "0" of peak value Np. Next, the timing controlling part 118 sets initial values to the EQ controlling code and the REF controlling code, respectively (steps 303, 304). For example, the timing controlling part 118 may set an initial value [000] to the EQ controlling code by resetting the EQ controlling code setting counter 220. Then, according to this EQ controlling code, setting of the variable capacitor of the equalizer 103 is performed (see FIGS. 6A and 6B). Further, the timing controlling part 118 sets an initial value [001] to the count value of the reference voltage setting counter 216. By this initial value, the value corresponding to the range of the highest voltage value among the plural ranges of detection included in the scanning zone is set to the REF controlling code. In response to input of this REF controlling code, the reference voltage generator 215 generates the lower-limit reference voltage RefL and the upper-limit reference voltage RefH corresponding to the above-described range of detection. The generated lower-limit reference voltage RefL and upper-limit reference voltage RefH are input to the comparators 211, 212, respectively. In addition, FIG. 8 illustrates an overview that the initial value [000] and the initial value [001] are set to the EQ controlling code and the REF controlling code, respectively, in response to input of the start signal.

Thereafter, the timing controlling part 118 starts input of the clock signal for counting the number to the counter 214 illustrated in FIG. 4. In response to this, the counter 214 starts counting of the number N of appearances of a sample value within the range of detection illustrated in the above-described REF controlling code (step 305). Then, when a predetermined counting period T has passed, the timing controlling part 118 notifies this to the comparator 218 of the peak detecting part 115. In response to this notification, the comparator 218 compares the count value N of the above-described counter 214 with the peak value Np stored in the peak value storing part 217 (step 306).

When the count value N is larger than the peak value Np (affirmative judgment in step 306), the peak value storing part 217 and the coefficient storing part 219 are updated corresponding to the comparison result in the comparator 218 (step 307). For example, in the counting period denoted by adding symbol $T_{01}$ in FIG. 8, the peak value Np is cleared in the beginning of this period, and thus affirmative judgment is made in step 306. Then, the peak value Np of the peak value storing part 217 is updated with a numerical value "20" corresponding to the count value N of the counter 214 in the end of this counting period $T_{01}$. Further, at this time, the coefficient storing part 219 is updated using the EQ controlling code [000] used for setting the equalizer 103 at this time point. Note that in the description of FIG. 8 and thereafter, each counting period is denoted by adding a subscript combining symbol T with number 0 to 7 corresponding to the EQ controlling code and number 1 to 5 corresponding to the REF controlling code. That is, the subscript added to symbol T denoting a counting period denotes a combination of the EQ controlling code and the REF controlling code which are applied in this counting period.

On the other hand, when the count value N is equal to or less than the peak value Np (negative judgment in step 306), above-described step 307 is skipped. In this case, the contents of the peak value storing part 217 and the coefficient storing part 219 are maintained as they are.

Thereafter, the timing controlling part 118 compares, for example, the count value of the reference voltage setting counter 216 with the number of all ranges of detection provided in the scanning zone. When the count value is less than the number of ranges of detection, it is judged that counting in the scanning zone is not completed (negative judgment in step 308). In this case, the timing controlling part 118 increments, for example, the reference voltage setting counter 216 to update the REF controlling code (step 309). Thereafter, processing returns to step 305, starting processing of a new range of detection.

By repeating step 305 to step 309, processing for the respective ranges of detection is performed. Thereafter, when processing for all the ranges of detection in the scanning zone is completed (affirmative judgment in step 308), processing proceeds to step 310. In step 310, the timing controlling part 118 judges that there is unprocessed EQ controlling code when, for example, the count value of the EQ controlling code setting counter 220 is smaller than the maximum number represented by the EQ controlling code (negative judgment of step 310).

In this case, the timing controlling part 118 increments, for example, the EQ controlling code setting counter 220 to update the EQ controlling code (step 311). Next, processing returns to step 304, starting processing for a new EQ controlling code. In this manner, by repeating step 304 to step 310, processing of searching for the above-described optimum coefficient is performed while scanning the ranges of detection across the scanning zone regarding each EQ controlling code.

In the example illustrated in FIG. 8, after the peak value storing part 217 is updated in the counting period $T_{02}$, the peak value Np is maintained until the counting period $T_{11}$ corresponding to the next EQ controlling code [001]. Then, when the peak value storing part 217 is updated based on the count value N of the counter in the counting period $T_{12}$, the coefficient storing part 219 is updated with the above-described EQ controlling code [001]. As illustrated in the example illustrated in FIG. 8, when a peak higher than the peak value Np stored in the peak value storing part 217 is not detected thereafter, the EQ controlling code stored in the coefficient storing part 219 is maintained as it is, and this becomes a search result for the optimum coefficient. In addition, in the example illustrated in FIG. 8, a preliminary period until output of the equalizer 103 becomes stable after the EQ controlling code is updated is omitted. It is desired that such a preliminary period be provided every time the EQ controlling code is updated. Further, the preliminary period may be provided by performing, for example, control to halt the clock signal which is input from the timing controlling part 118 to the counter 214 of the number counting part 113.

When the search processing is completed thus (affirmative judgment in step 310), the timing controlling part 118 operates a switch SW. By operating this switch SW, the EQ controlling code in the coefficient storing part 219 is input to the equalizer 103 instead of the output of the EQ controlling code setting counter 220. Accordingly, the EQ controlling code set to the equalizer 103 is fixed corresponding to the optimum coefficient (step 312). Further, at this time, the timing controlling part 118 notifies completion of alteration of the equalizer 103 to the controlling unit 102 by an end flag (denoted END-F in FIG. 1), thereby finishing the processing.

In the receiving device illustrated in FIG. 4, the equalizer controlling circuit is a simple circuit using counters, comparators, and so on. By this equalizer controlling circuit, the EQ controlling code for setting the optimum EQ coefficient to the equalizer 103 can be specified. In addition, the timing controlling part 118 may be achieved using a timer circuit and the like.

Further, in the example illustrated in FIG. 4, the output of the equalizer 103 and the clock signal generated in the CDR circuit 104 may be distributed to the two comparators 211, 212. Therefore, in the receiving device as illustrated in FIG. 4, power consumption can be suppressed as compared to the case where the output of the equalizer 103 and the clock signal are distributed to an ADC including numerous comparators. Further, in the structure of the number counting part 113 using the comparators 211, 212, the area occupied by the receiving device in the communication LSI can be made small, compared to a conventional structure using the ADC.

Therefore, by employing the architecture illustrated in FIG. 4, size reduction can be achieved along with reduction in power consumption of the receiving device. This capability of achieving power consumption reduction and size reduction is a highly advantageous feature in the field of high speed interfaces and the like.

Note that the basic structure of the receiving device illustrated in FIG. 1 can also be achieved by using a number counting part different from that of the example illustrated in FIG. 4. Hereinafter, a structural example different from the above-described number counting part 113 will be described.

Still Another Embodiment

Figure 9:
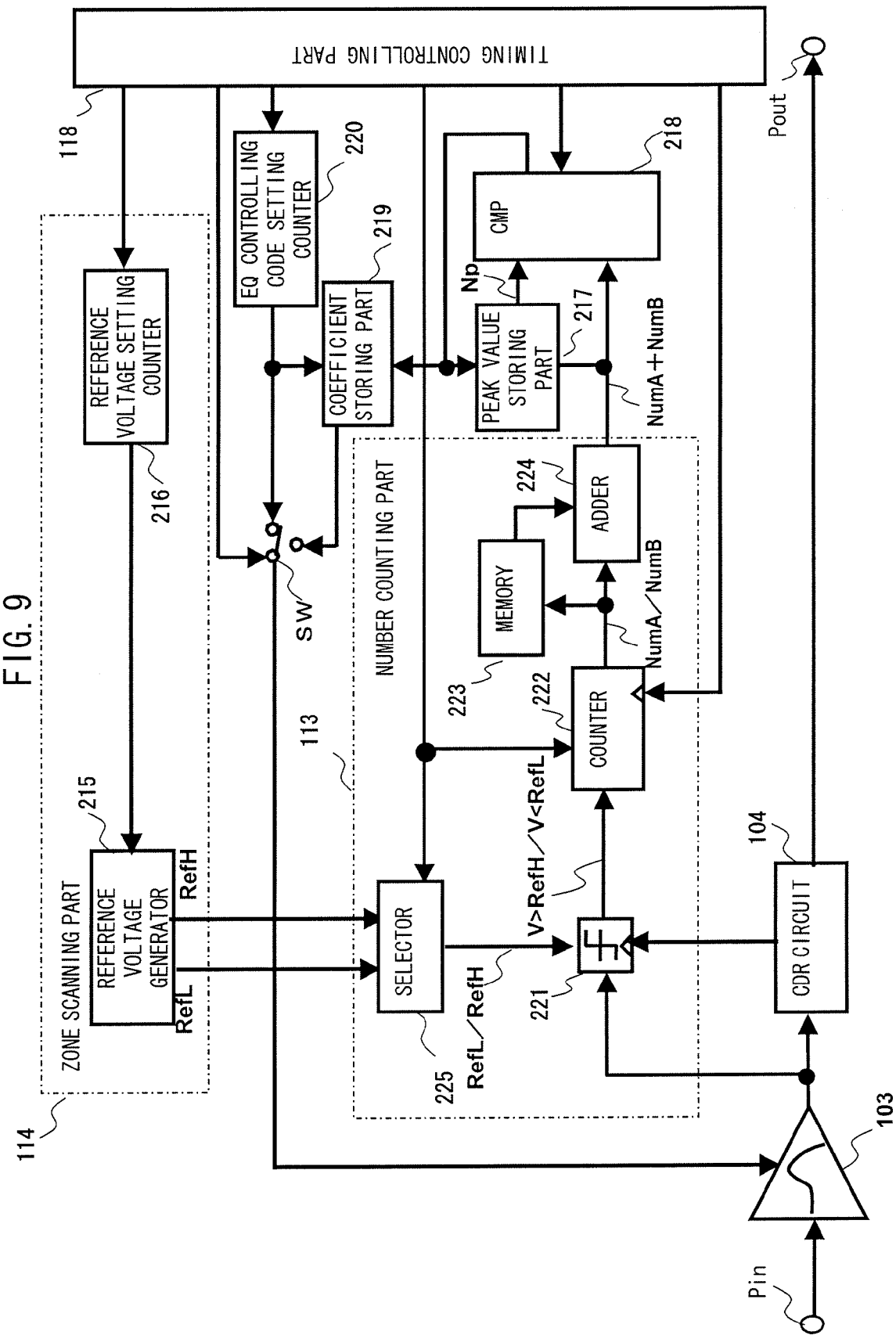
FIG. 9 is a diagram illustrating another embodiment of a number counting part.

FIG. 9 illustrates another embodiment of the number counting part. Note that among components illustrated in FIG. 9, components equivalent to those illustrated in FIG. 1 and FIG. 4 are denoted by the same symbols, and descriptions thereof are omitted.

The number counting part 113 illustrated in FIG. 9 includes a comparator 221, a counter 222, a memory 223, an adder 224, and a selector 225. The upper-limit reference voltage RefH and the lower-limit reference voltage RefL generated by the reference voltage generator 215 are input to the comparator 221 via the selector 225. This selector 225 alternately outputs the upper-limit reference voltage RefH and the lower-limit reference voltage RefL according to a switching signal from the timing controlling part 118. Therefore, the upper-limit reference voltage RefH and the lower-limit reference voltage RefL alternately become a reference voltage for the comparator 221. Thus, in the example of FIG. 9, the comparator 221 compares the reference voltage switched in a time-division manner according to the switching signal with an input signal. Such a circuit structure is an example of an outrange detector detecting a sampling result which is out of the range of detection indicated by the upper-limit reference voltage RefH and the lower-limit reference voltage RefL.

Further, the counter 222 counts an output of the comparator 221 indicating that a sample value V obtained by sampling an output of the equalizer 103 is larger than the reference voltage, when the above-described switching signal indicates that the upper-limit reference voltage RefH is the reference voltage. On the other hand, the counter 222 counts an output of the comparator 221 indicating that the sample value V is smaller than the reference voltage, when the above-described switching signal indicates that the lower-limit reference voltage RefL is the reference voltage. The circuit structure in which the counter 222 performs a counting operation according to the switching signal in this manner is an example of an outrange counter counting a sampling result distributed outside the above-described range of detection. Further, a count value obtained in the counter 222 is added by the memory 223 and the adder 224 according to the switching signal.

That is, in the number counting part 113 illustrated in FIG. 9, among sample values V obtained by sampling outputs of the equalizer 103 for each range of detection set by the REF controlling code, the number of appearances of a sample value V having a value which is out of this range of detection is counted.

Figure 10:
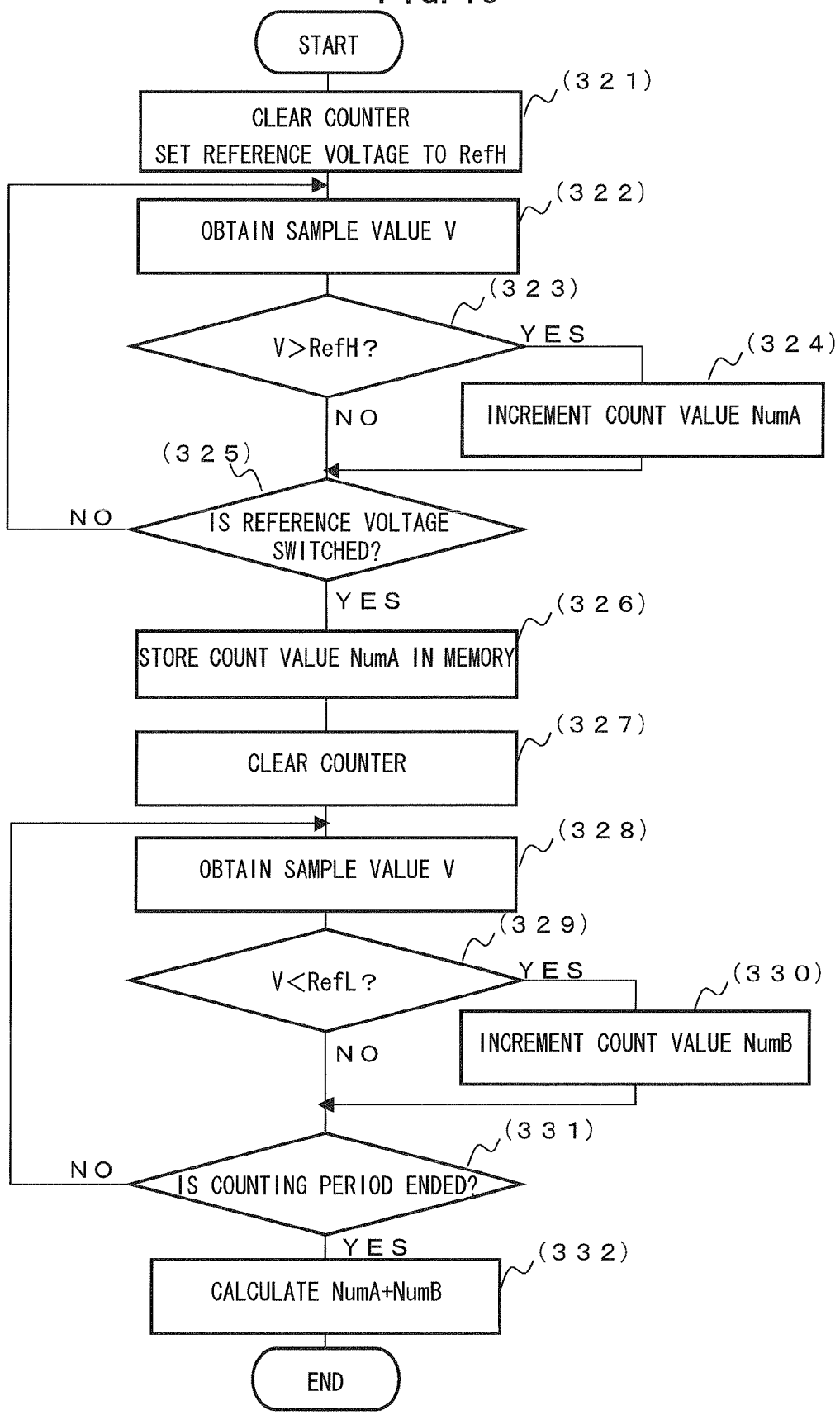
FIG. 10 is a flowchart representing operation of the number counting part.
Figure 11:
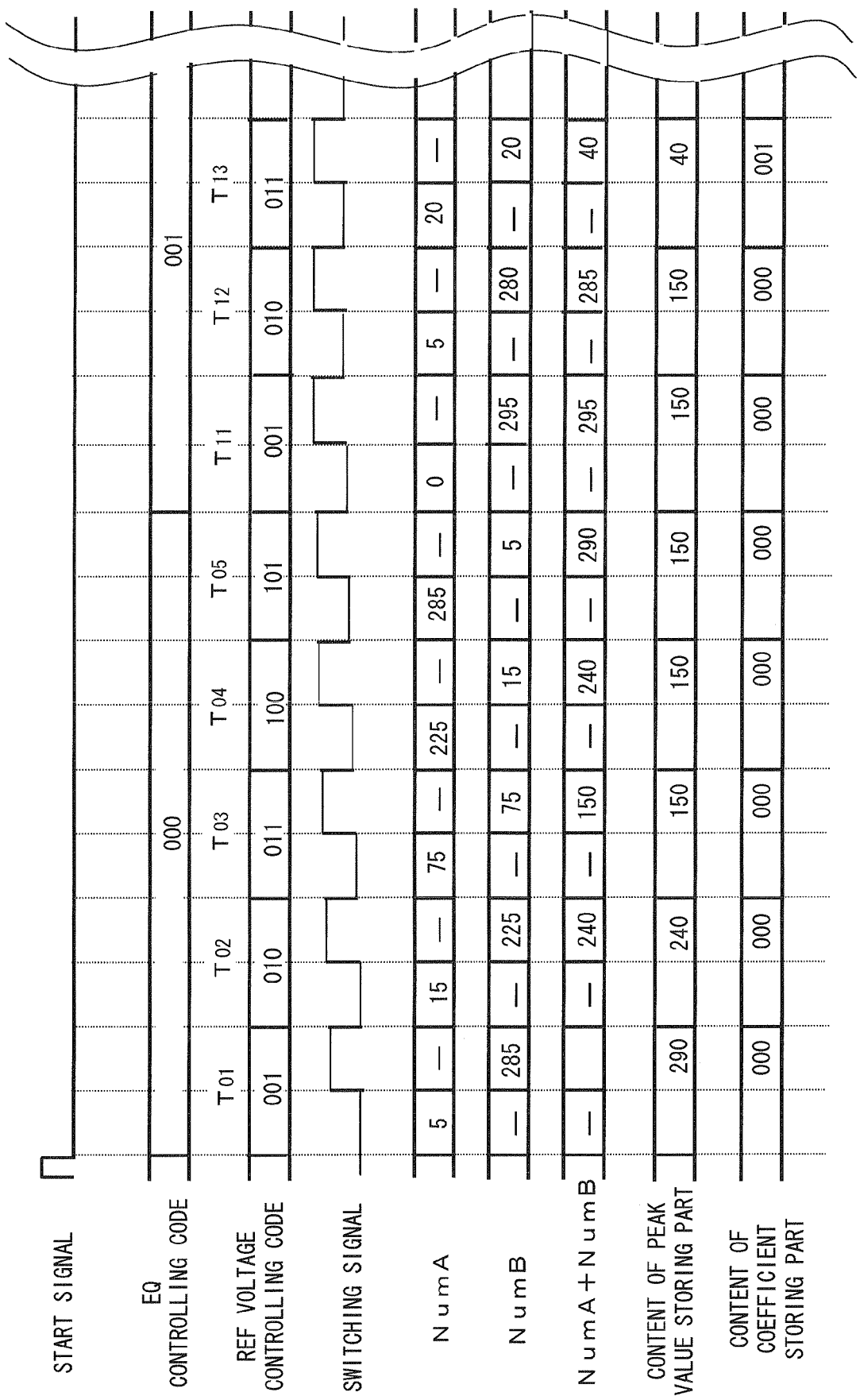
FIG. 11 is a timing chart describing number counting operation.
Figure 12A:
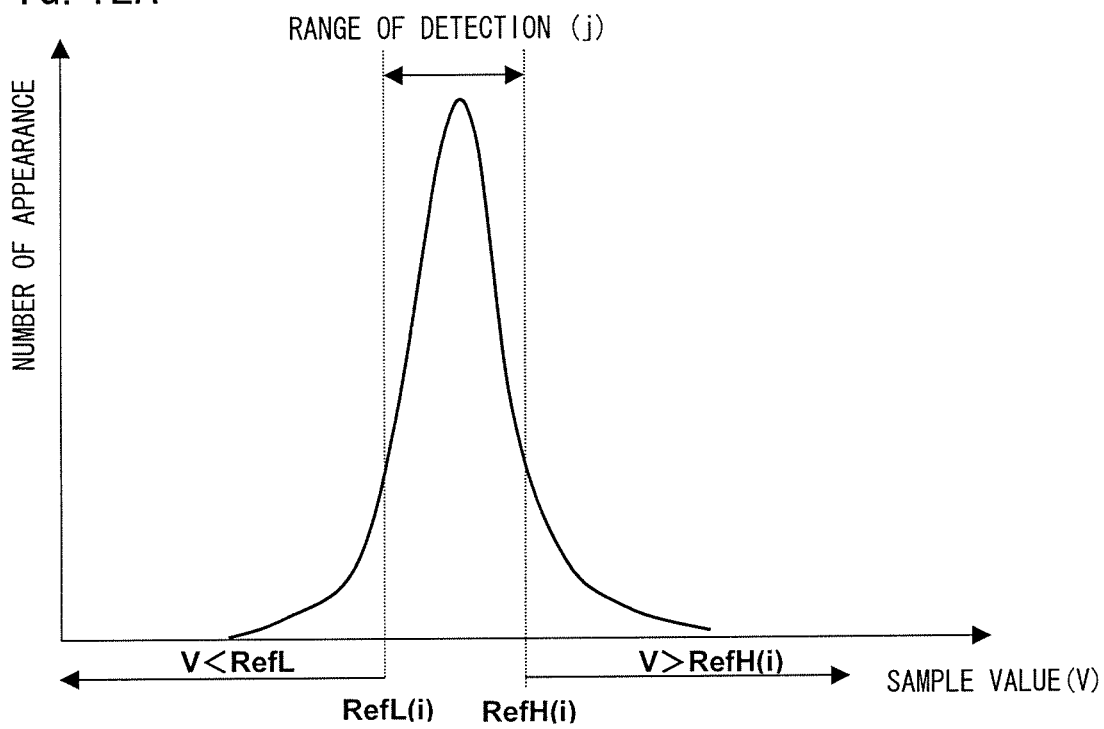
FIGS. 12A and 12B are diagrams describing the number counting operation.
Figure 12B:
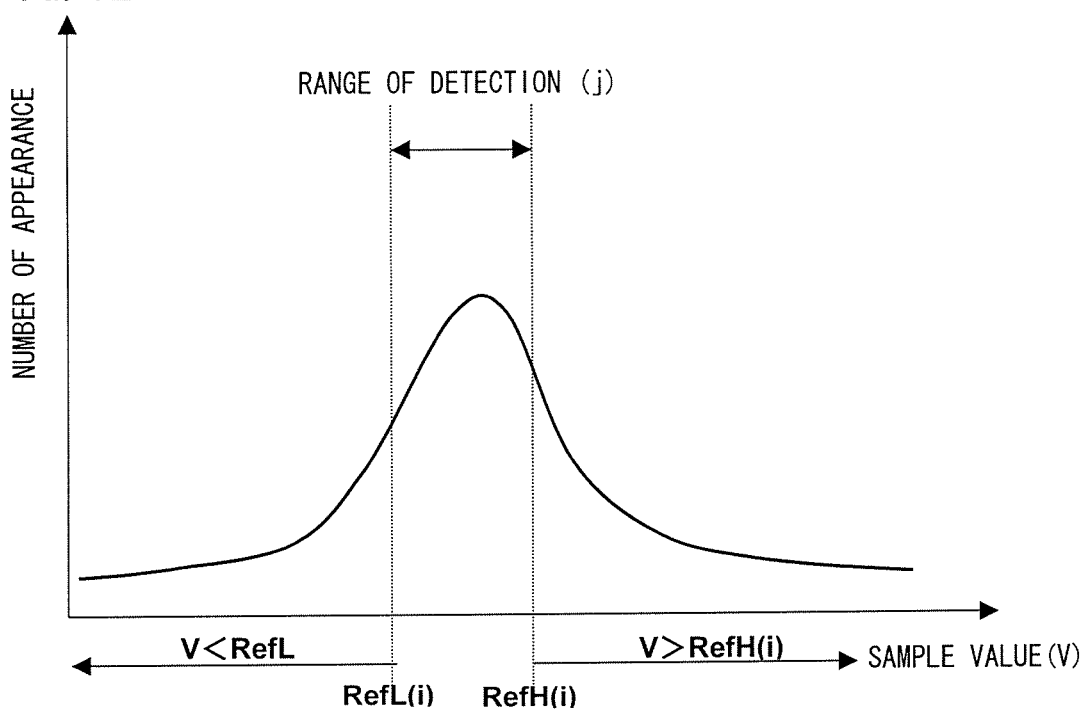

FIG. 10 illustrates a flowchart representing operation of the number counting part. FIG. 11 illustrates a timing chart describing processing of counting the number. Further, FIGS. 12A and 12B illustrate diagrams describing processing of counting the number. Here, in an example illustrated in FIG. 10 and FIG. 11, each counting period in which a combination of the upper-limit reference voltage RefH and the lower-limit reference voltage RefL corresponding to the REF controlling code is set is divided into a front half and a rear half according to the switching signal. Note that each counting period T is discriminated by adding a subscript denoting a combination of number i corresponding to the EQ controlling code and number j corresponding to the REF controlling code. Further, in the example of FIG. 10 and FIG. 11, the selector 225 selects the upper-limit reference voltage RefH in the front half of each counting period and selects the lower-limit reference voltage RefL in the rear half thereof.

In the beginning of each counting period, first, the count value of the counter 222 is cleared in response to instruction from the timing controlling part 118. Further, the upper-limit reference voltage RefH is selected by the selector 225 in response to the switching signal, and is set as the reference voltage for the comparator 221 (step 321).

Thereafter, every time the sample value V is obtained by sampling in synchronization with the clock signal from the CDR circuit 104 (step 322), the comparator 221 compares this sample value V with the upper-limit reference voltage RefH (step 323).

Every time the comparator 221 detects the sample value V having a value higher than the upper-limit reference voltage RefH (affirmative judgment in step 323), a count value NumA of the counter 222 is incremented (step 324). Such counting operation is repeated until the reference voltage is switched by the switching signal. The count value NumA of the counter 222 obtained thus is, for example, the total sum of the number of appearances of a sample value having a value deviating to the upper side of the range of detection (j), which is located between dashed lines in FIG. 12A.

Thereafter, when the reference voltage is switched to the lower-limit reference voltage RefL by the switching signal (affirmative judgment in step 325), the count value NumA of the counter 222 is stored in the memory 223 (step 326). Next, the counter 222 is cleared (step 327).

Thereafter, every time the sample value V is obtained by sampling similar to step 322 (step 328), the comparator 221 compares this sample value V with the lower-limit reference voltage RefL (step 329).

Every time the comparator 221 detects the sample value V having a value lower than the lower-limit reference voltage RefL (affirmative judgment in step 329), a count value NumB of the counter 222 is incremented (step 330). Such counting operation is repeated until the end of the counting period corresponding to the range of detection set by the REF controlling code. The count value NumB of the counter 222 obtained thus is, for example, the total sum of the number of appearances of a sample value having a value deviating to the lower side of the range of detection (j), which is located between dashed lines in FIG. 12A.

Thereafter, in response to the end of the counting period corresponding to the range of detection set by the REF controlling code (affirmative judgment of step 331), the count value NumB of the counter 222 and the count number NumA stored in the memory 223 are added by the adder 224 (step 332).

In FIG. 11, the numbers illustrated corresponding to the front half and the rear half respectively of each counting period are examples of the count values NumA, NumB. Further, examples of addition results NumA+NumB of the count values NumA. NumB are illustrated corresponding to the rear halves of the respective counting periods. Each addition result of the count values NumA. NumB obtained in this manner is a total sum of numbers of appearances of sample values distributed outside of the range of detection (j) with boundaries illustrated by dashed line in FIGS. 12A and 12B. As is clear from comparison between FIGS. 12A and 12B, smallness of this total sum of numbers (NumA+NumB) indicates that there is a sharp peak in the range of detection. That is, the circuit structure in which the adder 224 obtains this total sum of numbers (NunnA+NumB) is an example of an index calculating part calculating an index indirectly indicating the number of samples distributed within the range of detection. By searching for the EQ controlling code which causes the number of samples distributed to a range other than this range of detection to be small, alteration of the equalizer 103 can be performed.

Figure 13:
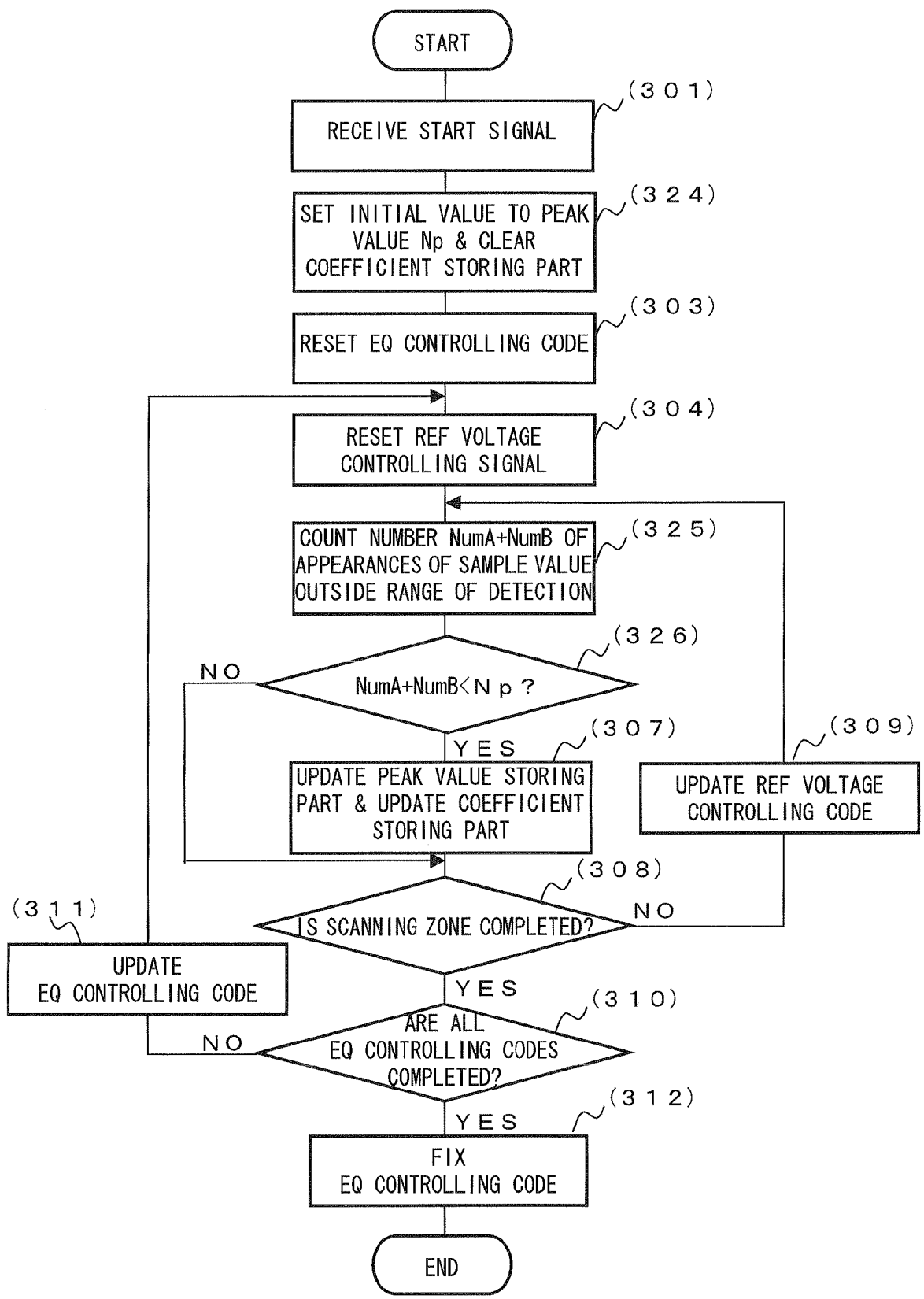
FIG. 13 is a flowchart representing optimum coefficient searching operation.

FIG. 13 illustrates a flowchart representing optimum coefficient searching operation. Note that among procedures illustrated in FIG. 13, procedures equivalent to those illustrated in FIG. 7 are denoted by the same symbols, and descriptions thereof are omitted.

In the example illustrated in FIG. 13, instead of clearing the peak value storing part 217, the timing controlling part 118 sets as an initial value the maximum value which can be counted by the counter 222, or the like in step 324. Further, instead of the number of appearances of a sample value within the range of detection set by the REF controlling code, the number counting part 113 counts the number NumA+NumB of appearances of a sample value outside the range of detection (step 325) following the procedure described using FIG. 10. In addition, in the example of FIG. 11, for each counting period corresponding to the REF controlling code, the value of the number NumA+NumB of appearances of a sample value outside the range of detection counted by the number counting part 113 is illustrated.

Further, in step 326, instead of the number N of appearances of a sample value within the range of detection, the above-described number NumA+NumB of appearances of a sample value outside the range of detection is compared with the peak value Np stored in the peak value storing part 217. When the number NumA+NumB of appearances of a sample value outside the range of detection is smaller than the peak value Np (affirmative judgment in step 326), the peak value storing part 217 and the coefficient storing part 219 are updated (step 307). In this manner, by the peak value storing part 217 and the comparator 218, it is possible to search for the minimum value of the number NumA+NumB of appearances of a sample value outside the range of detection.

In the example illustrated in FIG. 11, in the counting period $T_{01}$ corresponding to the combination of EQ controlling code [000] and REF controlling code [001], the peak value Np is updated with the number NumA+NumB of appearances. Thereafter, in the counting period $T_{02}$ corresponding to the combination of EQ controlling code [000] and REF controlling code [010], the peak value Np is updated again. Further, in the counting period $T_{03}$ corresponding to the combination of EQ controlling code [000] and REF controlling code [011], the peak value Np is updated again. After this update, a state that the peak value Np is maintained without being updated continues for a while. Then, in the counting period $T_{13}$ corresponding to the combination of EQ controlling code [001] and REF controlling code [0011] which are updated, update of the peak value Np occurs. At this time, as a new peak value Np, the number NumA+NumB of appearances obtained corresponding to the counting period $T_{13}$ is stored in the peak value storing part 217. Further, in response to update of the peak value Np, the coefficient storing part 219 is also updated. By this update, the EQ controlling code [001] is stored in the coefficient storing part 219 instead of the EQ controlling code [000].

In this manner, it is possible to search for the EQ controlling code indicating the equalizer coefficient which causes the number of samples having a sample value which is out of the range of detection to be minimum.

When the number counting part 113 is structured as illustrated in FIG. 9, destinations of distribution of the output signal of the equalizer 103 and the clock signal generated in the CDR circuit 104 can be reduced to one comparator 221. Accordingly, it is possible to further reduce power consumption in the equalizer 103. Further, a wiring space and so on needed for distribution of signals can also be reduced.

Still Another Embodiment

Figure 14:
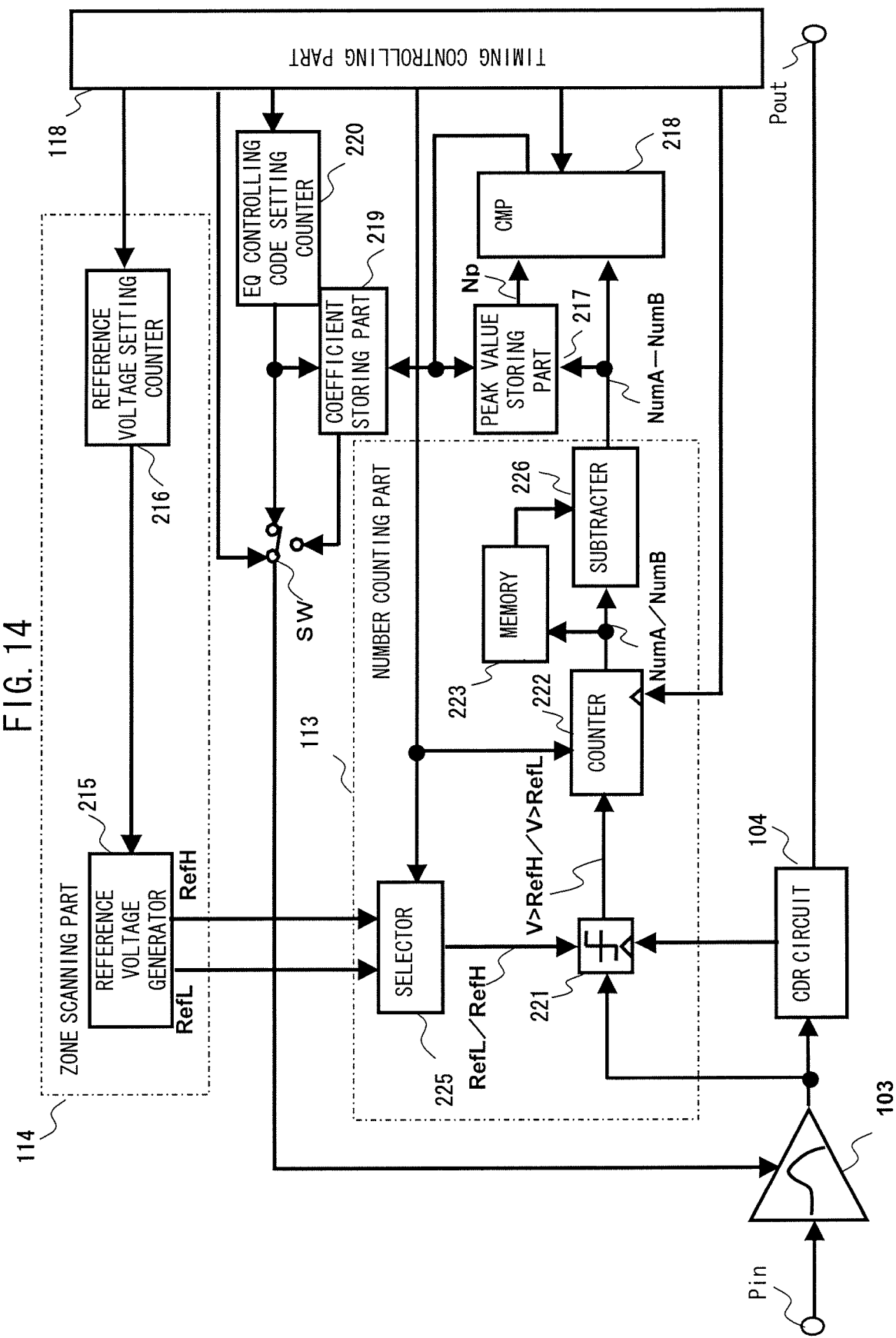
FIG. 14 is a diagram illustrating another embodiment of the number counting part.

FIG. 14 illustrates another embodiment of the number counting part. Note that among components illustrated in FIG. 14, components equivalent to those illustrated in FIG. 9 are denoted by the same symbols, and descriptions thereof are omitted.

The number counting part 113 illustrated in FIG. 14 includes a subtracter 226 instead of the adder 224 illustrated in FIG. 9. Further, the counter 222 illustrated in FIG. 14 counts the number of times the comparator 221 outputs an indication that the sample value V corresponding to the output of the equalizer 103 is larger than the reference voltage in both the front half and rear half of the above-described counting period. The count value NumA in the counter 222 in the front half of a counting period is stored in the memory 223 at the timing the upper-limit reference voltage RefH and the lower-limit reference voltage RefL are switched by the switching signal. Subsequently, in the rear half of the counting period, the number NumB of appearances of a sample value V larger than the lower-limit reference voltage RefL is counted. Then, at the timing the REF controlling code is switched, the subtracter 226 subtracts the count value NumA stored in the memory 223 from the count value NumB obtained by the counter 222 in counting processing in the rear half of the counting period.

In this manner, in the example of FIG. 14, for each of the upper limit and the lower limit of the range of detection, the comparator 221 discriminates a sampling result having a value larger than the reference voltage in a time division manner. Such a circuit structure is an example of a discriminating part which discriminates a sampling result.

Figure 15:
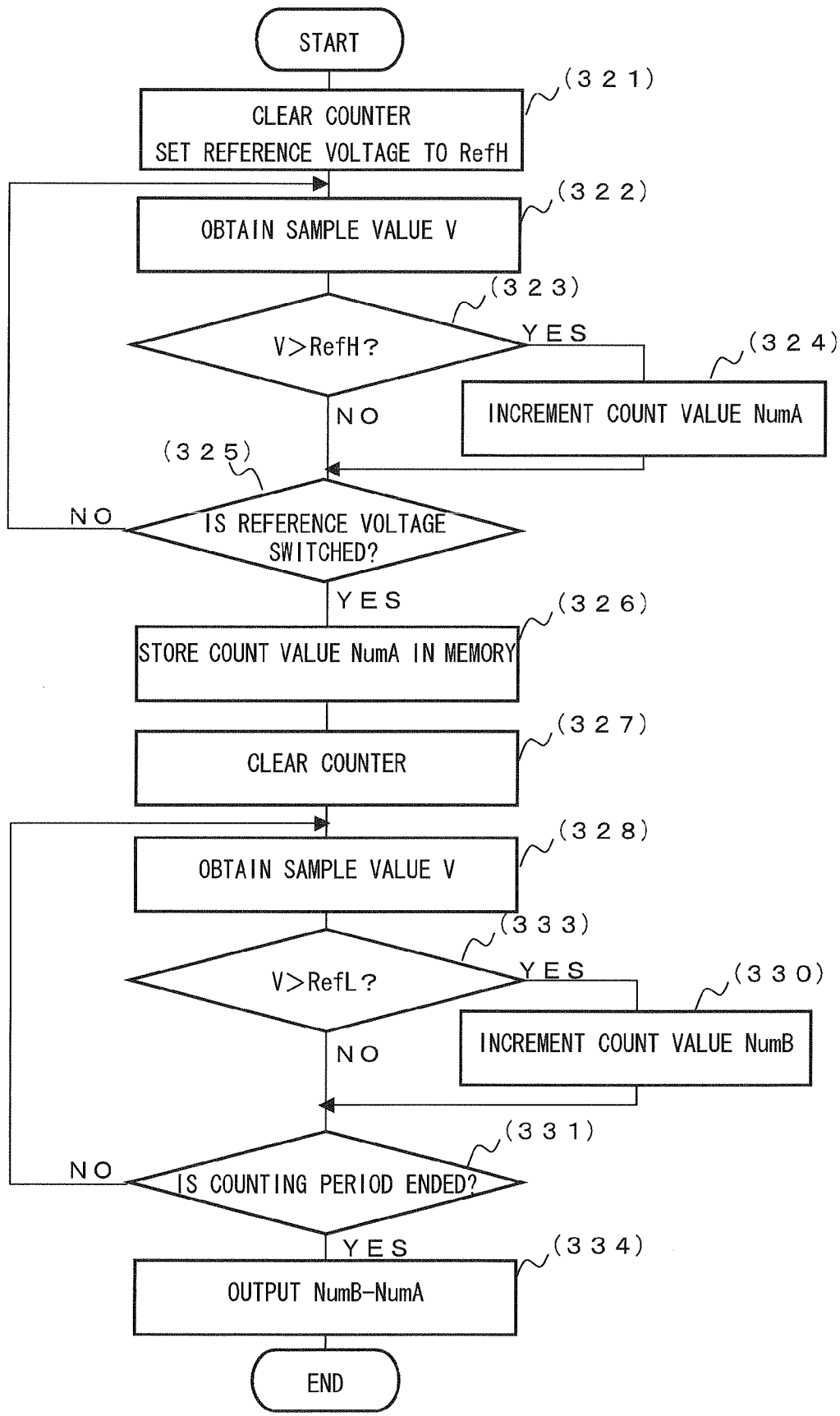
FIG. 15 is a flowchart representing operation of the number counting part.
Figure 16:
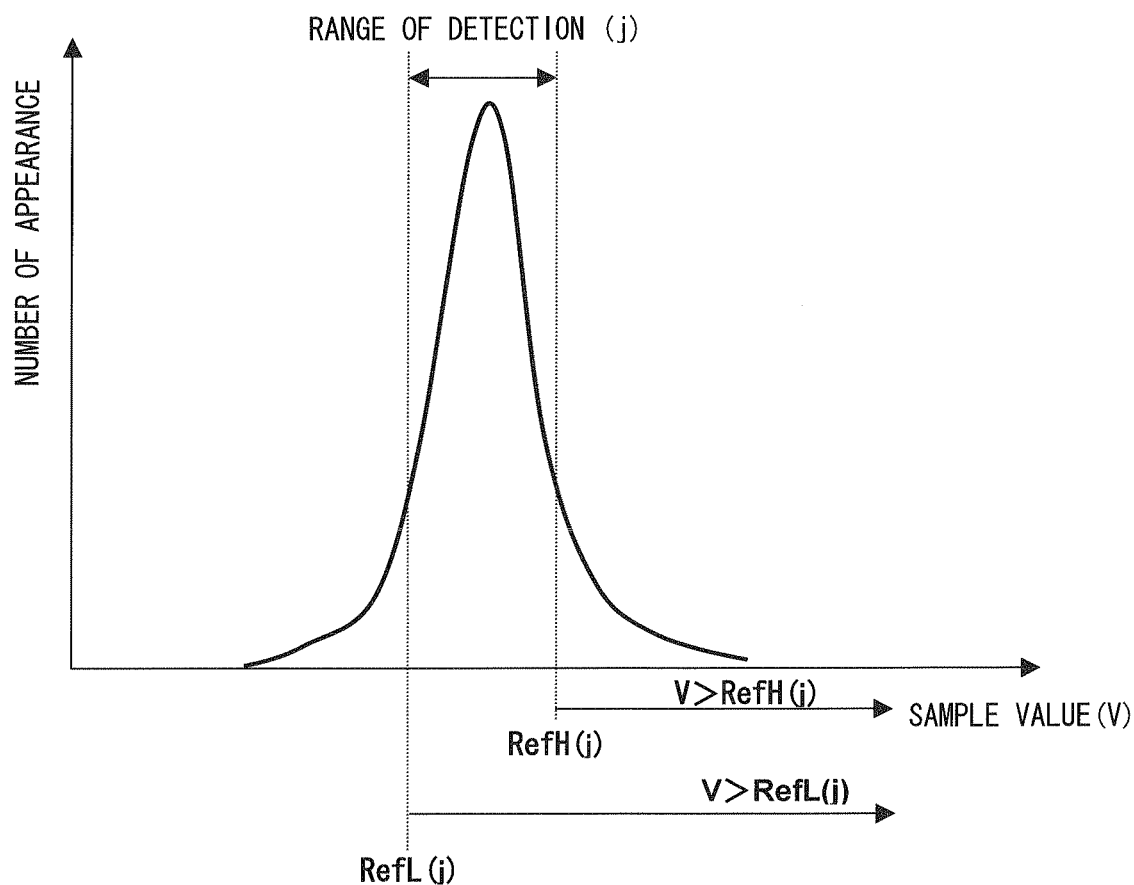
FIG. 16 is a diagram describing number counting operation.
Figure 17:
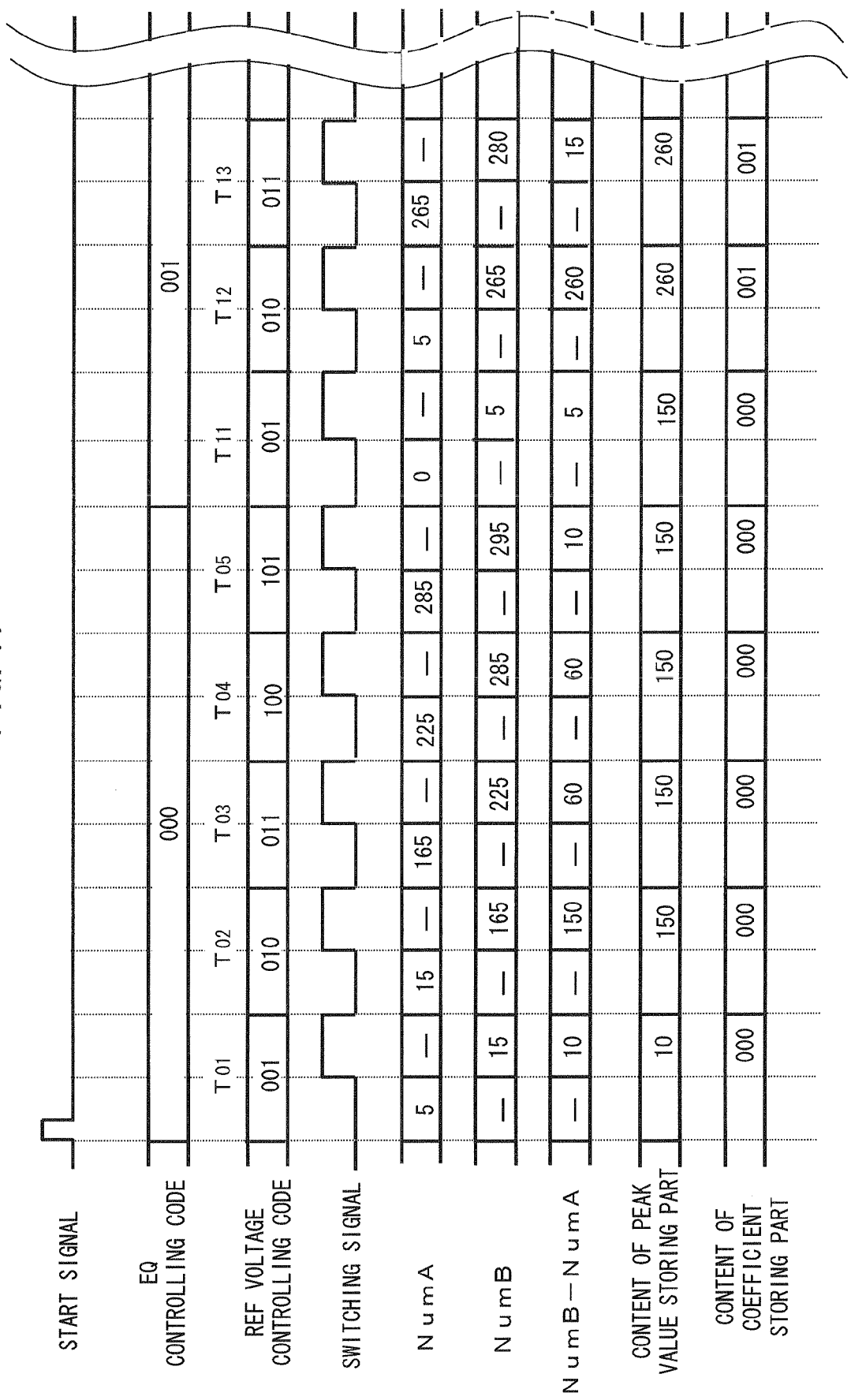
FIG. 17 is a timing chart describing coefficient searching operation.

FIG. 15 illustrates a flowchart representing operation of the number counting part. Further, FIG. 16 illustrates a diagram describing processing of counting the number. Moreover, FIG. 17 illustrates a timing chart describing operation of counting the number. Note that among procedures illustrated in FIG. 15, procedures equivalent to those illustrated in FIG. 10 are denoted by the same symbols, and descriptions thereof are omitted. Likewise, among elements such as signals and counting periods illustrated in FIG. 17, elements equivalent to those illustrated in FIG. 11 are denoted by the same symbols, and descriptions thereof are omitted.

In the flowchart illustrated in FIG. 15, processing of the rear half of a counting period after the reference voltage is switched is different from the example illustrated in FIG. 10. One difference is that the count value NumB of the counter 222 is incremented (step 330) when the sample value V is higher than the lower-limit reference voltage RefL (affirmative judgment in step 333). Another difference is processing performed when the counting period ends (affirmative judgment in step 331). In the example of FIG. 15, the subtracter 226 subtracts the number NumA of samples having a value higher than the upper-limit reference voltage RefH from the number NumB of samples having a value higher than the lower-limit reference voltage RefL (step 334).

The number NumB of samples having a value higher than the lower-limit reference voltage RefL(j) of the range of detection (j) corresponds to the number of samples distributed to the right side of the left boundary of the range of detection (j) in FIG. 16. The number NumA of samples having a value higher than the upper-limit reference voltage RefH(j) of the range of detection (j) corresponds to the number of samples distributed to the right side of the right boundary of the range of detection (j) in FIG. 16. Therefore, by subtracting the number NumA of samples from the number NumB of samples, the number of samples distributed within the range of detection (j) can be obtained. That is, the above-described circuit structure in which the subtracter 226 subtracts the number NumA of samples from the number NumB of samples is an example of a number calculating part calculating the number of samples within the range of detection.

In this manner, the number counting part 113 illustrated in FIG. 14 can count the number of samples having a value within the range of detection set by the REF controlling code, similarly to the way performed by the number counting part 113 illustrated in FIG. 4. Based on the number NumB−NumA of samples within the range of detection obtained by the subtracter 224 illustrated in FIG. 14, it is possible to search for the EQ controlling code corresponding to the optimum EQ coefficient by processing similar to FIG. 7.

For example, in the example illustrated in FIG. 17, in the counting period $T_{01}$ corresponding to the combination of EQ controlling code [000] and REF controlling code [001], a numerical value "50" is obtained as the number NumB−NumA of samples within the range of detection. In the illustrated example, this value is stored as the peak value Np in the peak value storing part 217. Subsequently, in the counting period $T_{02}$ corresponding to the combination of EQ controlling code [000] and REF controlling code [010], the peak value Np is updated with a value "130" of the number NumB−NumA of samples. In the example of FIG. 17, a state that the peak value Np is maintained without being updated continues for a while. Then, in the counting period $T_{12}$ corresponding to the combination of EQ controlling code [001] and REF controlling code [010] which are updated, the peak value Np is updated again with the number NumB−NumA of samples indicating the number of samples within the range of detection. In response to update of this peak value Np, the coefficient storing part 219 is updated. Instead of the EQ controlling code [000] retained first, the EQ controlling code [001] when update of the peak value Np occurred is stored.

By continuing such processing, it is possible to search for the EQ controlling code indicating the equalizer coefficient which causes the number of samples having a voltage value within the range of detection to be maximum.

In addition, when the number counting part 113 as illustrated in FIG. 14 is used, it is also possible to input only the reference voltage corresponding to the upper limit or the lower limit of the range of detection indicated by the REF controlling code to the number counting part 113 by the reference voltage generator 215. In this case, using the correspondence of the upper limit or lower limit of the range of detection which is set previously to the lower limit or upper limit of the range of detection which is set subsequently, it is possible to count the number of appearances of a sampling result having a sample value within the range of detection.

Next, an example of implementing the equalizer controlling circuit in the receiving device will be described. This equalizer controlling circuit searches for the EQ coefficient which causes the number of samples having a voltage value within the range of detection to be maximum, that is, the optimum EQ coefficient which causes the dispersion of sampling results to be minimum.

Still Another Embodiment

Figure 18:
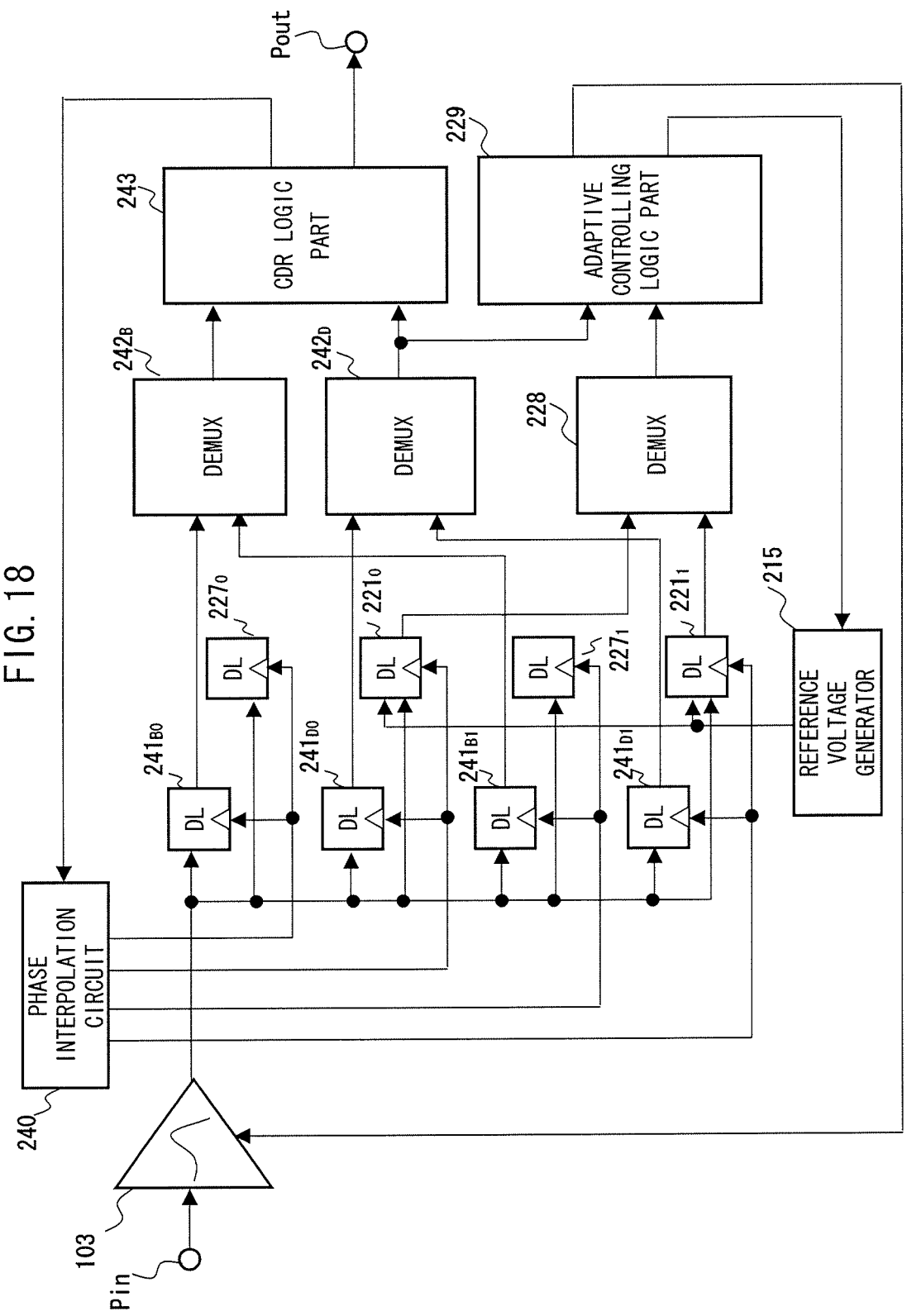
FIG. 18 is a diagram illustrating another embodiment of the receiving device.

FIG. 18 illustrates another embodiment of the receiving device. Note that among components illustrated in FIG. 18, components equivalent to those illustrated in FIG. 1 and FIG. 14 are denoted by the same symbols, and descriptions thereof are omitted. In the embodiment described below, to use a test signal used for training when the equalizer is altered, processing of searching for the optimum coefficient is performed while a test signal is input.

In the receiving device illustrated in FIG. 18, an input signal is input to the equalizer 103 via a port Pin. An output signal of the equalizer 103 is input to four comparators $241_{B0}$, $241_{D0}$, $241_{B1}$, $241_{D1}$ for CDR processing. Further, the output signal of the equalizer 103 is also input to two comparators $221_0$, $221_1$ for searching for the EQ coefficient and to dummy comparators $227_0$, $227_1$. Any of the comparators $241_{B0}$, $241_{D0}$, $241_{B1}$, $241_{D1}$, comparators $221_0$, $221_1$, and comparators $227_0$, $227_1$ can be achieved using a decision latch circuit element for example. In FIG. 18, the comparators $241_{B0}$, $241_{D0}$, $241_{B1}$, $241_{D1}$, comparators $221_0$, $221_1$, and comparators $227_0$, $227_1$ are denoted by using a symbol DL.

To the comparators $241_{B0}$, $241_{D0}$, $241_{B1}$, $241_{D1}$, clock signals with four phases are input, the phases being shifted 90 degrees each, which is a half frequency of a synchronizing signal of the input signal. Further, to the comparators $221_0$, $221_1$, clock signals with the same phases as those for the above-described comparators $241_{B0}$, $241_{D1}$ are input. To the comparators $227_0$, $227_1$, clock signals with the same phases as those for the above-described comparators $241_{B0}$, $241_{B1}$ are input. The clock signals with four phases described above are generated by a phase interpolation circuit 240 based on a clock signal recovered by a CDR logic part 243. In addition, the dummy comparators $227_0$, $227_1$ are disposed for equalizing loads on circuits generating the clock signals with four phases in the phase interpolation circuit 240. Moreover, in the decision latch, sampling in synchronization with a clock signal and comparison with a reference voltage are performed simultaneously. A result of this comparison becomes an output of a comparator including the decision latch.

Reference voltage for the comparators $241_{D0}$, $241_{D1}$ are fixed to a threshold for 0/1 determination. Outputs of the comparators $241_{D0}$, $241_{D1}$ are parallelized by a demultiplexer (DEMUX) $242_D$. For example, this demultiplexer $242_D$ generates 8-bit received data by parallelizing outputs of the two comparators $241_{D0}$, $241_{D1}$. The generated received data are subjected to CDR processing in the CDR logic part 243.

Likewise, reference voltage for the comparators $241_{B0}$, $241_{B1}$ are fixed to the threshold for 0/1 determination. From outputs of the comparators $241_{B0}$, $241_{B1}$, a demultiplexer (DEMUX) $242_B$ generates, for example, 8-bit boundary data. The generated boundary data are subjected to CDR processing in the CDR logic part 243.

The CDR logic part 243 performs recovery processing of a clock signal based on the received data and the boundary data. Further, in the CDR logic part 243, the received data may be further parallelized corresponding to the processing rate of another device disposed in the subsequent stage of the receiving device. The received data or the further parallelized received data are passed to the device in the subsequent stage via an output port Pout.

The two comparators $221_0$, $221_1$ for searching for the EQ coefficient illustrated in FIG. 18 compare the reference voltage generated by the reference voltage generator 215 with an output of the equalizer 103 in synchronization with the above-described clock signal. From outputs of these comparators $221_0$, $221_1$, the demultiplexer (DEMUX) 228 generates, for example, 8-bit comparing data. The generated comparing data are subjected to search processing for the optimum EQ coefficient by an adaptive controlling logic part 229.

The adaptive controlling logic part 229 includes the peak detecting part 115, the coefficient specifying part 117, and the timing controlling part 118 illustrated in FIG. 1. Further, among the number counting part 113, the zone scanning part 114, and the coefficient altering part 116, a portion which may be achieved by a logic device is included in the adaptive controlling logic part 229.

For each range of detection, the adaptive controlling logic part 229 performs processing of counting the number of appearances of an output voltage value of the equalizer 103 included in this range of detection. This counting processing is performed based on the above-described 8-bit comparing data. Further, to perform the above-described counting processing for each range of detection, the adaptive controlling logic part 229 performs control to vary the reference voltage generated by the reference voltage generator 215 and the equalizer coefficient. Thus, the adaptive controlling logic part 229 searches for the equalizer coefficient which causes dispersion in the appearance number distribution with respect to the output voltage value of the equalizer 103 to be minimum.

In addition, in the example illustrated in FIG. 18, the received data generated by the demultiplexer 242D are also used in the adaptive controlling logic part 229. Accordingly, as will be described later, the circuit scales of the adaptive controlling logic part 229 and the reference voltage generator 215 are reduced.

In the example of FIG. 18, the adaptive controlling logic part 229 performs selective counting processing for comparing data obtained at sampling timing when the received data is "1". Thus, the range of variation of the reference voltage generated by the reference voltage generator 215 can be limited to the range which is equal to a half of the range of variation of the output voltage of the equalizer 103. In this case, for example, a resistor ladder generating the reference voltage in the range of 0 V to 0.5 V which is equal to a half of the range of variation of the output voltage of the equalizer 103 can be used to achieve the reference voltage generator 215. Here, it is needless to mention that similar selective counting processing may be performed for the comparing data obtained at sampling timing when the received data is "0".

The example illustrated in FIG. 18 is an implementation example in which the CDR processing and the processing of searching for the optimum coefficient in the disclosure of the present application are started and performed simultaneously in the receiving device. The processing of searching for the optimum coefficient disclosed in the present application need not necessarily be implemented to start simultaneously with the CDR processing. For example, in another possible implementation, the CDR processing is performed in advance in the receiving device, and a result of this CDR processing is used to perform the processing of searching for the optimum coefficient of the disclosure of the present application.

Hereinafter, an implementation example of the receiving device structured to perform the CDR processing in advance of search processing for the optimum coefficient of the disclosure of the present application will be described.

Still Another Embodiment

Figure 19:
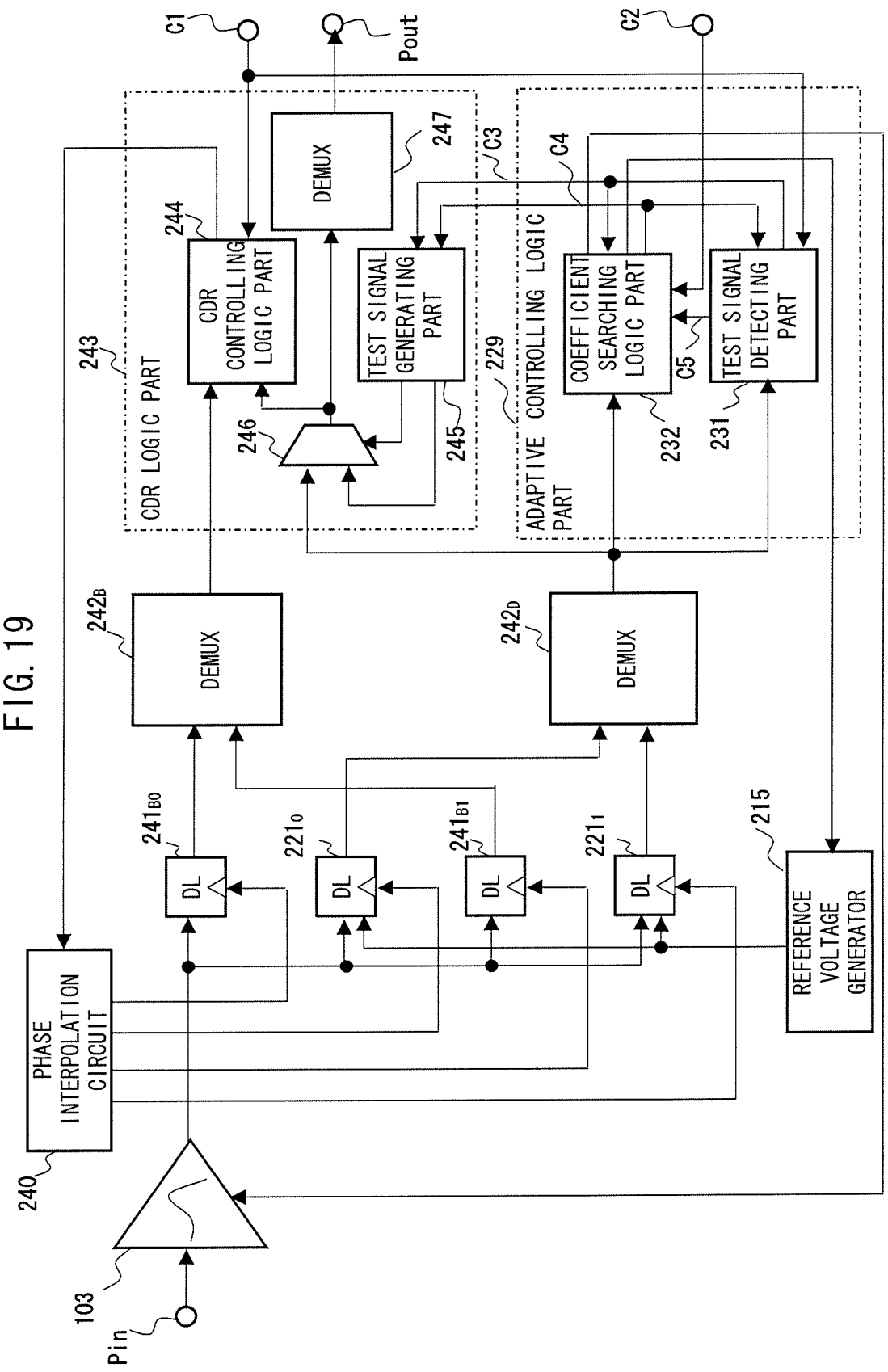
FIG. 19 is a diagram illustrating another embodiment of the receiving device.

FIG. 19 illustrates another embodiment of the receiving device. Note that among components illustrated in FIG. 19, components equivalent to those illustrated in FIG. 18 are denoted by the same symbols, and descriptions thereof are omitted.

The receiving device illustrated in FIG. 19 includes two comparators $221_0$, $221_1$ for obtaining received data and two comparators $241_{B0}$, $241_{B1}$ for obtaining boundary data. To these comparators $241_{B0}$, $221_0$, $241_{B1}$, $221_1$, clock signals with four phases differing by 90 degrees each are input. These clock signals with four phases are generated by the phase interpolation circuit 240 similarly to the example illustrated in FIG. 18.

Outputs of the comparators $241_{B0}$, $241_{B1}$ are parallelized by a demultiplexer $242_B$. Further, outputs of the comparators $221_0$, $221_1$ are parallelized by a demultiplexer $242_D$. The demultiplexers $242_B$, $242_D$ parallelize outputs of the comparators $241_{B0}$, $241_{B1}$ and outputs of the comparators $221_0$, $221_1$ respectively in, for example, each period of four cycles. By parallelization processing of these outputs, 8-bit received data and boundary data are obtained.

To the CDR logic part 243, both the received data and the boundary data described above are input. On the other hand, to the adaptive controlling logic part 229, only the received data obtained in the multiplexer 242o are input.

The adaptive controlling logic part 229 illustrated in FIG. 19 has a test signal detecting part 231 and a coefficient searching logic part 232. An output of the demultiplexer $242_D$ is input to the test signal detecting part 231 and the coefficient searching logic part 232.

The test signal detecting part 231 verifies the input received data with the test signal every time training of the receiving device starts and every time the equalizer coefficient is updated by the coefficient searching logic part 232. When the test signal is detected from the received data, the test signal detecting part 231 causes the coefficient searching logic part 232 to start number counting processing with respect to the equalizer coefficient being set. On the other hand, when the test signal is not detected from the received data, the test signal detecting part 231 instructs the coefficient searching logic part 232 to update the equalizer coefficient. In the example of the receiving device illustrated in FIG. 19, a detection result of the test signal by the test signal detecting part 231 is notified to the coefficient searching logic part 232. Then, update of the equalizer coefficient by the coefficient searching logic part 232 is controlled in response to this notification. The circuit structure in which the test signal detecting part 231 and the coefficient searching logic part 232 cooperate in this manner is an example of an alteration controlling part controlling alteration of the equalizer coefficient based on a result of comparing the test signal with the received data.

Here, a CDR-en signal indicating start of CDR processing is input to the test signal detecting part 231 and the CDR logic part 243 via a terminal C1 illustrated in FIG. 19. Further, an ADEQ-en signal indicating start of adaptive equalization processing is input to the coefficient searching logic part 232 via a terminal C2 illustrated in FIG. 19. On the other hand, the path denoted by symbol C3 in FIG. 19 is used for transmitting a notification indicating whether detection of test signal by the test signal detecting part 231 is succeeded or not. Further, the path denoted by symbol C4 in FIG. 19 is used for transmitting a notification indicating that a new equalizer coefficient is set by the coefficient searching logic part 232.

The CDR logic part 243 illustrated in FIG. 19 has a test signal generating part 245 and a selector 246, in addition to a CDR controlling logic part 244 performing normal CDR control processing. To the CDR controlling logic part 244, an output of the demultiplexer $242_B$ and an output of the selector 246 are input.

Upon reception of the notification indicating that the detection of test signal is succeeded from the test signal detecting part 231, the test signal generating part 245 generates a test signal used for training of the receiving device. This test signal generated in the test signal generating part 245 is input to the selector 246 together with received data from the demultiplexer $242_D$.

The selector 246 outputs received data from the demultiplexer $242_D$ or test data from the test signal generating part 245 in response to a switching signal. In the example illustrated in FIG. 19, this switching signal is generated by the test signal generating part 245 based on notifications input via the above-described paths C3, C4.

An output of the selector 246 is input to the CDR controlling logic part 244 and the demultiplexer (DEMUX) 247. This demultiplexer 247 performs processing of parallelizing received data corresponding to an operating clock of another device arranged in the subsequent stage of the receiving device. An output of the demultiplexer 247 is passed to the device in the subsequent stage via the output port Pout.

Here, in a training period of the receiving device, a test signal for altering the equalizer arrives at the receiving device repeatedly from an opposing transmission device. Therefore, after the test signal is detected from a received signal by the above-described test signal detecting part 231, received data represented by the received signal corresponding to an output of the equalizer 103 and the test signal are equal unless the equalizer coefficient changes. That is, in the period after the test signal is detected, the CDR controlling logic part 244 is able to execute CDR processing using the test signal generated in the test signal generating part 245, instead of the output of the demultiplexer $242_D$.

Accordingly, it is possible to share the comparators $221_0$, $221_1$ operating at data sampling timing between CDR processing and coefficient search processing. Sharing of the comparators $221_0$, $221_1$ can be achieved by switching the reference voltage in conjunction with switching of the selector 246 in a CDR processing phase prior to optimum coefficient searching and in an optimum coefficient searching phase started in response to success in detection of test signal. For example, in the CDR processing phase, the reference voltage corresponding to the threshold for 0/1 determination in these comparators $221_0$, $221_1$ may be set, and in the optimum coefficient searching phase, the reference voltage indicating the range of detection to be scanned may be set.

As described above, in the implementation example illustrated in FIG. 19, by achieving sharing of the comparators $221_0$, $221_1$, the scale of analog circuits is reduced as compared to the example illustrated in FIG. 18. Specifically, as compared to the example illustrated in FIG. 18, four decision latches and one demultiplexer can be deleted in the example of FIG. 19. Among various circuit elements included in the receiving device illustrated in FIG. 18, these analog circuits are elements occupying a relatively large area when being mounted in an LSI chip. Therefore, deletion of these analog circuits contributes to reduction of the implementation area of the receiving device.

FIG. 20 illustrate sequence diagrams describing adaptive equalization operation which is applied in the implementation example illustrated in FIG. 19. FIG. 20 illustrate transmitting and receiving of signals among the test signal detecting part 231, the coefficient searching logic part 232, and the equalizer 103.

Figure 21:
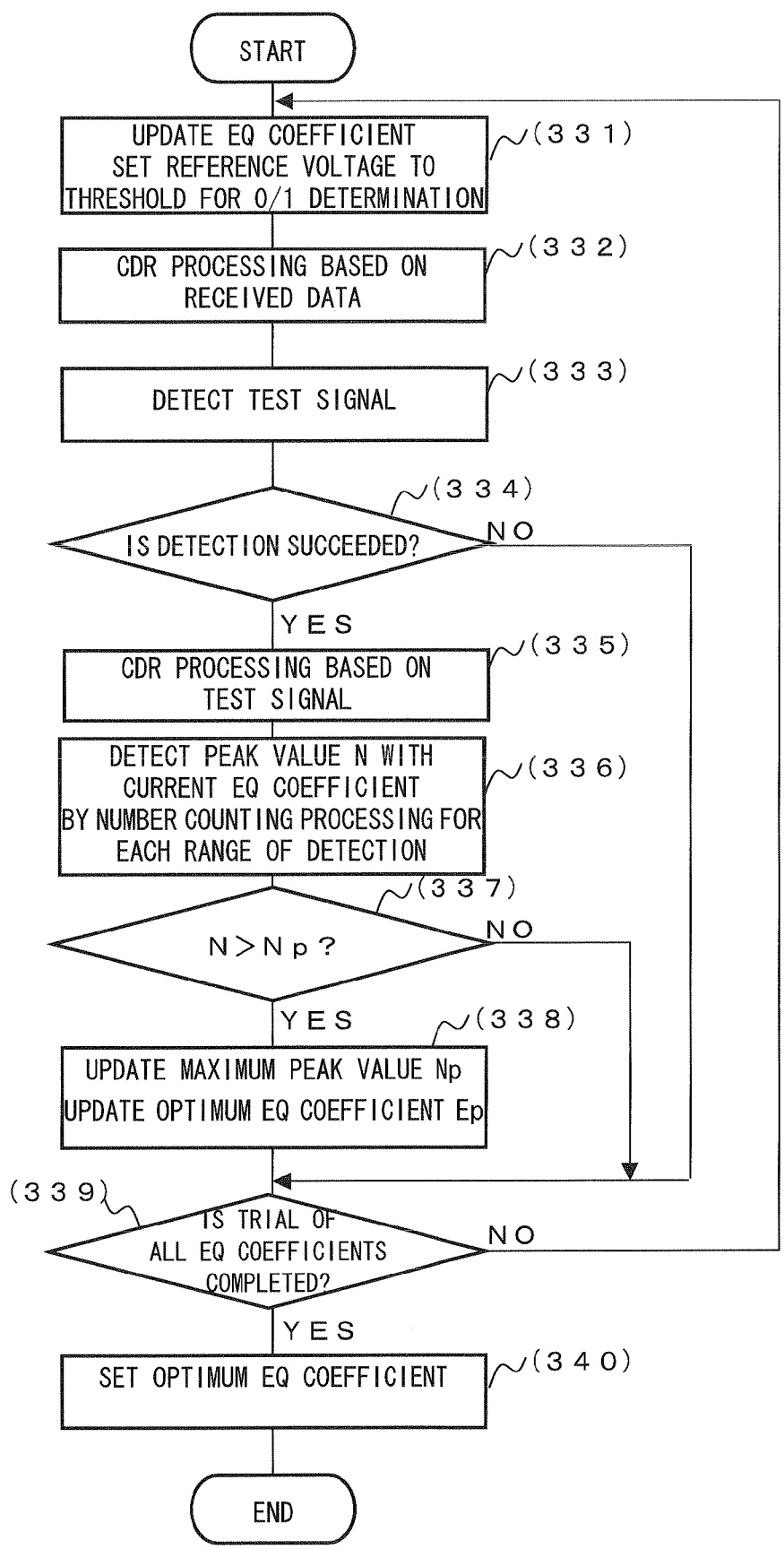
FIG. 21 is a flowchart representing adaptive equalization operation.

Further, FIG. 21 illustrates a flowchart representing the adaptive equalization operation which is applied in the implementation example illustrated in FIG. 19. In the example illustrated in FIG. 21, step 331 to step 334 correspond to the CDR processing phase, and step 335 to step 339 correspond to the optimum coefficient searching phase.

Figure 20B:
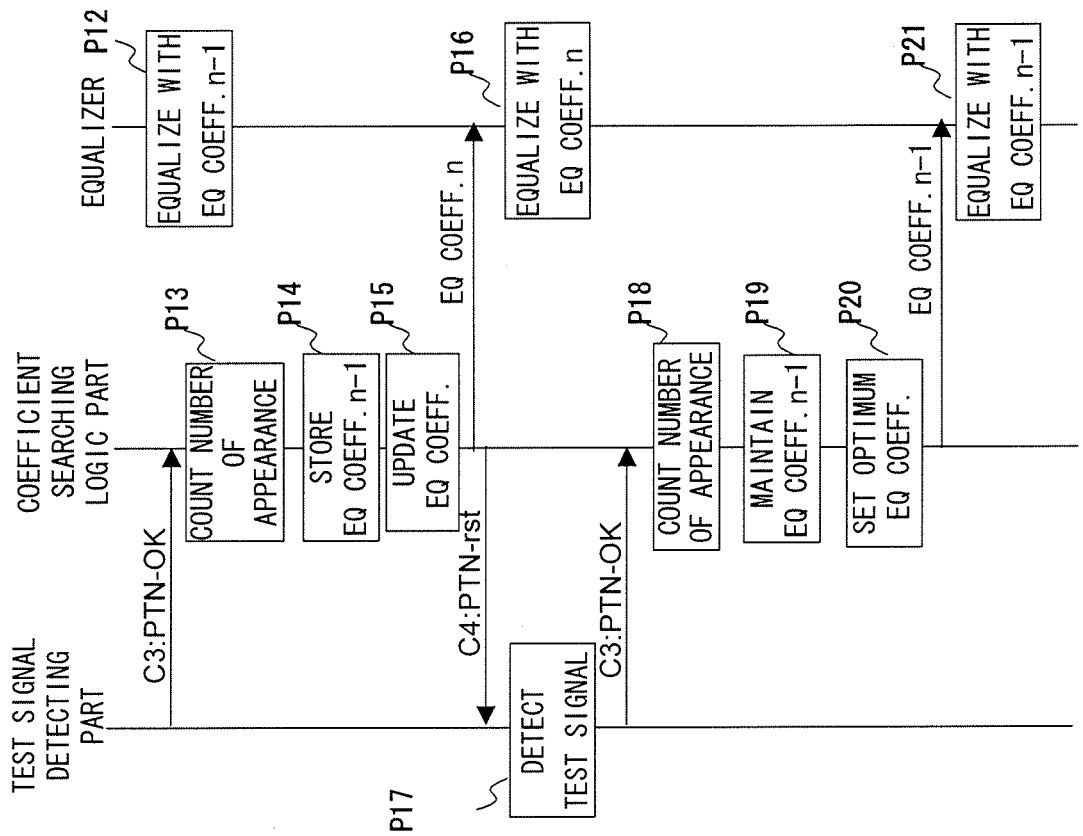
FIGS. 20A and 20B are sequence diagrams describing adaptive equalization operation.
Figure 20A:
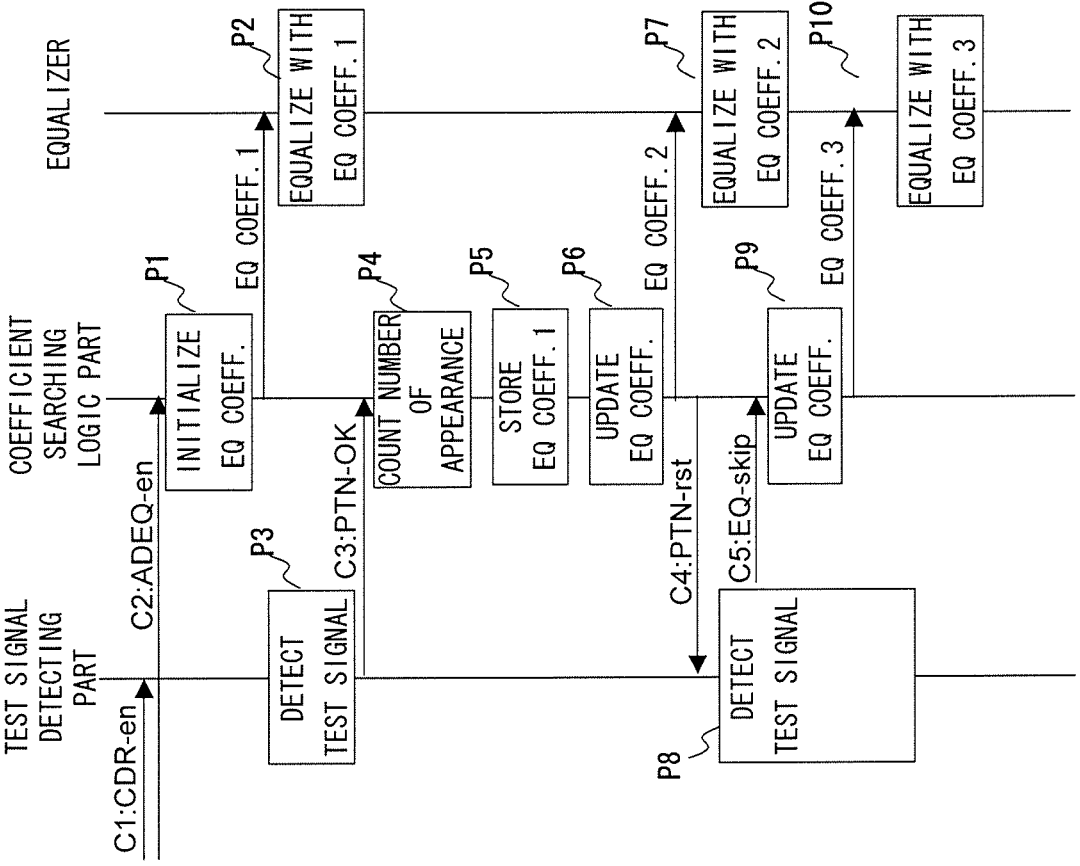

In the example illustrated in FIG. 20A, in response to input of the CDR-en signal and the ADEQ-en signal described above, first, the coefficient searching logic part 232 initializes the equalizer (EQ) coefficient (P1). By this initialization processing, the EQ coefficient 1 corresponding to an EQ coefficient number 1 is set to the equalizer 103 as the first EQ coefficient. Then, the equalizer 103 received this setting performs equalization processing applying the EQ coefficient 1 (P2).

In the flowchart illustrated in FIG. 21, processing P1 illustrated in the sequence diagram corresponds to processing of step 331 in which the coefficient searching logic part 232 sets the new equalizer (EQ) coefficient to the equalizer 103. For example, every time this step 331 is executed, the coefficient searching logic part 232 may increment the EQ coefficient number from the initial value sequentially. Further, at this time, the coefficient searching logic part 232 sets the reference voltage of the above-described comparators $221_0$, $221_1$ to the threshold for 0/1 determination. Moreover, in the CDR controlling logic part 244, received data from the demultiplexer $242_D$ are input via the selector 246.

In step 332 illustrated in FIG. 21, based on the received data and boundary data from the demultiplexer $242_B$, CDR processing by the CDR controlling logic part 244 is performed (step 332). Further, the test signal detecting part 231 performs processing of detecting a test signal from the received data (step 333).

In the example of sequence illustrated in FIG. 20A, detection of test signal is succeeded in test signal detection processing (P3) in a state that the EQ coefficient 1 is set to the equalizer 103. Then, a PTN-OK signal indicating that the detection of test signal is succeeded is notified to the coefficient searching logic part 232.

When detection in the test signal detecting part 231 is succeeded thus (affirmative judgment in step 334 of FIG. 21), the CDR processing phase is finished. Then, the optimum coefficient searching phase is started. In the optimum coefficient searching phase, the CDR controlling logic part 244 executes CDR processing based on a test signal input via the selector 246 (step 335). At this time, further, the coefficient searching logic part 232 detects a peak value N of number distribution corresponding to the current EQ coefficient set to the equalizer 103 by performing number counting processing for each range of detection while controlling the reference voltage (step 336).

When the detected peak value N is larger than the maximum peak value Np which has been detected by that time (affirmative judgment in step 337), the maximum peak value Np and an optimum EQ coefficient Ep are updated (step 338). In this step 338, the peak value N detected in step 336 is stored as a new peak value Np. Further, along with this processing, the current EQ coefficient is stored as the optimum EQ coefficient Ep. Here, an initial value 0 is set to the maximum peak value Np when the adaptive equalization operation is started. Therefore, for example, in the sequence diagram illustrated in FIG. 20A, step 337 always results in affirmative judgment for the first peak value N obtained in number counting processing (P4) by the coefficient searching logic part 232. Then, this first peak value N is stored as a new maximum peak value Np. Along with this, update processing (P5) of storing the EQ coefficient number 1 as the optimum EQ coefficient Ep is performed. On the other hand, when step 337 illustrated in FIG. 21 results in negative judgment, step 338 is skipped, and the maximum peak value Np and the optimum EQ coefficient Ep are maintained.

Thereafter, in the flowchart of FIG. 21, it is judged whether counting of number distribution for all EQ coefficients is tried or not (step 339). When still there is an EQ coefficient that is not tried, step 339 results in negative judgment, and processing returns to step 331 to set a new EQ coefficient. Then, again, the CDR processing phase is started. In the example illustrated in FIG. 20A, after update processing (P5) of the optimum EQ coefficient Ep, update processing (P6) of the EQ coefficient is performed. Then, the equalizer 103 which received setting of a new EQ coefficient 2 performs equalization processing (P7) applying this EQ coefficient 2. Further, after update processing (P6) of the EQ coefficient is completed, a PTN-rst signal indicating that the EQ coefficient is updated is notified to the test signal detecting part 231 from the coefficient searching logic part 232. In response to notification of this PTN-rst signal, the test signal detecting part 231 performs detection processing (P8) of test signal again.

Every time the equalizer coefficient of the equalizer 103 is updated in this manner, the CDR processing phase is implemented in advance, and after recovery of the clock signal is completed, the optimum coefficient searching phase can be implemented. Accordingly, it is clearly described that the receiving device which shares the decision latches used as the comparators $221_0$, $221_1$ between the CDR processing and the optimum coefficient searching can be achieved.

Further, in the example of the flowchart illustrated in FIG. 21, when it is judged in step 334 that the detection of test signal is unsuccessful (negative judgment), counting processing in step 335 to step 338 is skipped. Then, in response to judgment in step 339, update of the equalizer coefficient is performed.

Such process corresponds to a sequence as follows in the sequence example of FIG. 20A. In the sequence example of FIG. 20A, in middle of test signal detection processing denoted by symbol P8, an EQ-SKIP signal indicating that the detection of test signal is failed is passed from the test signal detecting part 231 to the coefficient searching logic part 232. Then, upon reception of this EQ-SKIP signal, the coefficient searching logic part 232 performs update processing of the EQ coefficient (P9). Next, equalization processing (P10) applying an EQ coefficient 3 which is newly set in update processing of this EQ coefficient is performed by the equalizer 103. On the other hand, in the test signal detecting part 231, the test signal detection processing (P8) is continued. Therefore, after the EQ coefficient 3 is set to the equalizer 103 in update processing of the EQ coefficient denoted by symbol P9, the test signal detecting part 231 performs the detection of test signal based on an output of the equalizer 103 to which the new EQ coefficient 3 is applied.

Thus, when the detection of test signal is failed, operation to update the equalizer coefficient is performed while continuing the detection of test signal.

Here, while training of the receiving device is performed, the test signal is repeatedly sent from the opposing transmitting device. Therefore, the situation that the detection of test signal is unsuccessful is limited to when equalization processing by the equalizer 103 is obviously inappropriate. Thus, the current equalizer coefficient set to the equalizer 103 this time obviously has low adaptability. Accordingly, by performing the above-described control, wasteful processing on the equalizer coefficient obviously having low adaptability can be omitted. Thus, the time required for the entire adaptive equalization processing can be reduced. Note that the above-described control of skipping counting processing for the equalizer coefficient obviously having low adaptability may also be applied to, for example, a receiving device having the structure illustrated in FIG. 18.

By repeating step 331 to step 339 described above, the number distribution of sampling results can be checked for all the equalizer coefficients excluding the equalizer coefficient obviously having low adaptability. When step 339 results in affirmative judgment, the equalizer coefficient stored as the optimum EQ coefficient Ep is set to the equalizer 103 in step 340.

The example illustrated in FIG. 20B illustrates a situation that the peak value N obtained in number counting processing (P13) by the coefficient searching logic part 232 while equalization processing (P12) applying the EQ coefficient n−1 is performed is largest among all peak values. In this case, the peak value stored corresponding to the EQ coefficient n−1 is larger than the peak value obtained in processing for the last EQ coefficient n denoted by symbols P15 to P18. Therefore, as the optimum EQ coefficient Ep, the EQ coefficient n−1 stored in processing denoted by symbol P14 is maintained (P19). This EQ coefficient n−1 is then set to the equalizer 103 as the final optimum EQ coefficient (P20). After adaptive equalization processing is completed thus, the equalizer 103 performs equalization processing applying the EQ coefficient n−1 (P21).

The adaptive equalization processing of the receiving device illustrated in FIG. 19 is completed thus. Thereafter, the equalizer 103 operates with the equalizer coefficient set in above-described step 340. Further, the reference voltage for the comparators $221_0$, $221_1$ is fixed to the threshold for 0/1 determination.

Next, an embodiment of respective parts included in the embodiment of the receiving device illustrated in FIG. 19 will be described. Any of the test signal generating part 245 included in the CDR logic part 243 and the test signal detecting part 231 and the coefficient searching logic part 232 included in the adaptive controlling logic part 229 can be achieved using a simple logical element.

Figure 22:
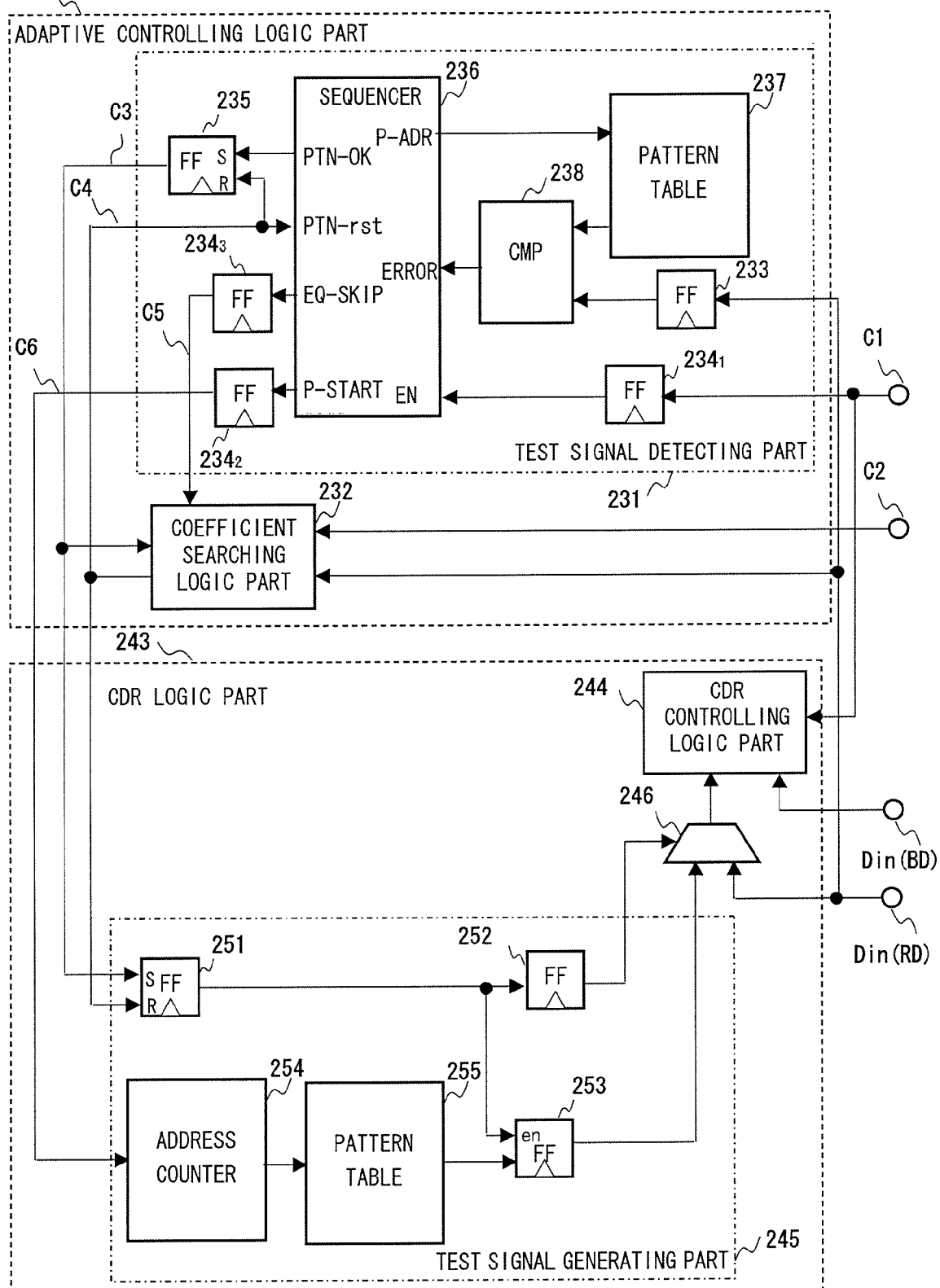
FIG. 22 is a diagram illustrating one embodiment of a test signal detecting part and a test signal generating part.

FIG. 22 illustrates one embodiment of the test signal detecting part and the test signal generating part. Note that among components illustrated in FIG. 22, components equivalent to those illustrated in FIG. 19 are denoted by the same symbols, and descriptions thereof are omitted.

The test signal detecting part 231 illustrated in FIG. 22 includes 8-bit flip flop (FF) 233, three flip flops (FF) $234_1$ to $234_3$, a set-reset flip flop (SR-FF) 235, and a sequencer 236. Note that illustration of clock signals to be input to the FF 233, FF $234_1$ to $234_3$, and SR-FF 235 is omitted in FIG. 22. The test signal detecting part 231 further includes a pattern table 237 and a comparing circuit (CMP) 238. In addition, in the pattern table 237, plural data patterns included in a test signal having a predetermined length are stored.

Further, the test signal generating part 245 illustrated in FIG. 22 includes a SR-FF 251, a FF 252, a FF 253 having an enable terminal en, an address counter 254, and a pattern table 255. Note that illustration of clock signals to be input to the SR-FF 251, FF 252, and FF 253 is omitted in FIG. 22. In addition, in the pattern table 255, plural data patterns included in the above-described test signal are stored.

A CDR-en signal which enables CDR operation is input to the CDR controlling logic part 244 and the test signal detecting part 231 via a terminal C1 illustrated in FIG. 22. In the test signal detecting part 231, this CDR-en signal is input to a control input terminal EN of the sequencer 236 via the FF $234_1$. Further, an ADEQ-en signal which enables adaptive control of the equalizer is input to the coefficient searching logic part 232 via a terminal C2.

Further, boundary data BD output from the DEMUX $242_B$ illustrated in FIG. 19 are input to the CDR controlling logic part 244 via a data input port Din(BD) illustrate in FIG. 22. To a data input port Din(RD), received data RD output from the DEMUX $242_D$ illustrated in FIG. 19 are input. The received data RD are input to the test signal detecting part 231, the coefficient searching logic part 232, and the CDR logic part 243. In the CDR logic part 243 illustrated in FIG. 22, the received data RD is input to the CDR controlling logic part 244 via the selector 246. Further, in the test signal detecting part 231, the received data RD are input to the CMP 238 via the FF 233. The CMP 238 compares the received data RD with a data pattern stored in the pattern table 236. The CMP 238 may compare the received data RD with, for example, the data pattern stored in the pattern table 237 corresponding to a pattern address specified by the sequencer 236. A comparison result from this CMP 238 is input to an input terminal ERROR of the sequencer 236. The sequencer 236 performs detection processing of test signal based on the comparison result input from the CMP 238.

Figure 23:
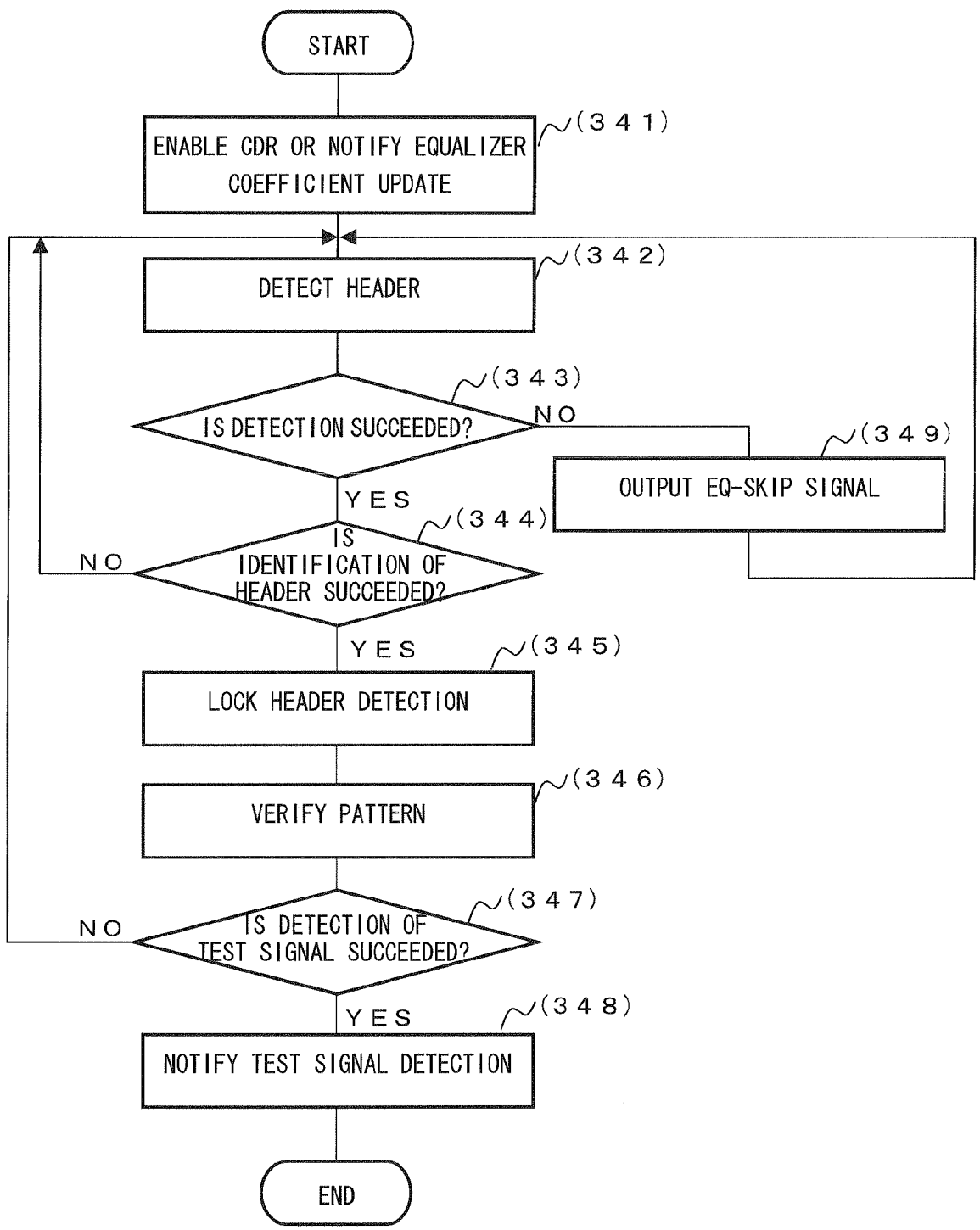
FIG. 23 is a flowchart representing test signal detecting operation.

FIG. 23 illustrates a flowchart representing operation of detecting a test signal. The flowchart illustrated in FIG. 23 illustrates an example of processing for stably detecting from a header arranged at the head of the test signal to the end thereof, when the test signal having a predetermined length is input repeatedly.

First, the sequencer 236 starts operation when CDR processing is enabled by the above-described CDR-en signal (step 341). Next, the sequencer 236 monitors, for example, output of the CMP 238 across a predetermined period corresponding to the iterative period of the test signal, so as to detect the header of the test signal (step 342). At this time, by the sequencer 236, for example, the pattern address specifying the header of the test signal is set to the pattern table 237. Accordingly, the header output from the pattern table 237 and the received data are verified by the CMP 238.

When a match between the received data and the data pattern corresponding to the header of the test signal is indicated by the output of the CMP 238, the sequencer 236 judges that the detection of header is succeeded (affirmative judgment in step 343).

In response to affirmative judgment in step 343, the sequencer 236 judges whether identification of the header is succeeded or not (step 344). For example, the sequencer 236 judges that identification of the header is succeeded when the above-described detection of header is succeeded $n_h$ times at time intervals corresponding to an iterative period of the test data (affirmative judgment in step 344). When step 344 results in negative judgment, processing returns to step 342 to perform the detection of header again.

On the other hand, when step 344 results in affirmative judgment, the sequencer 236 locks the header detection (step 345). Accordingly, in processing thereafter, the head of the iterative period of the test signal is fixed to the detection timing of the header identified in step 344. Next, the sequencer 236 verifies the data pattern of the test signal with the received data (step 346). At this time the sequencer 236 sets, for example, the pattern addresses specifying respective data patterns contained in the test signal to the pattern table 237 sequentially via an output terminal P-ADR. Thus, the CMP 238 can receive a data pattern as a verification target from the pattern table 237 in synchronization with input of the received data RD.

When the verification processing in step 346 is not succeeded, the sequencer 236 judges that the detection of test signal is failed (negative judgment in step 347). In this case, the sequencer 236 returns to step 342 to perform the detection processing of test signal again from the detection of header. On the other hand, when the above-described verification processing is succeeded $n_d$ times consecutively, the sequencer 236 judges that the detection of test signal is succeeded (affirmative judgment in step 347).

When this step 347 results in affirmative judgment, the sequencer 236 notifies the success of the detection of test signal to the test signal generating part 245 and the coefficient searching logic part 232 via the above-described path C3 (step 348). In the example of the test signal detecting part 231 illustrated in FIG. 22, a notification of the success of the detection of test signal is transmitted by operation as follows. First, in response to affirmative judgment in above-described step 347, the sequencer 236 inputs "1" to a set terminal of the SR-FF 235 via an output terminal PTN-OK. In response to this, by setting an output of the SR-FF 235 to "1", success of the detection of test signal is indicated. This output of the SR-FF 235 is transmitted to the test signal generating part 245 and the coefficient searching logic part 232 via the path C3.

Incidentally, when the header is not detected in the predetermined period in above-described step 342 (negative judgment in step 343), the sequencer 236 judges that the header detection is failed. In this case, processing proceeds to step 349. In step 349, the sequencer 236 outputs, for example, an EQ-SKIP signal of one-shot pulse via an output terminal EQ-SKIP for example. This EQ-SKIP signal is transmitted to the coefficient searching logic part 232 via the FF $234_3$ and a path C5 as a signal instructing update of the equalizer coefficient. The sequencer 236 returns to step 342 after the processing in step 349 is finished, and performs the detection processing of test signal from the header detection processing again.

Here, after the success of the detection of test signal is notified in step 348, the test signal detection processing by the sequencer 236 is finished once. Thereafter, when the equalizer coefficient is updated from the coefficient searching logic part 232, this update is notified to a control input terminal PTN-rst of the sequencer 236 via the above-described path C4. At this time, the sequencer 236 starts the test signal detection processing from above-described step 341 again. Further, in the test signal detecting part 231 illustrated in FIG. 22, the above-described path C4 is coupled to a reset terminal of the SR-FF 235. Therefore, the output of this SR-FF 235 is reset in response to the notification of the update of the equalizer coefficient.

In this manner, by the sequencer 236 illustrated in FIG. 22 controlling set/reset of the SR-FF 235 as described above, the PTN-OK signal indicating whether the detection of test signal is succeeded stably or not can be generated.

This PTN-OK signal is input to a set terminal of the SR-FF 251 provided in the test signal generating part 245 illustrated in FIG. 22 via the above-described path C3. Further, to a reset terminal of this SR-FF 251, the notification of the update of equalizer coefficient is input via the above-described path C4. Then, an output of this SR-FF 251 is input to a switching controlling terminal of the selector 246 via the FF 252. Further, the FF 253 illustrated in FIG. 22 turns to an enable state when an output of the SR-FF 251 is "1".

The address counter 254 of the test signal generating part 245 illustrated in FIG. 22 receives a P-START signal indicating start timing of the test signal from the sequencer 236. For example, the sequencer 236 may output the P-START signal indicating the header detection timing locked in step 345 illustrated in FIG. 23. This P-START signal is transmitted to the address counter 254 of the test signal generating part 245 via the FF $234_2$ and the path C6. Then, based on timing indicated by this P-START signal, the address counter 254 sequentially generates addresses indicating respective data patterns included in the test signal stored in the pattern table 255. Based on the addresses generated in this manner, the pattern table 255 sequentially outputs the respective data patterns included in the test signal.

The data patterns output from this pattern table 255 are input to one of input terminals of the selector 246 via the FF 253 which becomes enable in response to the above-described PTN-OK signal.

Thus, in the test signal generating part 245 illustrated in FIG. 22, the test signal synchronized with the received data can be generated by the address counter 254 and the pattern table 255 in response to success in detection of test signal.

The selector 246 illustrated in FIG. 22 selectively inputs the test signal generated by the test signal generating part 245 to the CDR controlling logic part 244 when "1" is input to the switching controlling terminal of this selector 246.

In addition, to a high speed interface unit to which the receiving device of the disclosure of the present application is applied, a logic circuit having a function to detect a test signal and a logic circuit having a function to generate a test signal are already mounted for product test, or the like. Therefore, the logic circuits already mounted in the high speed interface unit may be used as the test signal detecting part 231 and the test signal generating part 245 described above.

Thus, there is substantially no increase in circuit scale by adding the test signal detecting part 231 and the test signal generating part 245 illustrated in FIG. 19. The coefficient searching logic part 232 may also be achieved by a circuit scale which is substantially equal to the adaptive controlling logic part 229 illustrated in FIG. 18.

Figure 24:
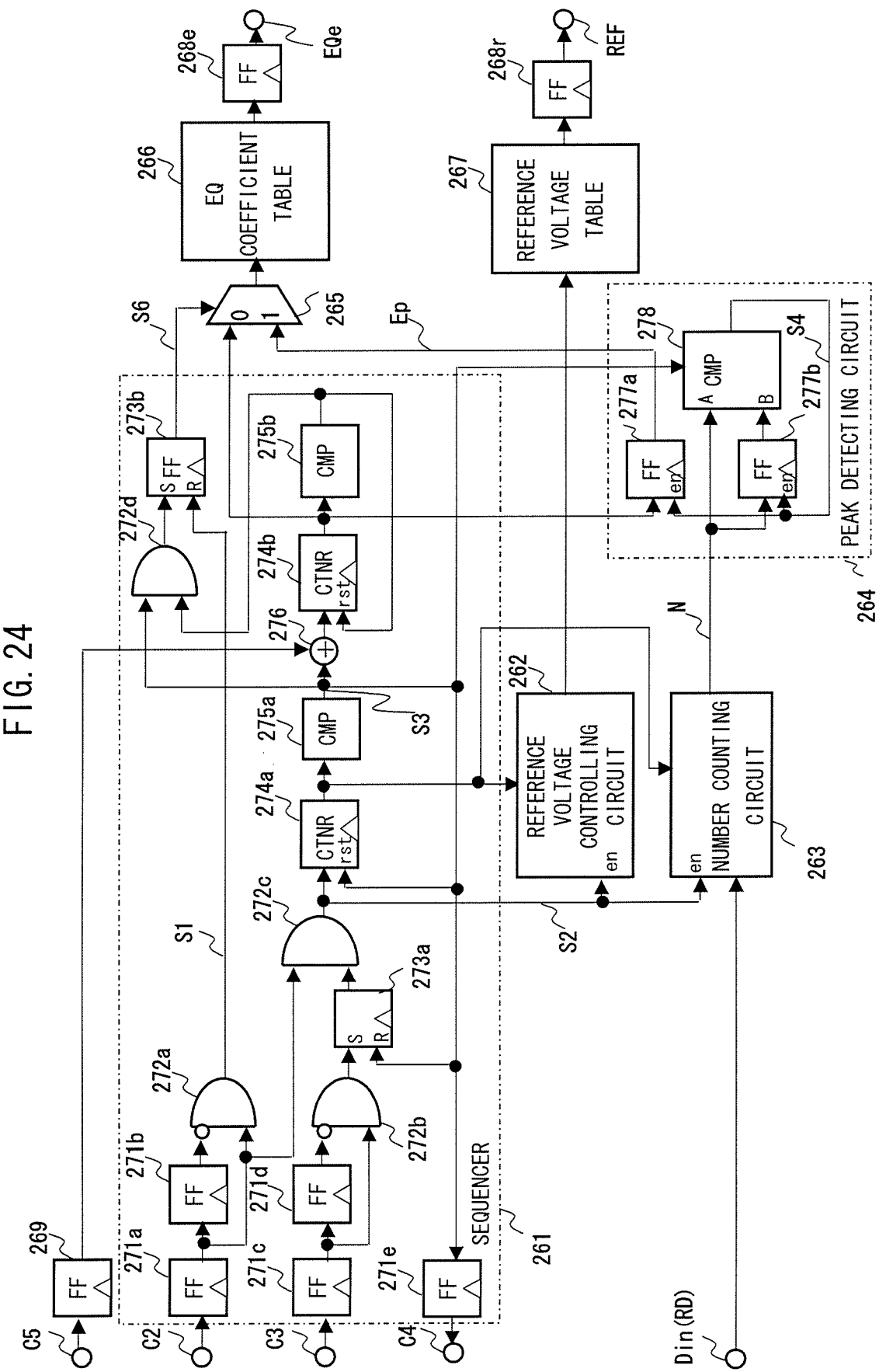
FIG. 24 is a diagram illustrating one embodiment of a coefficient searching logic part.
Figure 25:
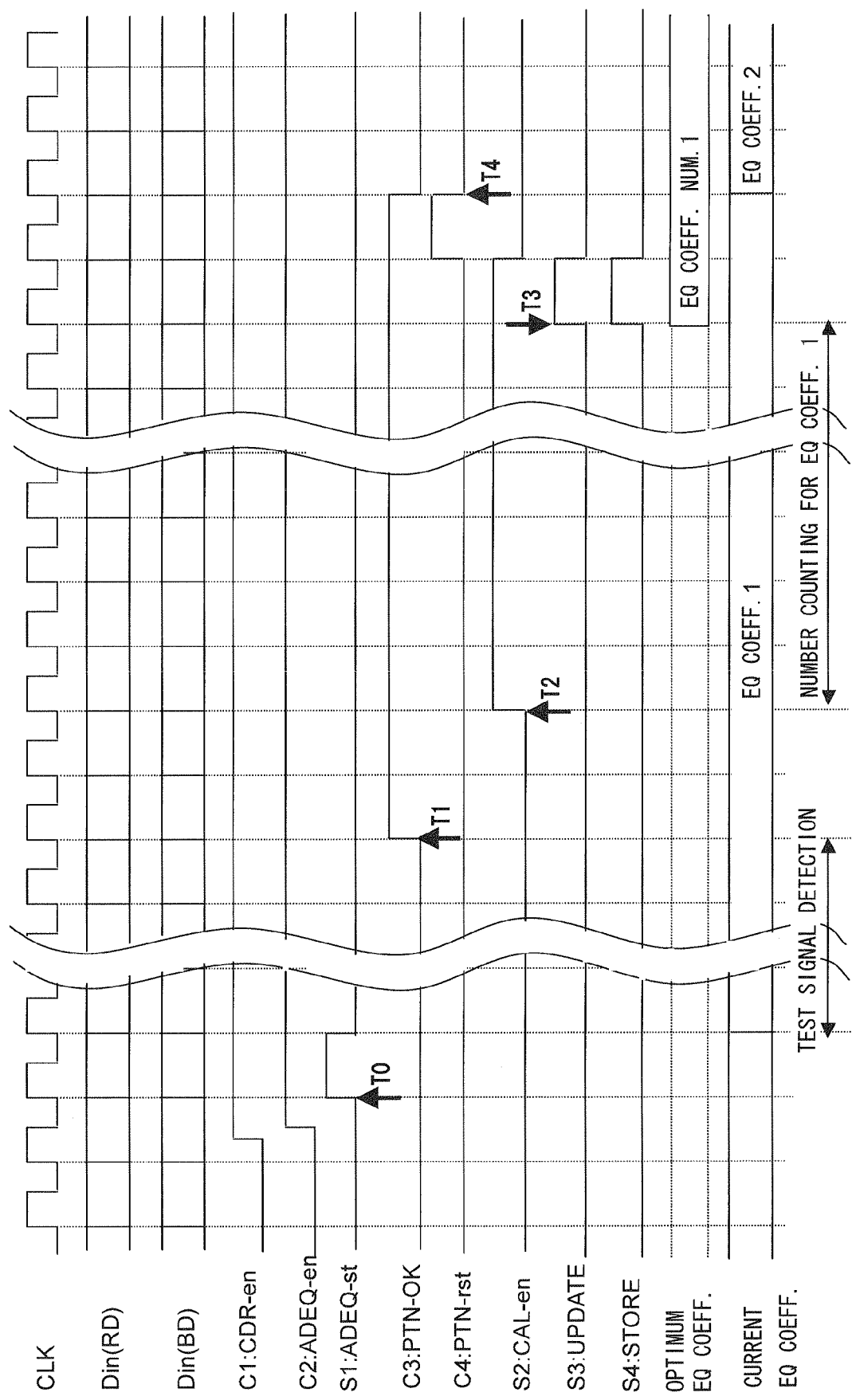
FIG. 25 is a timing chart (part 1) describing coefficient searching operation.
Figure 26:
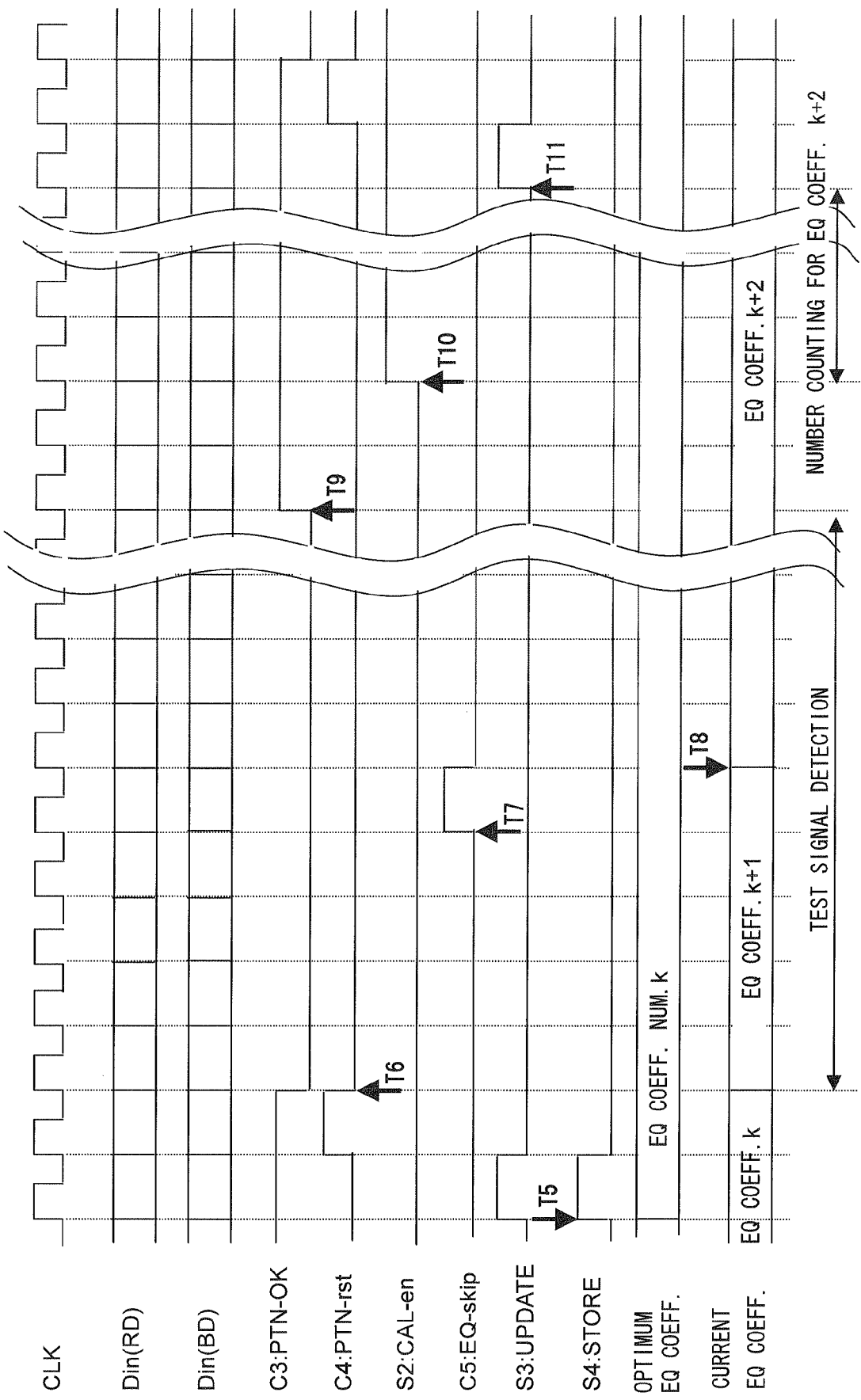
FIG. 26 is a timing chart (part 2) describing the coefficient searching operation.
Figure 27:
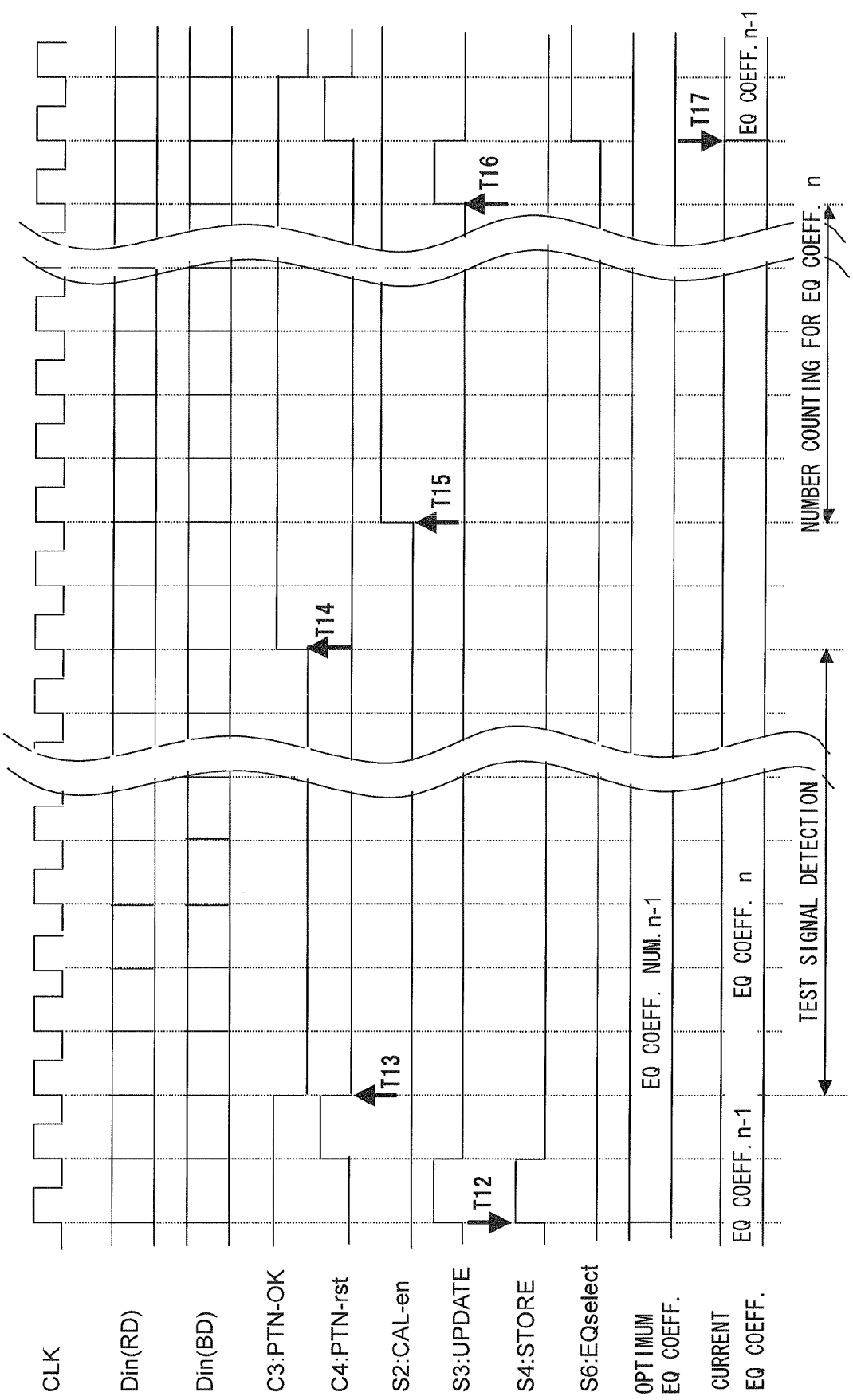
FIG. 27 is a timing chart (part 3) describing the coefficient searching operation.

FIG. 24 illustrates one embodiment of the coefficient searching logic part. Note that among components illustrated in FIG. 24, components equivalent to those illustrated in FIG. 22 are denoted by the same symbols, and descriptions thereof are omitted. Further, FIG. 25 to FIG. 27 illustrate timing charts describing processing of searching for a coefficient.

The coefficient searching logic part 232 illustrated in FIG. 24 has a sequencer 261, a reference voltage controlling circuit 262, a number counting circuit 263, and a peak detecting circuit 264. This coefficient searching logic part 232 further has a selector 265, an equalizer (EQ) coefficient table 266, a reference voltage table 267, a FF 268*e* used for outputting the equalizer coefficient, a FF 268*r* used for outputting the REF controlling code, and another FF 269.

The reference voltage controlling circuit 262 illustrated in FIG. 24 generates an address specifying the REF controlling code based on a control signal from the sequencer 261. The REF controlling code is used for setting the reference voltage indicating the range of detection or the threshold for 0/1 determination. The address generated in the reference voltage controlling circuit 262 is input to the reference voltage table 267. Then, in response to input of this address, the REF controlling code is read out from the reference voltage table 267. The read REF controlling code is output from an output port REF via the FF 268*r*. This REF controlling code is further input to the reference voltage generator 215 illustrated in FIG. 19. The reference voltage generator 215 at the time the REF controlling code corresponding to the threshold for 0/1 determination is input operates as an example of a threshold-level generating part. Therefore, by the reference voltage controlling circuit 262 selectively outputting the REF controlling code corresponding to the range of detection and the REF controlling code corresponding to the threshold for 0/1 determination, the reference voltage to be input from the reference voltage generator 215 to the decision latches 221 is switched. That is, the circuit structure combining the reference voltage generator 215 and the reference voltage controlling circuit 262 is an example of a reference switching part.

Further, the number counting circuit 263 illustrated in FIG. 24 performs counting processing based on the received data RD input via the input port Din (RD) and the control signal from the sequencer 261. By this number counting circuit 263, the peak value of number distribution of sampling results are obtained as counting results corresponding to each equalizer coefficient. The obtained peak value is input to the peak detecting circuit 264.

Further, the sequencer 261 illustrated in FIG. 24 includes five FFs 271*a* to 271*e*, four AND gates 272*a* to 272*d*, and two SR-FFs 273*a*, 273*b*. Moreover, this sequencer 261 includes two counters (CTNR) 274*a*, 274*b*, and two comparators (CMP) 275*a*, 275*b*. Further, the peak detecting circuit 264 illustrated in FIG. 24 includes two FFs 277*a*, 277*b* and a comparator (CMP) 278. Note that illustration of clock signals to be input to the above-described circuit elements are omitted in the example illustrated in FIG. 24.

To an input terminal of the FF 271*a* illustrated in FIG. 24, the ADEQ-en signal is input via the above-described input terminal C2. Then, this FF 271*a*, and the FF 271*b* and the AND gate 272*a* in the subsequent stage generate an ADEQ-st signal (S1). To the AND gate 272*a*, an output of the FF 271*a* and an inverted output of the FF 271*b* are input. Therefore, the ADEQ-st signal (S1) becomes a one-shot pulse responding to rising of the ADEQ-en signal.

In the timing chart illustrated in FIG. 25, the rising timing of the ADEQ-en signal is asynchronous with a clock signal CLK synchronized with the received data RD and the boundary data BD. The ADEQ-st signal (S1) generated by the above-described FFs 271*a*, 271*b* and the AND gate 272*a* in response to input of such ADEQ-en signal becomes a one-shot pulse synchronized with the clock signal CLK at time T0.

This ADEQ-st signal (S1) is input to a reset terminal of the SR-FF 273*b* illustrated in FIG. 24. Therefore, in response to rising of the ADEQ-st signal (S1), an output of this SR-FF 273*b* is reset. The output of this SR-FF 273*b* (S6) is input to the selector 265 as a switching signal EQ-SELECT. When the switching signal EQ-SELECT is "0", the selector 265 illustrated in FIG. 24 selectively inputs to the EQ coefficient table 266 an output of the counter 274*b* which is input to an input terminal 0. Further, at the timing the above-described SR-FF 273*b* is reset, the FFs 268*e*, 268*r* and the FFs 277*a*, 277*b* provided in the peak detecting circuit 264 are cleared. Thereafter, the equalizer coefficient output from this EQ coefficient table 266 is output from an output port EQe via the FF 268*e*. The equalizer coefficient output in this manner is set to the equalizer 103.

In the example illustrated in FIG. 25, the EQ coefficient 1 corresponding to the initial value of the counter 274*b* is output from the output port EQe one clock later than time T0 at which the ADEQ-st signal (S1) rises. The above-described test signal detecting part 231 may start detecting operation of test signal after the EQ coefficient 1 is set to the equalizer 103 in this manner.

Further, in the example of FIG. 24, an input terminal of the FF 271*c* provided in the sequencer 261 is coupled to the above-described path C3. Then, this FF 271*c*, and the FF 271*d* and the AND gate 272*b* in the subsequent stage generate a one-shot pulse responding to rising of the PTN-OK signal input via the path C3.

An output of the above-described AND gate 272*b* is input to a set terminal of the SR-FF 271*a*. An output of this SR-FF 273*a* is input to one of input terminals of the AND gate 272*c*. To the other input terminal of the AND gate 272*c*, the output of the above-described FF 271*a* is input. Therefore, when the SR-FF 273*a* is set by the one-short pulse responding to rising of the PTN-OK signal, either of inputs to the AND gate 273*c* becomes "1". Thus, after the adaptive equalization control is enabled by the ADEQ-en signal, an output of the AND gate 273e changes to "1" in response to rising of the PTN-OK signal indicating success in detection of test signal. In the description below, this output of the AND gate 273c will be referred to as CAL-en signal. Further, this CAL-en signal is denoted by symbol 52 in FIG. 24.

In the timing chart illustrated in FIG. 25, when the PTN-OK signal rises at time T1 in response to success in detection of test signal, the CAL-en signal (S2) rises at time T2 which is two clock later than time T1.

This CAL-en signal (S2) is input to enable terminals en of the reference voltage controlling circuit 262 and the number counting circuit 263 illustrated in FIG. 24. Then, in response to rising of the CAL-en signal (S2), the reference voltage controlling circuit 262 and the number counting circuit 263 start reference voltage controlling operation for scanning a range of detection and number counting operation for each range of detection. For example, in the timing chart illustrated in FIG. 25, number counting processing for the EQ coefficient 1 currently set to the equalizer 103 is started in response to rising of the CAL-en signal (S2) at time T2.

Further, a count value of the above-described counter 274a is input as a control signal to the reference voltage controlling circuit 262 and the number counting circuit 263 illustrated in FIG. 24. For example, the reference voltage controlling circuit 262 may determine the timing or the like of switching the reference voltage for scanning the range of detection based on the received count value. Similarly the number counting circuit 263 may determine the timing of changing the reference voltage based on the received count value. Then, according to the result of this determination, number counting of each range of detection is performed.

Further, the counter 274a illustrated in FIG. 24 performs counting operation in synchronization with the clock signal CLK across a period in which the CAL-en signal (S2) maintains "1". The count value of this counter 274a is compared by the comparator 275a with a predetermined number M corresponding to a scanning period for a range of detection. When the count value of the counter 274a becomes equal to the predetermined value M, the output of the comparator 275a (S3) becomes "1". This output of the comparator 275a (S3) is input to a reset terminal of the above-described counter 274a. Accordingly, the output of the comparator 275a (S3) becomes a one-short pulse, which becomes "1" only for one clock in response to passing of the above-described scanning period.

This output of the comparator 275a (S3) is input to the counter 274b via an adder 276 as an UPDATE signal instructing update of the equalizer coefficient. This counter 274b counts pulses output from the adder 276. The EQ coefficient number indicated by a count value of this counter 274b is input to the input terminal 0 of the above-described selector 265, and also input to the FF 277a of the peak detecting circuit 264.

Further, at the timing the above-described UPDATE signal is "1", the comparator 278 of the peak detecting circuit 264 compares a counting result from the number counting circuit 263 with data stored in the FF 277b. At this time, the counting result from the number counting circuit 263 indicates the peak value N corresponding to the current EQ coefficient. Then, the comparator 278 compares this peak value N with the maximum peak value Np up to this point, which is stored in the FF 277b. An output of this comparator 278 (S4) is input as a STORE signal to enable terminals of the FFs 277a, 277b. Therefore, the FFs 277a, 277b turn to an enable state when the above-described STORE signal indicates that the peak value N corresponding to the current EQ coefficient is larger than the maximum peak value Np. Then, at this time, the count number indicating the current EQ coefficient indicated by the count value of the counter 274b and a new peak value N are stored in the FFs 277a, 277b, respectively.

In the timing chart illustrated in FIG. 25, the STORE signal becomes "1" in response to rising of the UPDATE signal at time T3. Then, in response to this STORE signal, an EQ coefficient number 1 corresponding to the current EQ coefficient is stored in the FF 277a as an EQ coefficient number indicating the optimum EQ coefficient Ep.

Further, in the sequencer 261 illustrate in FIG. 24, the output of the SR-FF 273a is reset by the above-described UPDATE signal. Accompanying this, the CAL-en signal (S2) changes to "0". In response to this change in the CAL-en signal (S2), counting operation of the counter 274a as well as operation of the reference voltage controlling circuit 262 and the number counting circuit 263 are inhibited. Further, the above-described UPDATE signal is input to the FF 271e. Then, an output of this FF 271e is transmitted to the test signal detecting part 231 and the test signal generating part 245 as the PTN-rst signal via the path C4.

The timing chart illustrated in FIG. 25 illustrates that the UPDATE signal is delayed by one clock and output as the PTN-rst signal by the FF 271e. Accordingly, the PTN-OK signal is reset at time T4 which is two clocks later than rising of the UPDATE signal. Thus, the timing to start detection of test signal and timing to update the current EQ coefficient output from the output port EQe are matched.

The sequencer 261 illustrated in FIG. 24 includes a circuit structure to increment the counter 274b in response to the EQ-SKIP signal. Thus, processing of skipping the number counting processing for the corresponding EQ coefficient in response to failure in detection of test signal is achieved.

The EQ-SKIP signal generated in the test signal detecting part 231 in response to failure in detection of test signal is input to the adder 276 via the FF 269 having an input coupled to the path C5. The counter 274b performs counting operation based on an output of this adder 276. Therefore, the count value of the counter 274b is added up in response to arrival of the EQ-SKIP signal, similarly to when the pulse from the above-described comparator 275a arrives.

In the example illustrated in FIG. 26, after the new EQ coefficient number k+1 is set at time T6, in response to the EQ-SKIP signal arriving at time T7 the EQ coefficient is updated to EQ coefficient number k+2 at time T8. In this case, the test signal detection processing is continued regardless of the update of the EQ coefficient. That is, at time T8 and thereafter, the test signal is detected from received data obtained from an output of the equalizer 103 to which EQ coefficient k+2 is applied.

Here, in the example of FIG. 26, when the EQ coefficient number indicating the EQ coefficient is updated from the EQ coefficient number k to the EQ coefficient number k+1 in response to the UPDATE signal, the EQ coefficient number k is stored in the above-described FF 277a at time T5 as the EQ coefficient number indicating the optimum EQ coefficient Ep. This optimum EQ coefficient Ep and the maximum peak value Np stored correspondingly in the FF 277b are maintained as they are regardless of processing accompanying input of the above-described EQ-SKIP signal. Then, in response to rising of the PTN-OK signal at time T9, number counting processing for the EQ coefficient k+2 is started at time T10. When the peak value N obtained in this number counting processing is equal to or less than the above-described maximum Np, the STORE signal remains to be "0" and does not change regardless of a change in the UPDATE signal illustrated at time T11 of FIG. 26. In such case, processing for the next EQ coefficient is started while maintaining the EQ coefficient number k as the EQ coefficient number indicating the optimum EQ coefficient Ep.

Further, there is included a circuit structure to switch the selector 265 using the sequencer 261 and the output of the comparator 275b illustrated in FIG. 24. With this circuit structure, processing of setting the optimum EQ coefficient Ep to the equalizer 103 after completion of number counting processing for all the EQ coefficients is achieved.

Upon completion of number counting processing for the last EQ coefficient n, the count value of the counter 274a becomes "n+1" in response to a change in the UPDATE signal. At this time, the comparator 275b changes the output to "1" to indicate that the count value of the counter 274a has exceeded the total number n of EQ coefficients. At this time, an output of the AND gate 272d to which both the outputs of the two comparators 275a, 275b are input becomes "1". Then, in response to this change in output of the AND gate 272d, the output of the SR-FF 273b (S6) is set. In this manner, the EQ-SELECT input to the selector 265 is switched to "1" along with determination of the optimum EQ coefficient Ep. After this EQ-SELECT signal is switched, an output of the FF 277a input to an input terminal 1 of the selector 265 is input selectively to the EQ coefficient table 266. That is, the EQ coefficient number indicating the optimum EQ coefficient Ep stored in the FF 277a is input to the EQ coefficient table 266 via the selector 265. Accordingly, the EQ coefficient output from the EQ coefficient table 266 is fixed to the EQ coefficient corresponding to the EQ coefficient number stored in the FF 277a.

In the timing chart illustrated in FIG. 27, in response to changes in UPDATE signal and STORE signal at time T12, the EQ coefficient number n−1 is stored in the FF 277a corresponding to the optimum EQ coefficient Ep. Thereafter, in response to falling of the PTN-rst signal, test signal detection processing in a state that the EQ coefficient n indicated by the EQ coefficient number n is applied to the equalizer 103 is performed from time T13. Then, in response to rising of the PTN-OK signal at time T14, number counting processing for the EQ coefficient n is started from time T15. When the peak value obtained in this number counting processing is equal to or less than the above-described maximum peak value Np stored corresponding to the above-described optimum EQ coefficient Ep, the STORE signal remains to be "0" and does not change regardless of a change in the UPDATE signal illustrated at time T16. Therefore, the EQ coefficient number n−1 stored in the FF 277a at above-described time T12 is maintained as it is. Then, when the EQ-SELECT signal changes to "1" at time T17, the EQ coefficient n−1 corresponding to this EQ coefficient number n−1 is set to the equalizer 103.

As described above, in the coefficient searching logic part 232 as illustrated in FIG. 24, number counting processing for the current EQ coefficient can be performed in response to success in detection of test signal. In the sequencer 261 illustrated in FIG. 24, based on the PTN-OK signal, PTN-rst signal, and EQ-SKIP signal transmitted to/received from the test signal detecting part 231, operation control of the reference voltage controlling circuit 262 and the number counting circuit 263 is performed. As can be seen from FIG. 24, based on these signals, the circuit for generating operation control timings of the reference voltage controlling circuit 262 and the number counting circuit 263 are achieved by several FFs and AND gates. Thus, the coefficient searching logic part 232 used for a receiving device which shares the comparators 221$_{D0}$, 221$_{D1}$ for obtaining received data as illustrated in FIG. 19 can also be achieved with a small-scale circuit.

Note that also in the coefficient searching logic part applied to the receiving device illustrated in FIG. 19, there may be applied control to limit the scanning zone of ranges of detection to the voltage range corresponding to a received signal indicating received data of "1". Such control is achieved by, for example, the number counting circuit 263 selectively performing counting processing when the test signal is "1", using the test signal generated in the test signal generating part.

Next, a method for reducing a time taken for counting processing with respect to individual ranges of detection by the number counting part 113 will be described.

Figure 28:
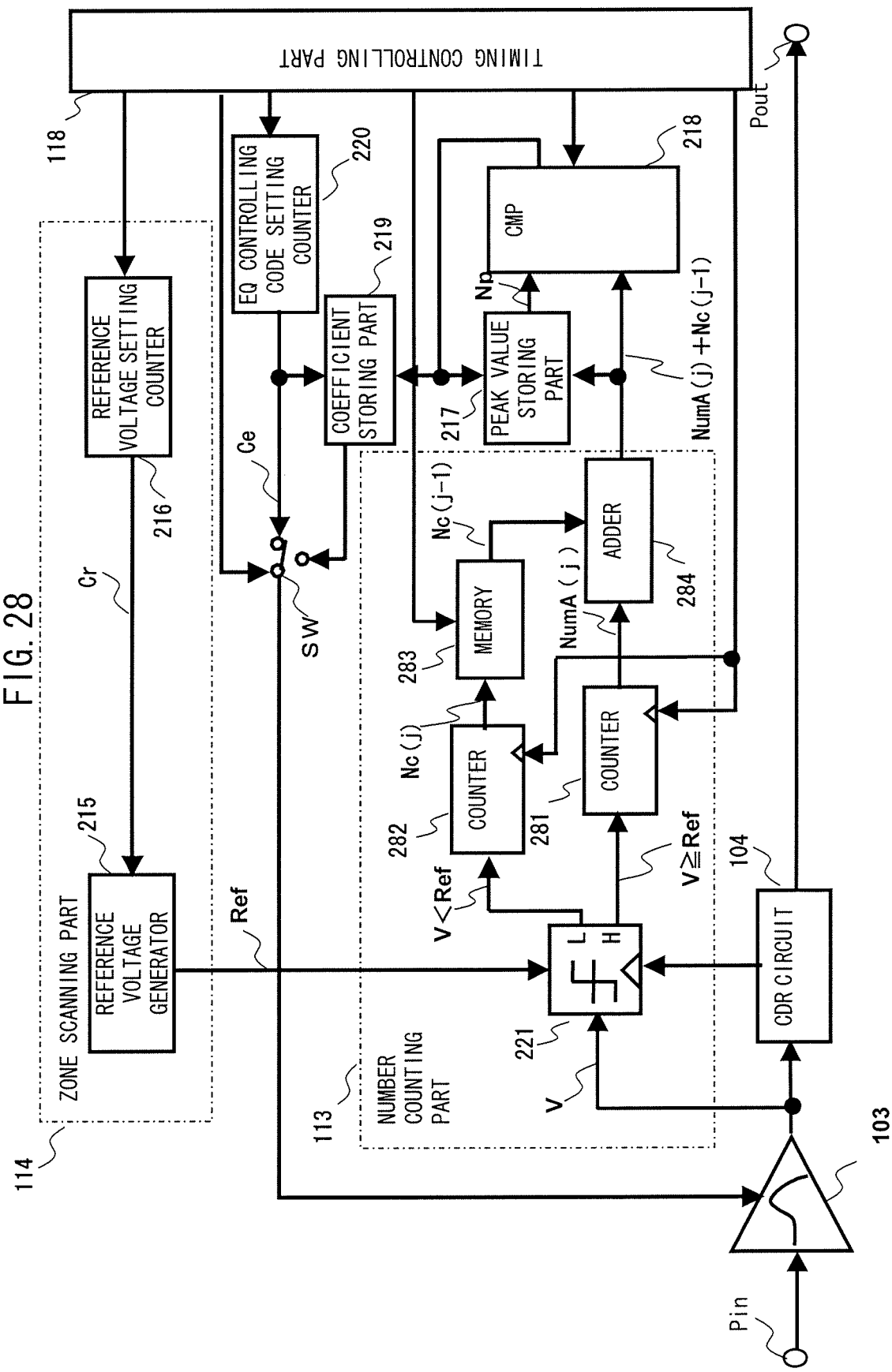
FIG. 28 is a diagram illustrating another embodiment of the number counting part.
Figure 29:
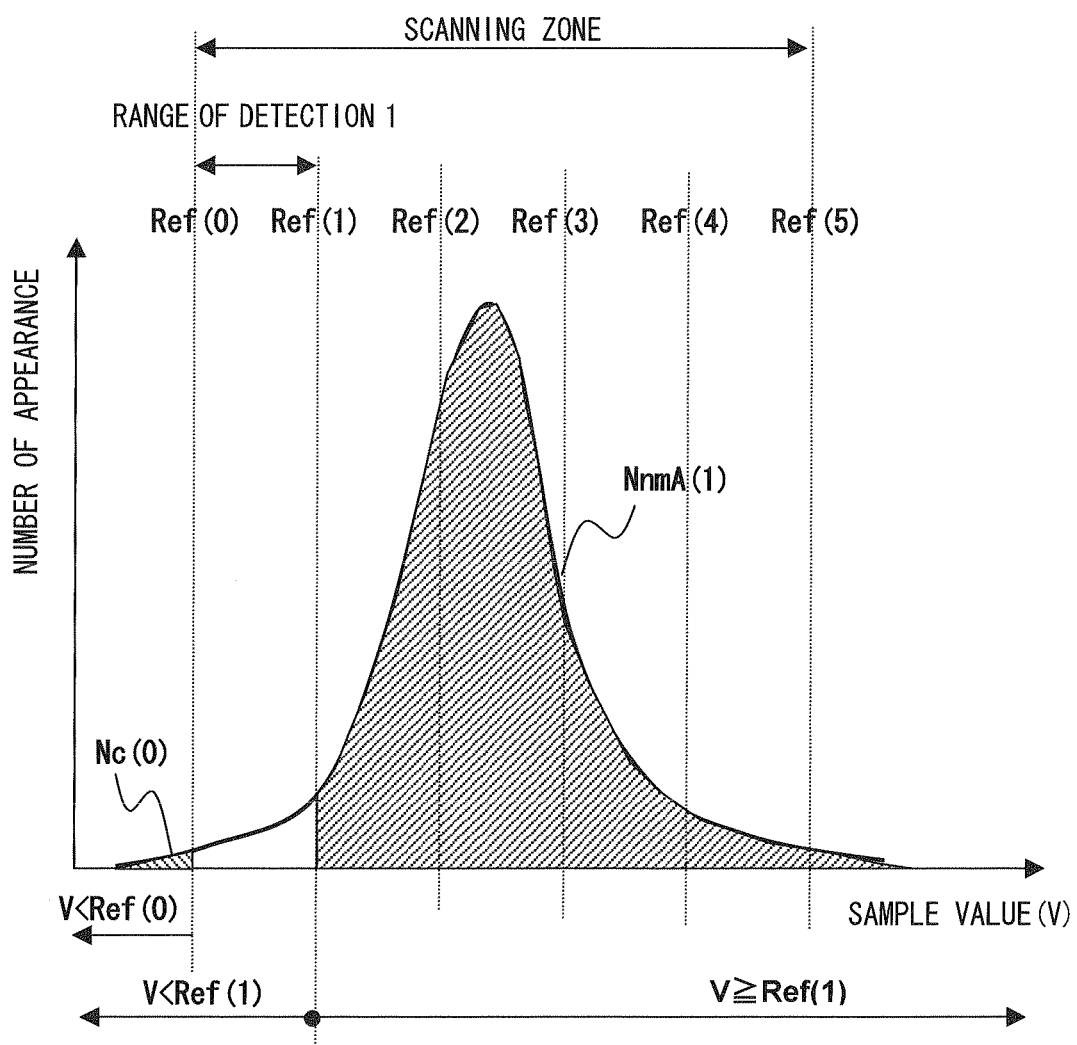
FIG. 29 is a diagram describing number counting processing.

FIG. 28 illustrates another embodiment of the number counting part. Further, FIG. 29 illustrates a diagram describing number counting processing. Note that among components illustrated in FIG. 28, components equivalent to those illustrated in FIG. 14 are denoted by the same symbols, and descriptions thereof are omitted.

The number counting part 113 illustrated in FIG. 28 includes two counters 281, 282, a memory 283, and an adder 284. One output terminal H of a comparator 221 is coupled to an input terminal of the counter 281. Further, the other output terminal L of the comparator 221 is coupled to an input terminal of the counter 282. The comparator 221 illustrated in FIG. 28 outputs logic "H" via the output terminal H when a sample voltage V obtained by sampling the output of the equalizer 103 is equal to or larger than a reference voltage Ref. Further, the comparator 221 outputs logic "H" via the output terminal L when the above-described sample voltage V is smaller than the reference voltage Ref. Therefore, a counting result NumA of the counter 281 is the number of samples equal to or larger than the reference voltage Ref. That is, the counter 281 is an example of an upper counter counting the number of sampling results having a voltage value equal to or larger than the reference voltage Ref. On the other hand, a counting result Nc of the counter 282 is the number of samples smaller than the reference voltage Ref. Therefore, the counter 282 is an example of a lower counter counting the number of sampling results having a voltage value smaller than the reference voltage Ref.

The memory 283 stores the counting result Nc obtained by the counter 282 in response to instruction from the timing controlling part 118. The timing controlling part 118 instructs the memory 283 to store a new counting result Nc obtained by the counter 282 every time the reference voltage Ref is updated, for example. Further, at this time, the memory 283 outputs the counting result Nc stored when counting processing for the previous reference voltage Ref is performed. The adder 284 adds the counting result Nc of the counter 282 in the previous counting period output by this memory 283 and the counting result NumA obtained by the above-described counter 281.

For example, as illustrated in FIG. 29, an example of dividing the scanning zone into five ranges of detection will be described. In the example of FIG. 29, the five ranges of detection are divided by reference voltages Ref(0) to Ref(5). For example, the range of detection 1 is a range sandwiched by the reference voltage Ref(0) and the reference voltage Ref(1).

Then, when the reference voltage Ref(0) is set, the counting result Nc obtained by the counter 282 of FIG. 28 indicates the number of samples with voltage values distributed in the range smaller than the reference voltage Ref(0). Further, when the reference voltage Ref(1) is set, the counting result NumA obtained by the counter 281 of FIG. 28 indicates the number of samples with voltage values distributed in the range equal to or larger than the reference voltage Ref(1).

As can be seen from FIG. 29, the result of adding the counting result Nc(0) of the counter 282 corresponding to the reference voltage Ref(0) and the counting result NumA(1) of the counter 281 corresponding to the reference voltage Ref(1) is the number of samples distributed outside the range of detection 1.

Figure 30:
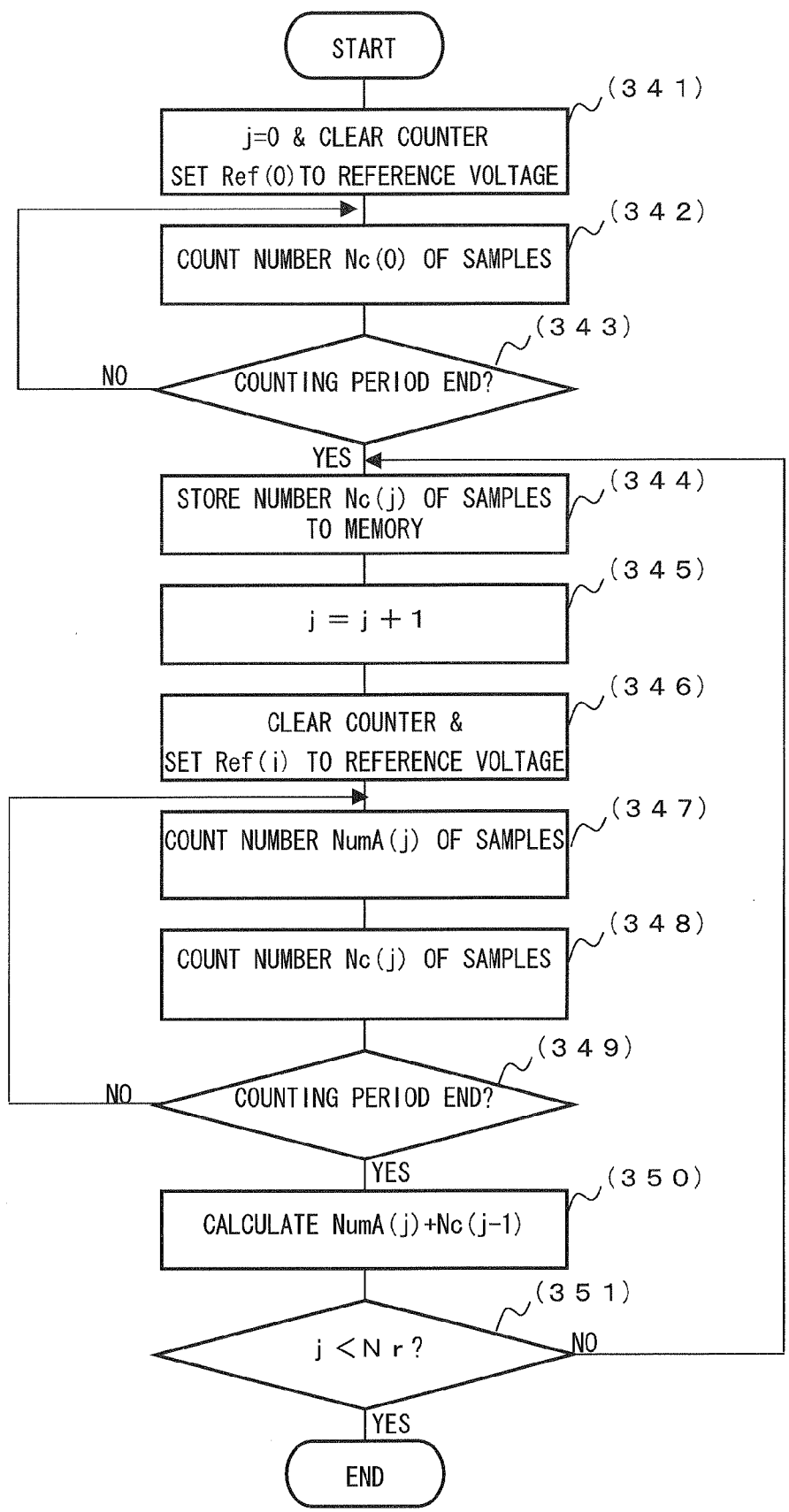
FIG. 30 is a flowchart representing operation of the number counting part.

FIG. 30 illustrates a flowchart representing operation of the number counting part. In addition, the flowchart of FIG. 30 is an example of processing to calculate the number of samples distributed outside each of Nr number of ranges of detection included in the scanning zone.

First, in step 341, the timing controlling part 118 sets the value of a variable j indicating the number of the reference voltage Ref to an initial value 0, and clears the counters 281, 282. Further, the timing controlling part 118 sets the 0-th reference voltage Ref(0) via the zone scanning part 114. The timing controlling part 118 may set, for example, the 0-th reference voltage Ref(0) to the lower limit of the scanning zone.

Next, the counter 282 counts the number of samples smaller than the reference voltage Ref(0) (step 342) until it is judged in step 343 that the counting period is finished. In addition, in the counting period in which the reference voltage Ref(0) is set, also the counter 281 included in the number counting part 113 illustrated in FIG. 28 counts the number of samples having a sample value equal to or larger than the reference voltage Ref(0). However, this counting result is not used in processing which will be described later, and thus is omitted from illustration in the flowchart of FIG. 30.

When the counting period is finished (affirmative determination in step 343), the timing controlling part 118 proceeds to processing of step 344. In step 344, the timing controlling part 118 causes the memory 283 to store the number Nc(j) of samples smaller than the reference voltage Ref(j) obtained as a counting result of the counter 282 (step 344). In addition, since the variable j is the initial value 0 when step 344 is executed for the first time, the number Nc(0) of samples smaller than the reference voltage Ref(0) is stored in the memory 283.

Next, the timing controlling part 118 increments the variable j (step 345). Then, the timing controlling part 118 clears the counters 281, 282 again, and sets the j-th reference voltage Ref(j) via the zone scanning part 114 (step 346).

Accordingly, the counters 281, 282 count the number NumA(i) of samples equal to or larger than the reference voltage Ref(j) and the number Nc(j) of samples smaller than the reference voltage Ref(j) respectively (steps 347, 348) until it is judged that the counting period is finished in step 349. When the counting period is finished (affirmative judgment in step 349), the timing controlling part 118 proceeds to processing of step 350. In step 350, the timing controlling part 118 instructs the memory 283 to output the counting result Nc(j−1) stored in the previous counting period. In response to input of this counting result Nc(j−1) and the number NumA(j) of samples obtained as the counting result of the counter 281, the adder 284 calculates the number NumA(j)+Nc(j−1) of samples distributed outside the range of detection (j). The addition result by this adder 284 is input to the peak value storing part 217 and the comparator 218 illustrated in FIG. 28 as an output of the number counting part 113.

Thereafter, the timing controlling part 118 judges whether or not the above-described variable j is smaller than the number Nr of ranges of detection included in the scanning zone (step 351). When step 351 results in negative judgment, the timing controlling part 118 determines that there is still a range of detection for which number counting processing is not completed, and returns to the processing of step 344.

Then, in the processing of step 344, in response to instruction from the timing controlling part 118, the memory 283 stores the number Nc(j) of samples obtained immediately previously as a counting result of the counter 282. This counting result Nc(j) is used for processing to calculate the number of samples distributed outside this range of detection with respect to the next range of detection.

In this manner, the processing of step 344 to step 351 is repeated, and when the variable j becomes equal to the number Nr of ranges of detection (affirmative judgment in step 351), the timing controlling part 118 judges that the scanning of the ranges of detection is completed and finishes the processing.

Thus, by the number counting part 113 illustrated in FIG. 28, number counting processing with respect to each range of detection included in the scanning zone can be completed by a time equal to Nr+1 times the counting period T. This processing time is quite short as compared to a time equal to 2Nr times the counting period T, which is the processing time when the number counting part 113 illustrated in FIG. 14 is used, and close to the processing time T×Nr when the number counting part 113 including two comparators illustrated in FIG. 4 is used.

Specifically, by the number counting part 113 illustrated in FIG. 28, the circuit scale is reduced by eliminating a comparator, and the time needed for allowing the equalizer coefficient to converge can be reduced to about the same as that when two comparators are used.

Figure 31:
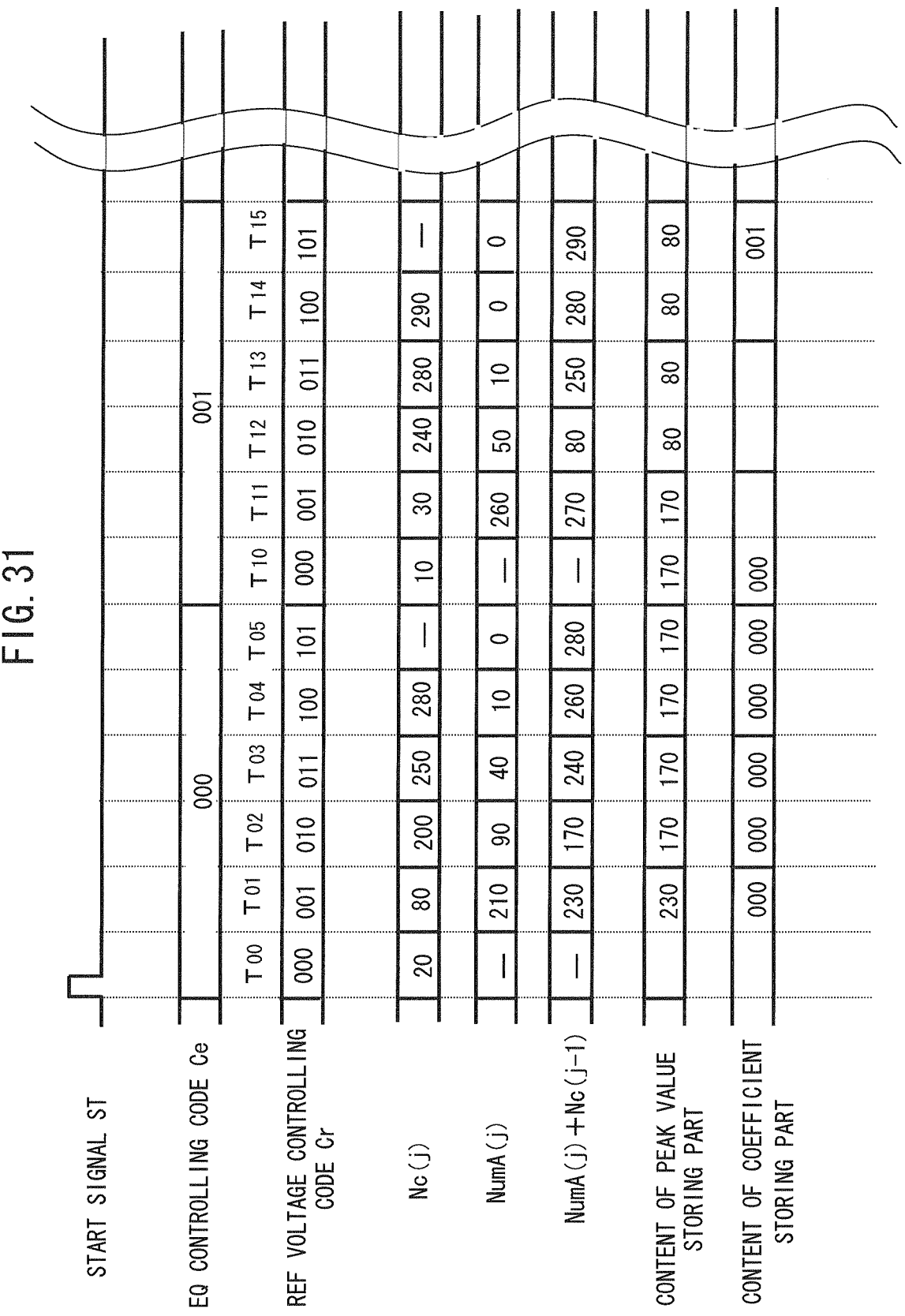
FIG. 31 is a timing chart describing number counting operation.

FIG. 31 illustrates a timing chart describing number counting operation. Here, the example of FIG. 31 illustrates how the number NumA of samples and the number Nc of samples change when number counting processing is performed by dividing the scanning zone into five ranges of detection.

As can be seen from FIG. 31, regarding each EQ controlling code Ce, the period taken for processing by the number counting part 113 illustrated in FIG. 28 to count the number of samples outside each range of detection included in the scanning zone is six times the counting period.

In the example of FIG. 31, in respective counting periods $T_{00}$ to $T_{04}$ of the period corresponding to the EQ controlling code Ce [000], the number Nc(j) of samples obtained from the counter 282 changes as "20", "80", "200", "250", "280". On the other hand, in respective counting periods $T_{01}$ to $T_{05}$, the number NumA(j) of samples obtained from the counter 281 changes as "210", "90", "40", "10", "0". Based on these counting results, the value of the number NumA(j)+Nc(j) of samples outside the range obtained with respect to the ranges of detection (1) to (5) corresponding to the respective counting periods $T_{01}$ to $T_{05}$ changes as "230", "170", "240", "260", "280". Then, the number "170" of samples outside the range obtained corresponding to the counting period $T_{02}$ is stored in the peak value storing part 217 illustrated in FIG. 28. Further, at this time, the EQ controlling code Ce [000] is stored in the coefficient storing part 219 illustrated in FIG. 28.

Likewise, in respective counting periods $T_{10}$ to $T_{14}$ of the period corresponding to the EQ controlling code Ce [001], the number Nc(j) of samples obtained as a counting result of the counter 282 changes as "10", "30", "240", "280", "290". On the other hand, in respective counting periods $T_{11}$ to $T_{15}$, the number NumA(j) of samples obtained as a counting result of the counter 281 changes as "260", "50", "10", "0", "0". Based on these counting results, the value of the number NumA(j)+Nc(j) of samples outside the range obtained with respect to the ranges of detection (1) to (5) corresponding to the respective counting periods $T_{11}$ to $T_{15}$ changes as "270", "80", "250", "280", "290". Then, the number "80" of samples outside the range obtained corresponding to the counting period $T_{12}$ is stored in the above-described peak value storing part 217. Further, at this time, the content of the above-described coefficient storing part 219 is updated using the EQ controlling code Ce [001]. Note that the number of ranges of detection included in the scanning zone is not limited to five illustrated in FIG. 31. For example, the number counting part 113 may perform the above-described number counting processing for each of ranges of detection dividing the scanning zone into more number.

Figure 32:
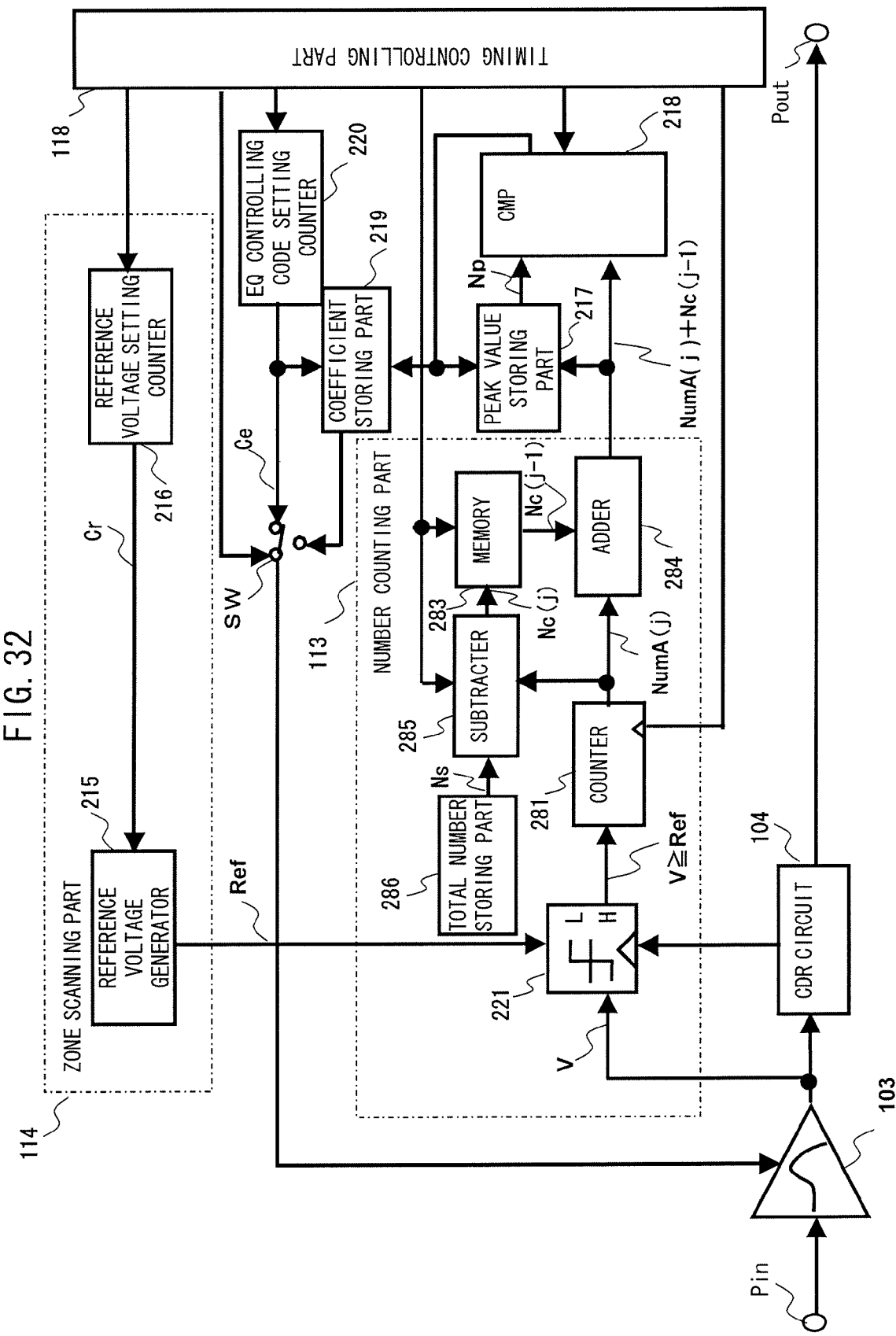
FIG. 32 is a diagram illustrating another embodiment of the number counting part.

FIG. 32 illustrates another embodiment of the number counting part. Note that among components illustrated in FIG. 32, components equivalent to those illustrated in FIG. 28 are denoted by the same symbols, and descriptions thereof are omitted.

The number counting part 113 illustrated in FIG. 32 has a subtracter 285 and a total number storing part 286 instead of the counter 282 illustrated in FIG. 28. The subtracter 285 subtracts the counting result of the counter 281 from the total number Ns of samples stored in the total number storing part 286 in response to instruction from the timing controlling part 118, to thereby obtain the number Nc of samples having a sample value smaller than the reference voltage Ref. Then, the memory 283 illustrated in FIG. 32 outputs the subtraction result stored in the previous counting period every time the subtraction result is obtained by this subtracter 285, and stores a newly obtained subtraction result.

Figure 33:
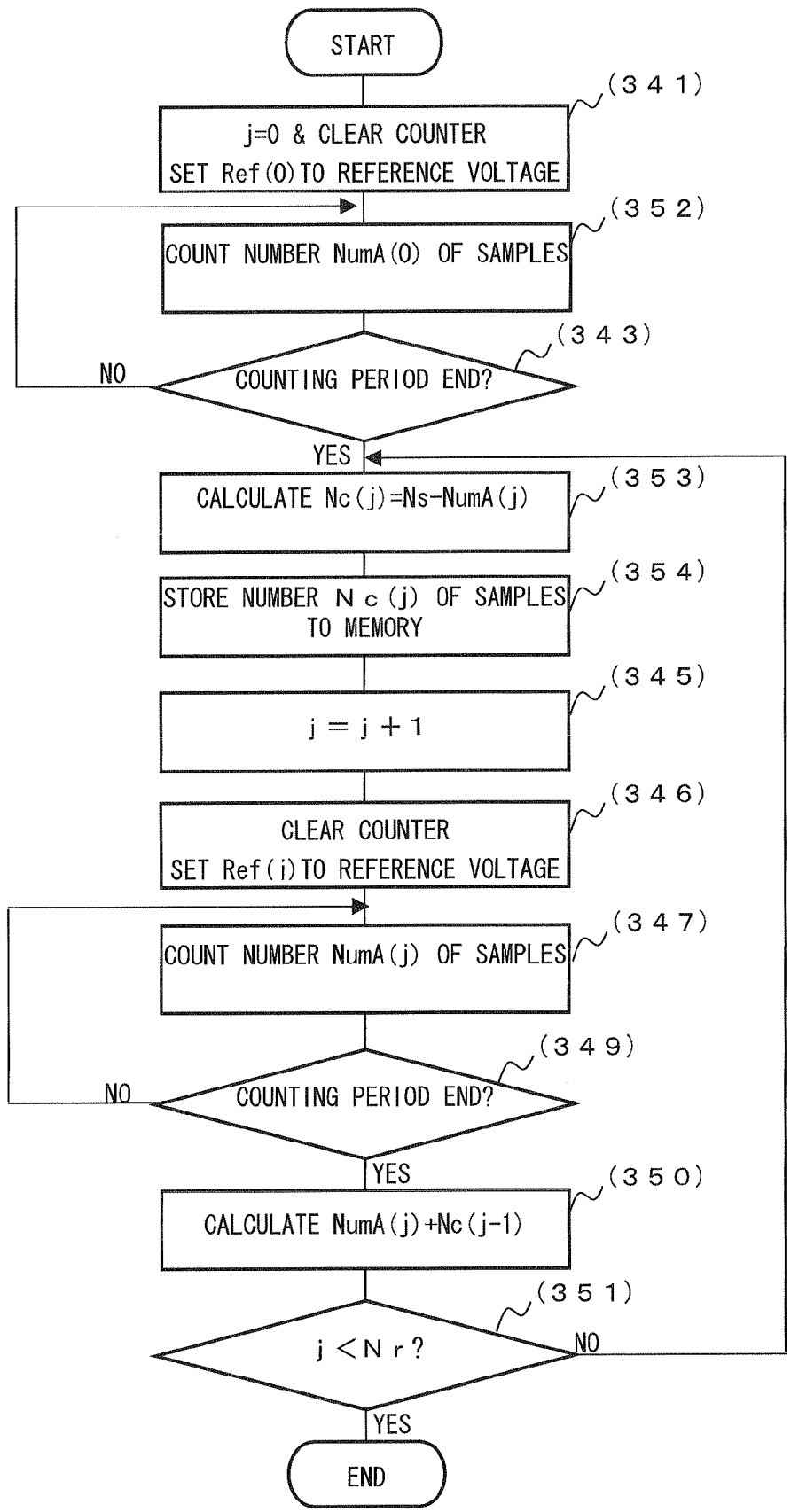
FIG. 33 is a flowchart representing operation of the number counting part.

Further, FIG. 33 illustrates a flowchart representing operation of the number counting part. Note that among steps illustrated in FIG. 33, steps equivalent to those illustrated in FIG. 30 are denoted by the same numerals, and descriptions thereof are omitted.

In the flowchart illustrated in FIG. 33, in step 352 instead of step 342 illustrated in FIG. 30, the counter 281 counts the number NumA(0) of samples having a sample value equal to or larger than the reference voltage Ref(0).

Then, after the counting period finishes (affirmative judgment in step 343), the subtracter 285 subtracts the number NumA(j) of samples obtained as a counting result of the counter 281 from the total number Ns of samples. Thus, the subtracter 285 calculates the number Nc(j) of samples having a sample value smaller than the reference voltage Ref(j) (step 353). Then, in step 354, the memory 283 stores Nc(j) calculated in step 353 instead of the counting result of the counter 282 illustrated in FIG. 28.

In this manner, the number of samples distributed outside each range of detection can be counted by the number counting part 113 including the subtracter 285 and the total number storing part 286 instead of the counter 282.

Since the number counting part 113 illustrated in FIG. 32 uses one counter 281, the amount of wires for the clock signal to the counter, and so on can be reduced. In addition, the point that the counting processing with respect to Nr number of ranges of detection included in the scanning zone can be performed by the time of the counting period T×(Nr+1) is the same as in the number counting part 113 illustrated in FIG. 28.

Similarly, it is possible to reduce the processing time for the number counting part 113 to count the number of samples distributed inside each range of detection using one comparator 221.

Figure 34:
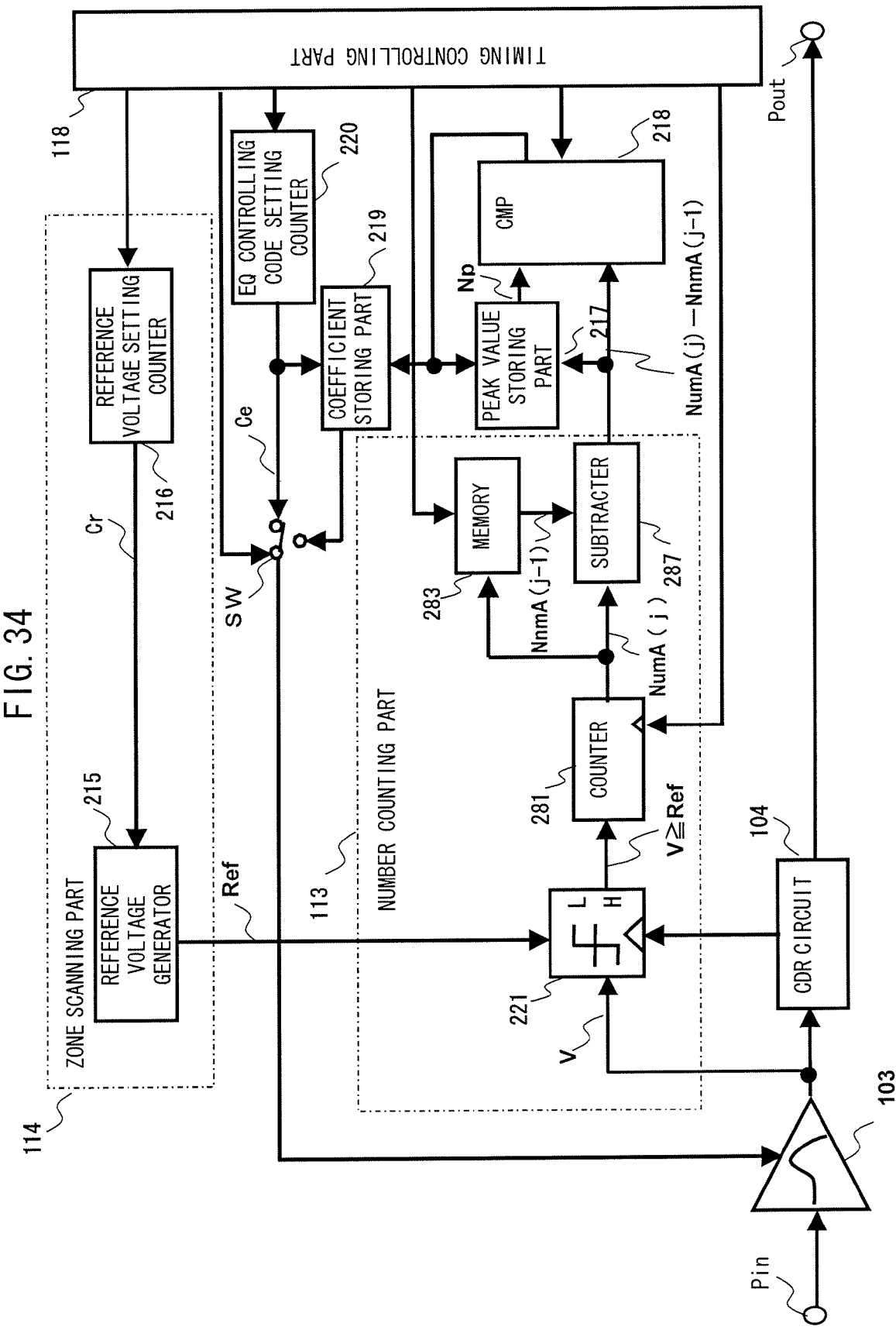
FIG. 34 is a diagram illustrating another embodiment of the number counting part.

FIG. 34 illustrates another embodiment of the number counting part. Note that among components illustrated in FIG. 34, components equivalent to those illustrated in FIG. 28 are denoted by the same symbols, and descriptions thereof are omitted.

The number counting part 113 illustrated in FIG. 34 includes one counter 281, a memory 283, and a subtracter 287. In every counting period, the memory 283 stores the number NumA of samples having a value equal to or larger than the reference voltage Ref obtained by the counter 281, and outputs the number of samples stored in the previous counting period. Further, the subtracter 287 subtracts the newly obtained number NumA(j) of samples from the number NumA(j−1) of samples corresponding to the immediately previous counting period, which is received from the memory 283. This subtraction result is passed to the peak value storing part 217 and the comparator 218 as a number counting result.

Figure 35:
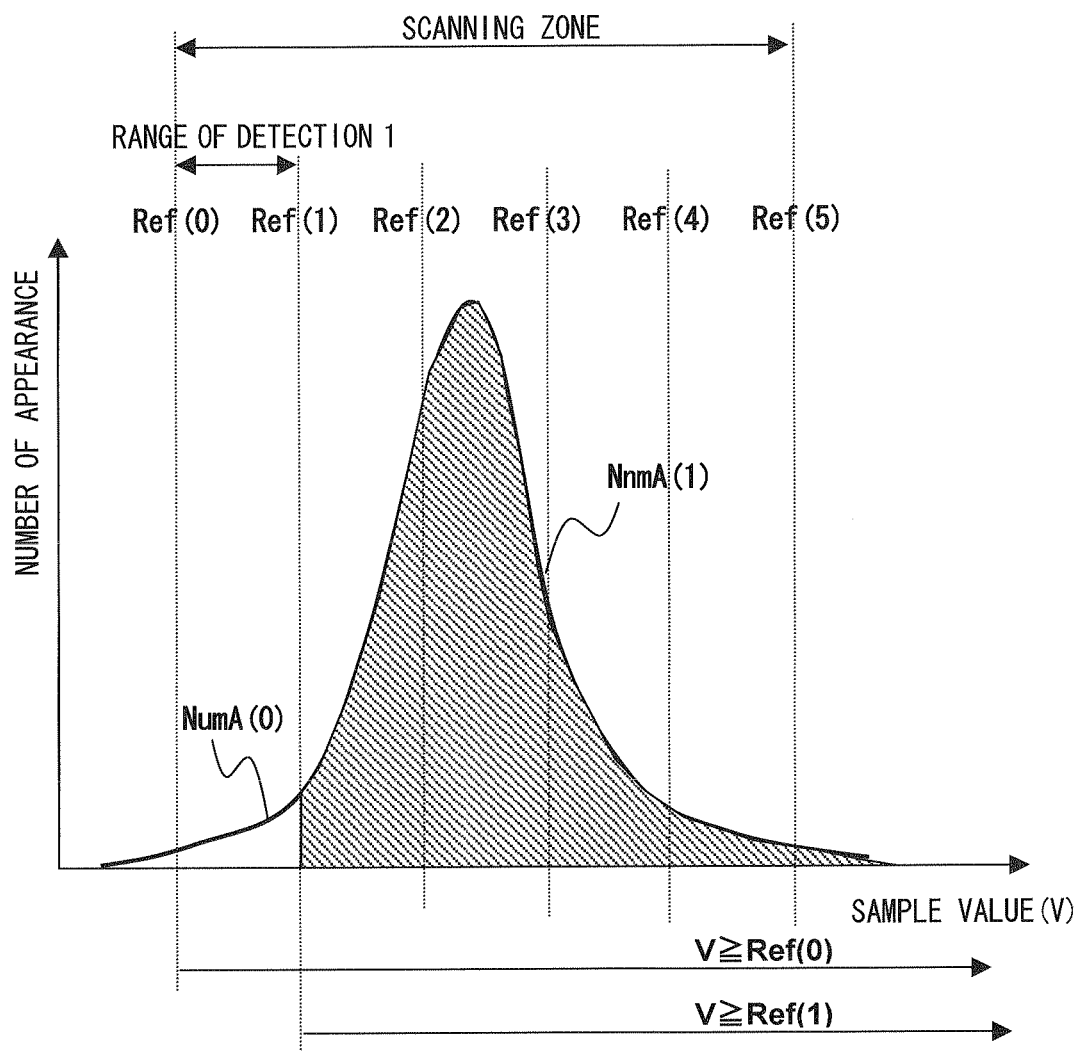
FIG. 35 is a diagram describing number counting processing.

FIG. 35 illustrates a diagram describing number counting processing. Note that among components illustrated in FIG. 35, components equivalent to those illustrated in FIG. 29 are denoted by the same symbols, and descriptions thereof are omitted.

Figure 36:
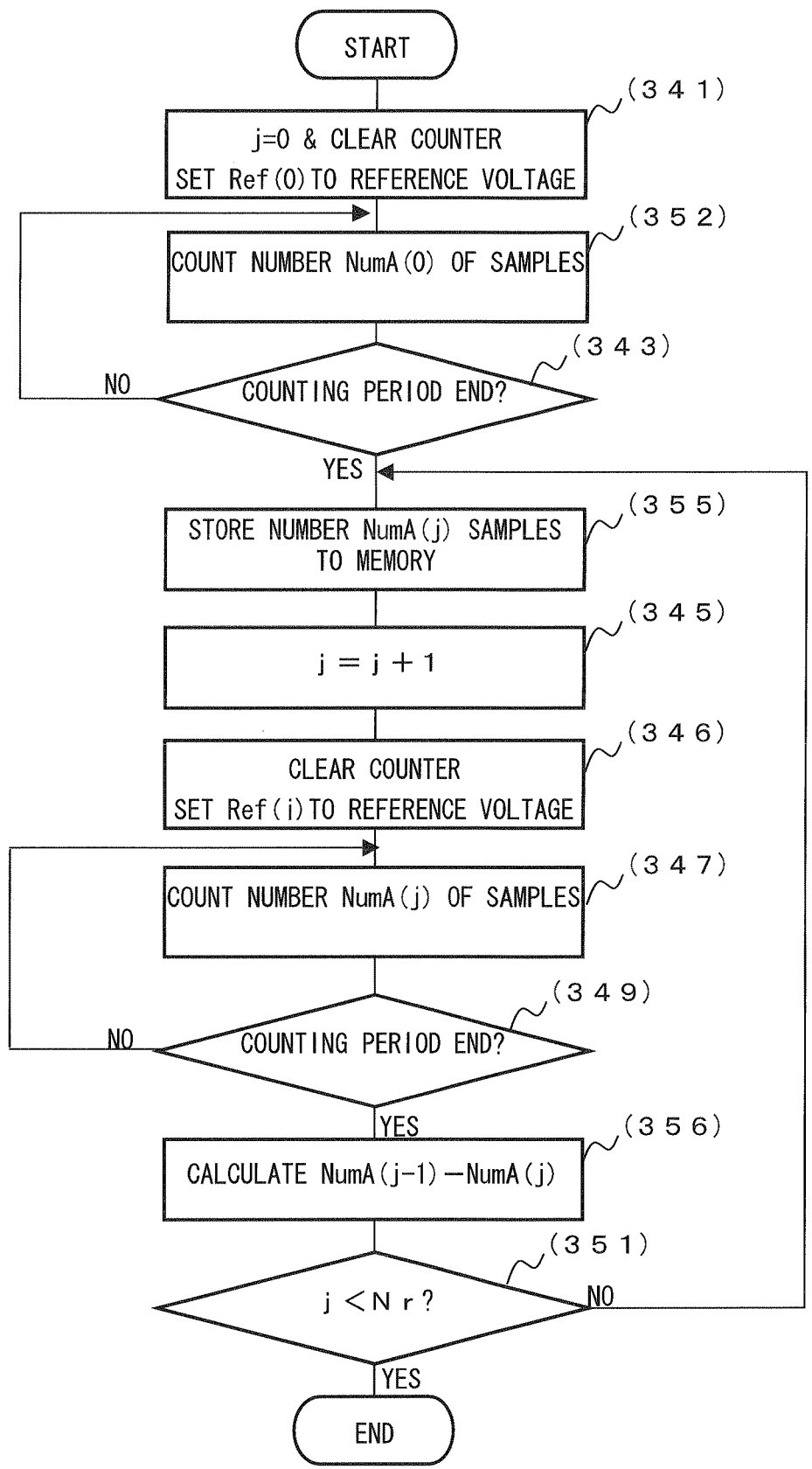
FIG. 36 is a flowchart representing operation of the number counting part.

For example, the number NumA(0) of samples which is obtained by the counter 281 when the reference voltage Ref(0) is set contains the number NumA(1) of samples which is obtained by the counter 281 when the reference voltage Ref(1) is set as indicated with hatched line in FIG. 36. Therefore, the number of samples inside the range of detection 1 can be obtained by subtracting the number NumA(1) of samples corresponding to the reference voltage Ref(1) from the number NumA(0) of samples corresponding to the reference voltage Ref(0).

FIG. 36 illustrates a flowchart representing operation of the number counting part. Note that among steps illustrated in FIG. 36, steps equivalent to those illustrated in FIG. 33 are denoted by the same numerals, and descriptions thereof are omitted.

In the flowchart illustrated in FIG. 36, in step 355 instead of step 354 illustrated in FIG. 33, the memory 283 stores the number NumA(j) of samples obtained as a counting result by the counter 281. Then, when the counting period corresponding to each of the ranges of detection 1 to Nr is finished (affirmative judgment in step 349), the subtracter 287 performs processing of step 356 instead of step 350 illustrated in FIG. 30 and FIG. 33. In step 356, the subtracter 287 subtracts the number NumA(j) of samples newly obtained as a counting result of the counter 281 from the number NumA(j−1) of samples of the previous counting period stored in the memory 283. Thus, the number counting part 113 illustrated in FIG. 34 can obtain the number of samples inside the range corresponding to the j-th range of detection between the reference voltage Ref(j−1) and the reference voltage Ref(j).

Figure 37:
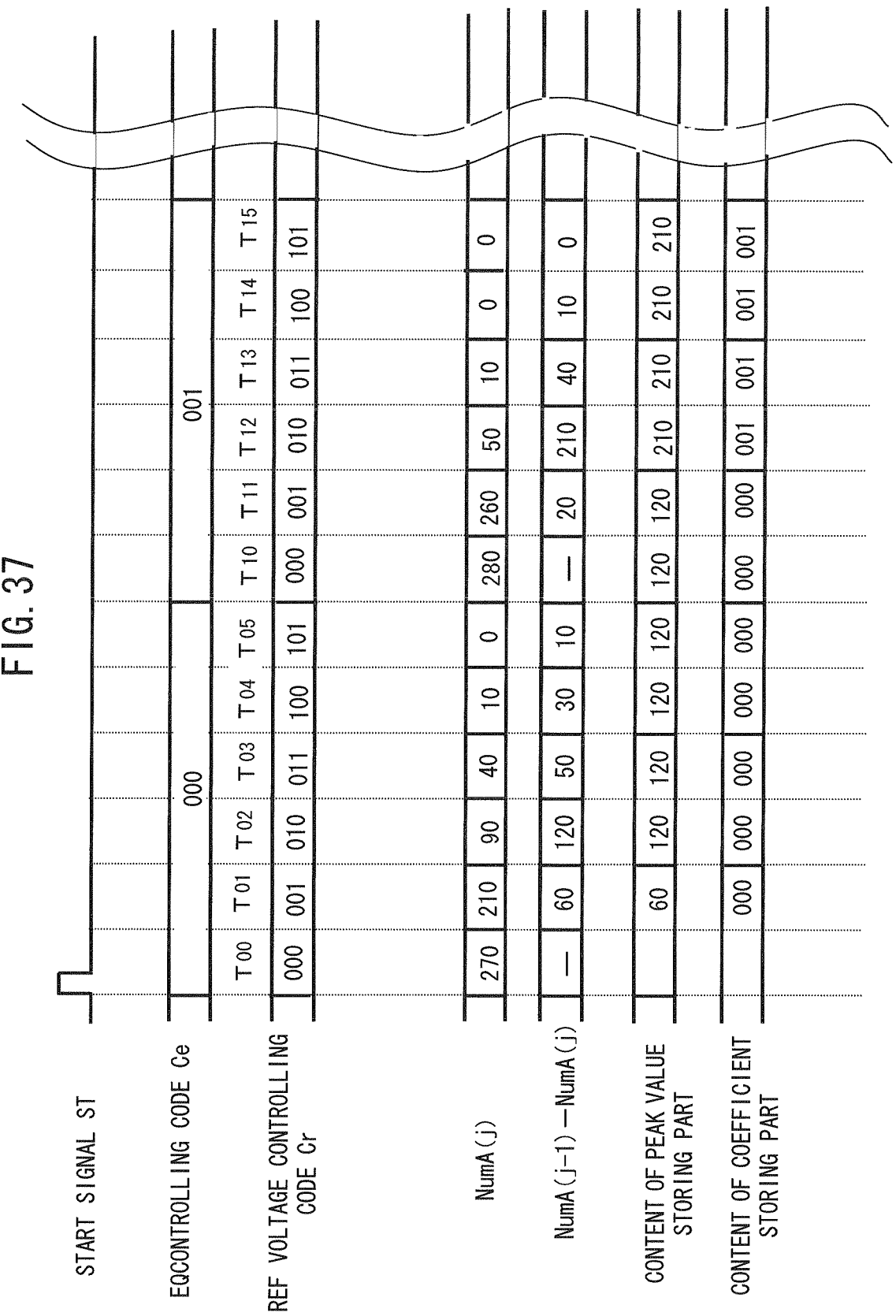
FIG. 37 is a timing chart describing number counting operation.

FIG. 37 illustrates a timing chart describing number counting operation. Here, the example of FIG. 37 illustrates how the number NumA of samples and a difference of the number NumA of samples change when number counting processing is performed by dividing the scanning zone into five ranges of detection.

As can be seen from FIG. 37, regarding each EQ controlling code Ce, the period taken for processing by the number counting part 113 illustrated in FIG. 34 to count the number of samples inside each range of detection included in the scanning zone is six times the counting period.

In the example of FIG. 37, in respective counting periods $T_{00}$ to $T_{05}$ of the period corresponding to the EQ controlling code Ce [000], the number NumA(j) of samples obtained from the counter 281 changes as "270", "21 0", "90", "40", "10", "0". Based on these counting results, the value of the number NumA(j−1)−NumA(j) of samples inside the range obtained with respect to the ranges of detection (1) to (5) corresponding to respective counting periods $T_{01}$ to $T_{05}$ changes as "60", "120", "50", "30", "10". Then, the number "120" of samples inside the range obtained corresponding to the counting period $T_{02}$ is stored in the peak value storing part 217 illustrated in FIG. 34. Further, at this time, the EQ controlling code Ce [000] is stored in the coefficient storing part 219 illustrated in FIG. 34.

Likewise, in respective counting periods $T_{10}$ to $T_{15}$ of the period corresponding to the EQ controlling code Ce [001], the number NumA(j) of samples obtained as a counting result of the counter 281 changes as "280", "260", "50", "10", "0", "0". Based on these counting results, the value of the number NumA(j−1)-NumA(j) of samples inside the range obtained with respect to the ranges of detection (1) to (5) corresponding to the respective counting periods $T_{11}$ to $T_{15}$ changes as "20", "210", "40", "10", "0". Then, the number "210" of samples inside the range obtained corresponding to the counting period $T_{12}$ is stored in the above-described peak value storing part 217. Further, at this time, the content of the above-described coefficient storing part 219 is updated using the EQ controlling code Ce [001]. Note that the number of ranges of detection included in the scanning zone is not limited to five illustrated in FIG. 37. For example, the number counting part 113 may perform the above-described number counting processing for each of ranges of detection dividing the scanning zone into more number.

Since the number counting part 113 illustrated in FIG. 34 uses one counter 281 similarly to the number counting part 113 illustrated in FIG. 32, the amount of wires for the clock signal to the counter, and so on can be reduced. Further, the subtracter 285 and the total number storing part 286 illustrated in FIG. 32 are not necessary, and thus the number counting part 113 illustrated in FIG. 34 can achieve further reduction in circuit scale. In addition, the point that the counting processing with respect to Nr number of ranges of detection included in the scanning zone can be performed by the time of the counting period T×(Nr+1) is the same as in the number counting part 113 illustrated in FIG. 28 or FIG. 32.

Next, a method for using information obtained in the course of optimizing the equalizer coefficient to be set to the equalizer 103 as described above to amplification of an input signal will be described.

Figure 38:
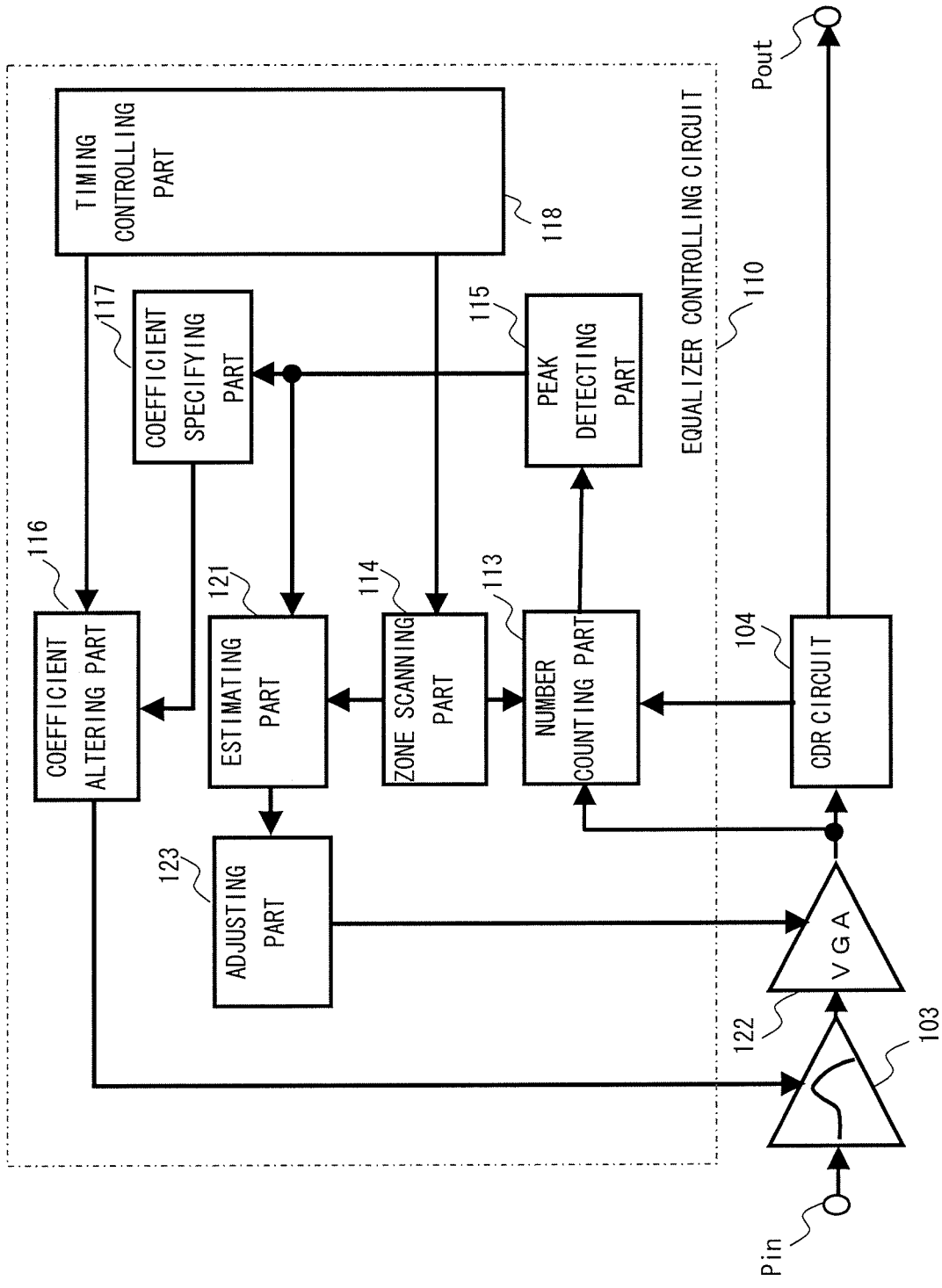
FIG. 38 is a diagram illustrating another embodiment of the receiving device.

FIG. 38 illustrates another embodiment of the receiving device. Note that among components illustrated in FIG. 38, components equivalent to those illustrated in FIG. 1 are denoted by the same symbols, and descriptions thereof are omitted.

The receiving device illustrated in FIG. 38 has a variable gain amplifier (VGA) 122 amplifying an output signal of the equalizer 103. Further, an equalizer controlling circuit 110 has an estimating part 121 and an adjusting part 123.

The estimating part 121 estimates the amplitude of an output signal of the equalizer 103 based on information indicating the range of detection in which the peak detecting part 115 detected the peak of the number of samples in the course that the coefficient specifying part 117 specifies the optimum coefficient to be set to the equalizer 103. As the information indicating the range of detection in which the peak detecting part 115 detected the peak of the number of samples, the estimating part 121 may use information used by the zone scanning part 114 for setting the range of detection.

For example, when the input signal to the receiving device is a differential signal, among the plural ranges of detection included in the scanning zone set in a range in which the voltage is positive, the range of detection in which the peak detecting part 115 detected the peak of the number of samples indicates the amplitude voltage of the output signal of the equalizer 103. Therefore, for example, the amplitude of the output signal of the equalizer 103 can be estimated based on information for the zone scanning part 114 to set the upper limit voltage and the lower limit voltage of this range of detection.

The adjusting part 123 adjusts the gain of the variable gain amplifier 122 according to the amplitude estimated by the estimating part 121. For example, when the estimated amplitude is smaller than a predetermined threshold, the adjusting part 123 may adjust the gain of the variable gain amplifier 122 so that the amplitude of the signal amplified by the variable gain amplifier 122 exceeds the above-described threshold.

Thus, in the receiving device illustrated in FIG. 38, when the amplitude of a signal input via the input terminal Pin is small, the amplitude can be amplified by applying a suitable amplification factor using the information obtained in the course of altering the coefficient of the equalizer 103. That is, in the receiving device illustrated in FIG. 38, amplitude amplification can be applied to a received signal at the same time as waveform shaping.

Therefore, in the receiving device illustrated in FIG. 38, even if the amplitude of a signal output from a transmitting device is small, or when there is attenuation due to long-distance transmission, a shaped signal having a suitable amplitude can be input to the CDR circuit 104. Accordingly, proper receiving data can be obtained even in an environment in which a weak signal is input due to the reasons described above.

Figure 39:
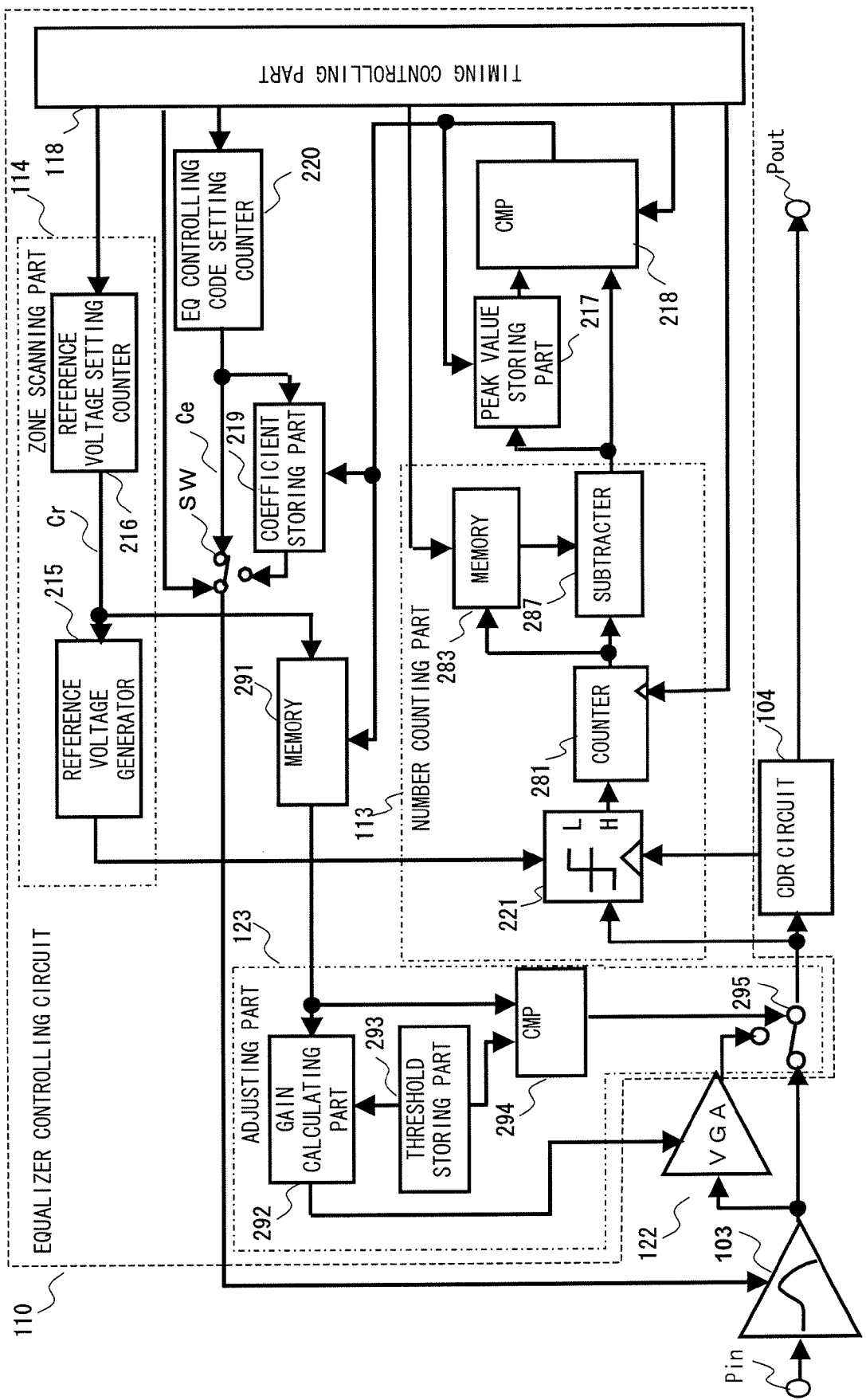
FIG. 39 is a diagram illustrating another embodiment of an equalizer controlling circuit.

FIG. 39 illustrates another embodiment of the equalizer controlling circuit. Note that among components illustrated in FIG. 39, components equivalent to those illustrated in FIG. 34 are denoted by the same symbols, and descriptions thereof are omitted.

The equalizer controlling circuit 110 illustrated in FIG. 39 includes a memory 291 and an adjusting part 123. Further, a variable gain amplifier 122 and a switch 295 are inserted between the equalizer 103 and the CDR circuit 104 illustrated in FIG. 39. This switch 295 selects one of a path transmitting the output signal of the equalizer 103 as it is and a path transmitting the output signal of the equalizer 103 via the variable gain amplifier 122.

The memory 291 stores a Ref voltage control code Cr output from the reference voltage setting counter 216 when the peak of the number of samples is detected by the comparator 218. When the input signal is a differential signal, the Ref voltage control code Cr stored thus in the memory 291 indicates the amplitude of the output signal of the equalizer 103. That is, the memory 291 is an example of the estimating part 121 illustrated in FIG. 38.

Figure 40:
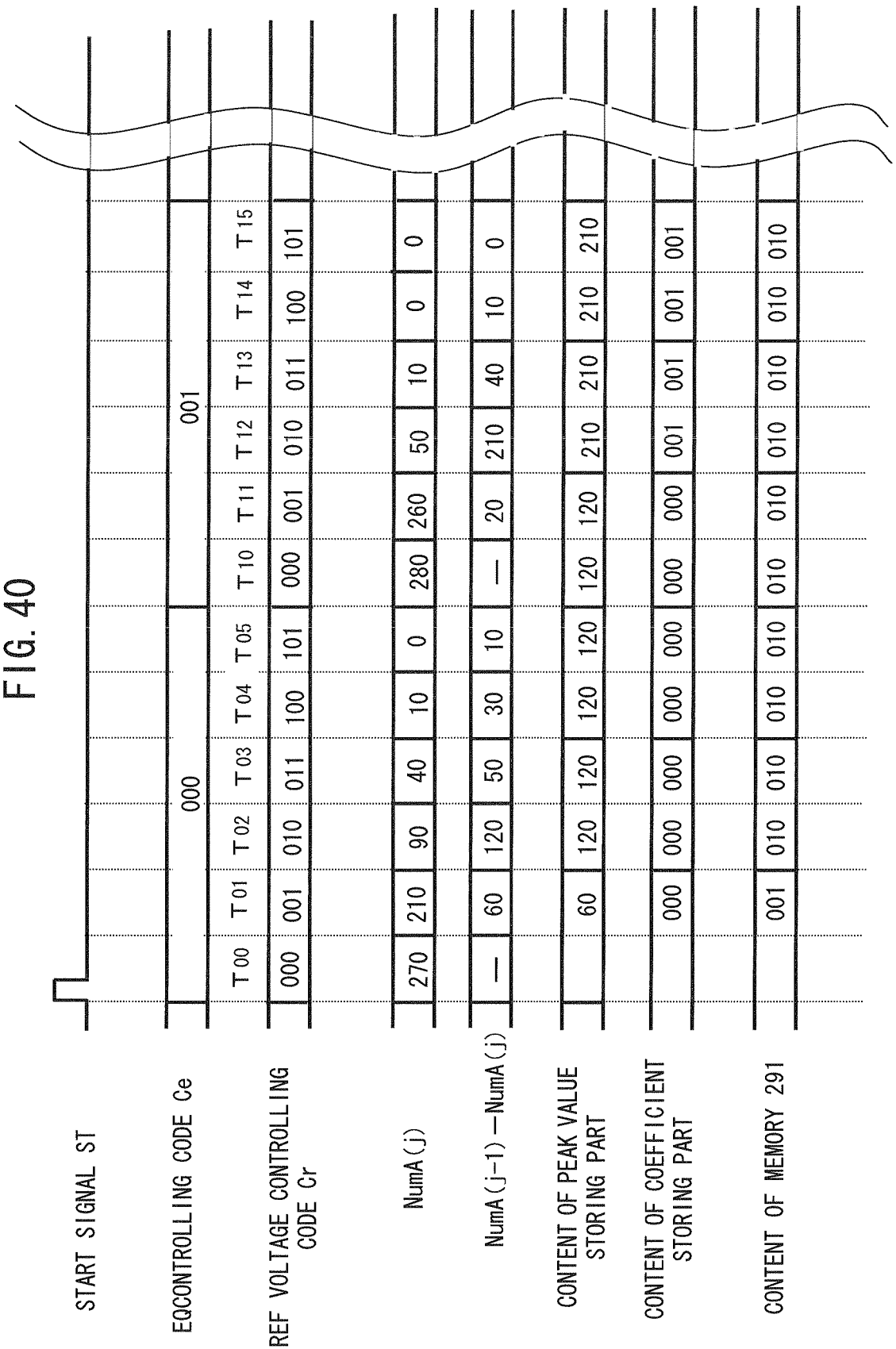
FIG. 40 is a timing chart describing amplitude estimating operation.

FIG. 40 illustrates a timing chart describing amplitude estimating operation. Here, the example of FIG. 40 illustrates how the number NumA of samples and a difference in the number NumA of samples change when number counting processing is performed by dividing the scanning zone into five ranges of detection.

In a counting period $T_{01}$ denoted by symbol $T_{01}$ in FIG. 40, the memory 291 stores a Ref voltage control code Cr [001] set at this time in response to update of the peak value storing part 217. Then, the memory 291 stores a Ref voltage control code Cr [010] in response to update of the peak value storing part 217 in a counting period $T_{02}$. Thus, by the memory 291 storing the Ref voltage control code Cr in response to update of the peak value storing part 217, the Ref voltage control code Cr indicating the range of detection in which the number of samples having a sample value inside the range of detection peaks can be obtained. In addition, in the example of FIG. 40, in response to update of the peak value storing part 217 in a counting period T12 thereafter, the memory 291 stores again the Ref voltage control code Cr [010] set in this counting period. Further, the number of ranges of detection included in the scanning zone is not limited to five illustrated in FIG. 40. For example, the above-described number counting processing may be performed for each of ranges of detection dividing the scanning zone into more number, so as to specify the amplitude of the output signal of the equalizer 103 with higher precision.

Further, the adjusting part 123 illustrated in FIG. 39 includes a gain calculating part 292, a threshold storing part 293, a comparator 294, and the above-described switch 295. The threshold storing part 293 stores, for example, information indicating a threshold level for the CDR circuit 104 to judge the logic of data. The gain calculating part 292 calculates a gain to be set to the variable gain amplifier 122 based on this threshold value and the Ref voltage control code Cr stored in the memory 291. For example, the gain calculating part 292 may calculate the gain to be set to the variable gain amplifier 122 based on a ratio to or a difference from the threshold and a reference voltage Ref indicated by the Ref voltage control code Cr. Further, the comparator 294 compares the information indicating the threshold stored in the threshold storing part 293 with the Ref controlling signal stored in the memory 291. Then, based on this comparison result, the switch 295 performs switching of the above-described two paths. For example, when a comparison result indicating that the amplitude of the output signal of the equalizer 103 indicated by the Ref controlling signal is smaller than the above-described threshold is obtained, the switch 295 may select the path to input the output signal of the equalizer 103 to the CDR circuit 104 via the variable gain amplifier 122. Conversely, when a comparison result indicating that the amplitude of the output signal of the equalizer 103 indicated by the Ref controlling signal is equal to or larger than the above-described threshold, the switch 295 may select the path to input the output signal of the equalizer 103 directly to the CDR circuit 104.

Thus, with the equalizer controlling circuit 110 illustrated in FIG. 39, by adding a small circuit, good reception performance can be achieved by applying amplitude amplification to the differential input signal at the same time as waveform shaping.

In addition, the equalizer controlling circuit 110 is not limited to the structure illustrated in FIG. 39, and may include, for example, the number counting part 113 illustrated in FIG. 28 or FIG. 32. Further, the number counting part 113 illustrated in FIG. 4, FIG. 9, or FIG. 14 may also be included in the equalizer controlling circuit 110.

Next, a method to apply amplitude amplification at the same time as waveform shaping when the input signal is a single-ended signal will be described.

FIGS. 41A and 41B illustrate a diagram describing amplitude estimation of a single-ended signal. FIG. 41A is an example of an eye diagram of an output signal of the equalizer 103 obtained in response to input of the single-ended signal.

A number distribution of results of sampling at a determination timing denoted by a symbol TD in FIG. 41A is illustrated by a solid line in FIG. 41B. Further, a number distribution of results of sampling at a boundary timing denoted by a symbol TB in FIG. 41A is illustrated by a dotted line in FIG. 41B.

As can be seen from FIG. 41B, the number distribution of sampling results at the determination timing TD has peaks in the vicinity of the upper limit and in the vicinity of the lower limit of the range of variation of signal voltage. On the other hand, the number distribution of sampling results at the boundary timing TB has a peak in the vicinity of a center corresponding to an intersection of signal waveforms, in addition to the vicinity of the upper limit and the vicinity of the lower limit of the range of variation of signal voltage. The signal amplitude of the single-ended signal is indicated by the difference between the position BP of the peak corresponding to the intersection of signal waveforms and the peak position DP corresponding to the upper limit or lower limit of the range of variation of signal voltage. In addition, the symbol DP illustrated in FIG. 41B denotes the peak position corresponding to the upper limit of the range of variation of signal voltage.

That is, when the input signal is the single-ended signal, it is preferred that peak position BP corresponding to the intersection of signal waveforms be specified in addition to the peak position DP appearing in the number distribution of sampling results at the determination timing.

Figure 42:
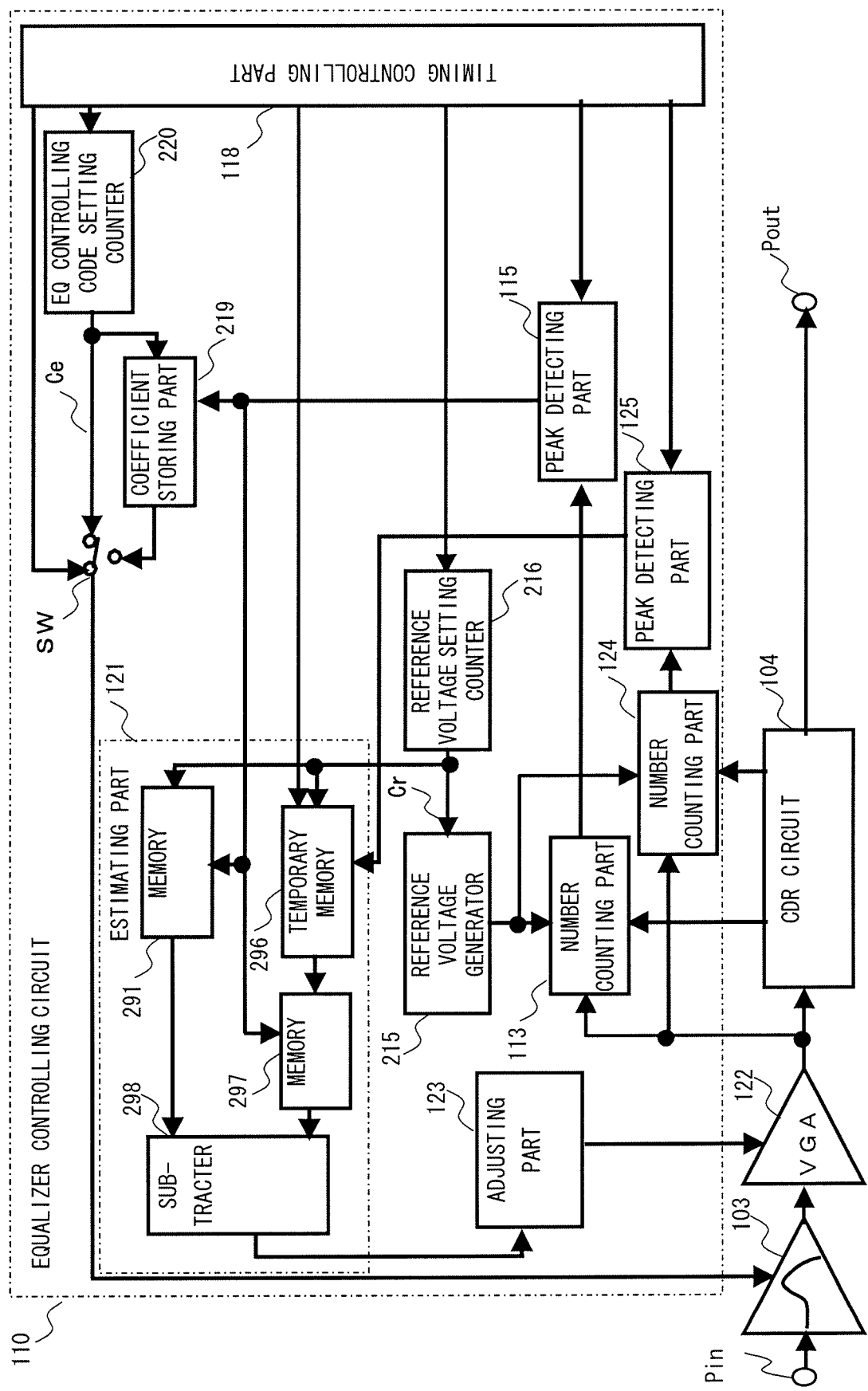
FIG. 42 is a diagram illustrating another embodiment of an estimating part.

FIG. 42 illustrates another embodiment of the estimating part. Note that among components illustrated in FIG. 42, components equivalent to those illustrated in FIG. 38 and FIG. 39 are denoted by the same symbols, and descriptions thereof are omitted.

The equalizer controlling circuit 110 illustrated in FIG. 42 includes a number counting part 124 and a peak detecting part 125. The number counting part 124 may be formed similarly to the number counting part 113 illustrated in FIG. 34. Further, the peak detecting part 125 may be formed similarly to the peak detecting part 115 illustrated in FIG. 4.

The number counting part 124 receives a clock signal indicating the boundary timing TB from the CDR circuit 104 as a timing signal used in sampling of an output signal of the equalizer 103. Then, among the sampling results performed on the output signal of the equalizer 103, the number counting part 124 counts the number of samples inside the range of detection indicated by the reference voltage Ref generated by the reference voltage generator 215.

The peak detecting part 125 receives the number of samples counted with respect to each range of detection by the number counting part 124. This peak detecting part 125 detects the peak value of the received number of samples, similarly to the peak detecting part 115.

Further, the estimating part 121 illustrated in FIG. 42 includes above described memory 291, a temporary memory 296, another memory 297, and a subtracter 298.

The memory 291 stores the Ref voltage control code Cr output from the reference voltage setting counter 216 in response to peak detection by the peak detecting part 115. Further, the temporary memory 296 stores the Ref voltage control code Cr output from the reference voltage setting counter 216 in response to peak detection by the peak detecting part 125. On the other hand, the memory 297 stores the Ref voltage control code Cr stored in the temporary memory 296 according to the condition which will be described later. In addition, the timing controlling part 118 may clear the temporary memory 296 every time the EQ controlling code Ce is updated, for example.

The Ref voltage control code Cr stored in the above-described memory 291 indicates the peak position in the number distribution of sampling results at the determination timing TD. That is, the memory 291 is an example of a first specifying part specifying a first voltage indicating the upper limit or lower limit of the range of variation with respect to the voltage of the single-ended signal. Further, the Ref voltage control code Cr stored in the memory 297 indicates a peak position in the number distribution of sampling results at the boundary timing TB.

Here, when waveform shaping is performed to a degree that the diagram as illustrated in FIGS. 41A and 41B is obtained, the highest peak in the number distribution of sampling results at the boundary timing TB appears corresponding to the intersection of signal waveforms. Therefore, by storing the Ref voltage control code Cr stored in the temporary memory 296 in the memory 297 when the optimum EQ coefficient Ep is updated, the peak position corresponding to the intersection of signal waveforms can be obtained. The temporary memory 296 and the memory 297 which operate in this manner are an example of the second specifying part specifying a second voltage indicating an intersection of single-ended signal waveforms. In addition, in the description below, the position indicated by the Ref voltage control code Cr stored in the temporary memory 296 is referred to as a temporary B-peak position with respect to the number distribution of sampling results at the boundary timing.

Further, the subtracter 298 calculates the amplitude of the output signal of the equalizer 103 by performing, for example, subtraction processing with respect to the respective Ref voltage control codes stored in the memory 291 and the memory 297. That is, the subtracter 298 is an example of a calculating part calculating the amplitude of the output signal of the equalizer 103. The adjusting part 123 illustrated in FIG. 42 adjusts an amplification factor of the variable gain amplifier 122 based on the amplitude indicated by a subtraction result obtained by this subtracter 298.

Figure 43:
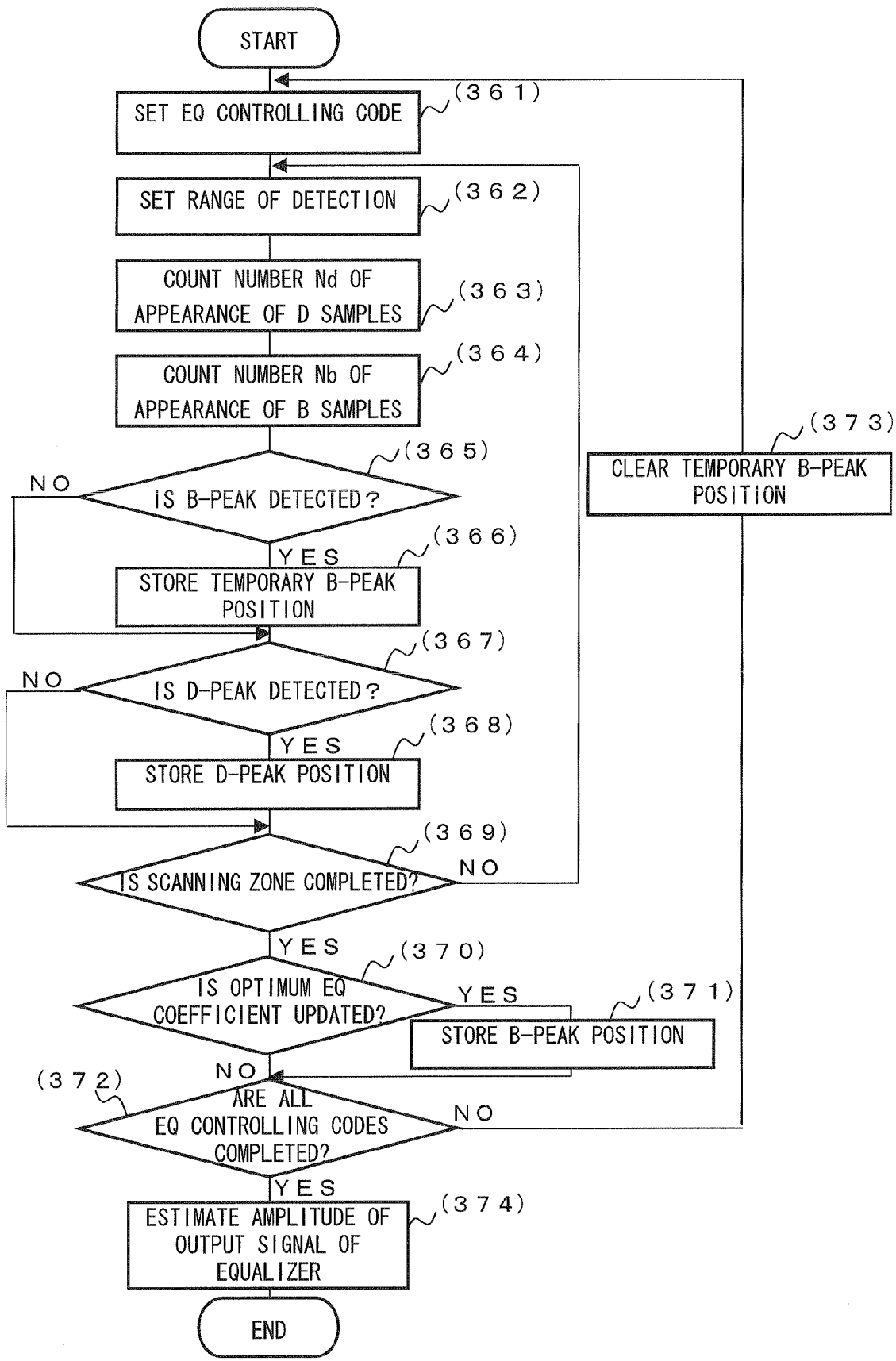
FIG. 43 is a flowchart representing the amplitude estimating operation.
Figure 45:
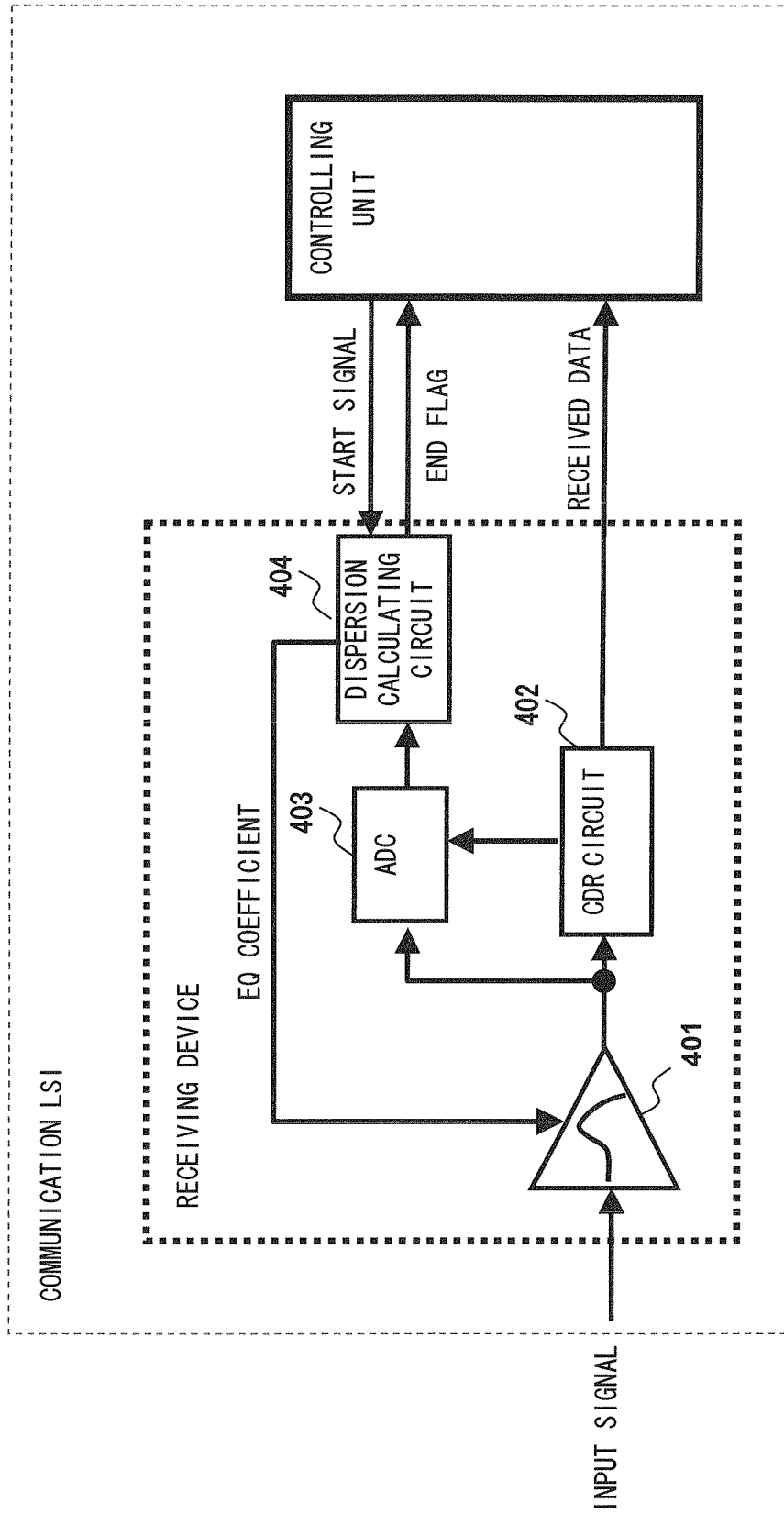
FIG. 45 illustrates a structural example of a conventional receiving device having an adaptive equalizer.
Figure 46:
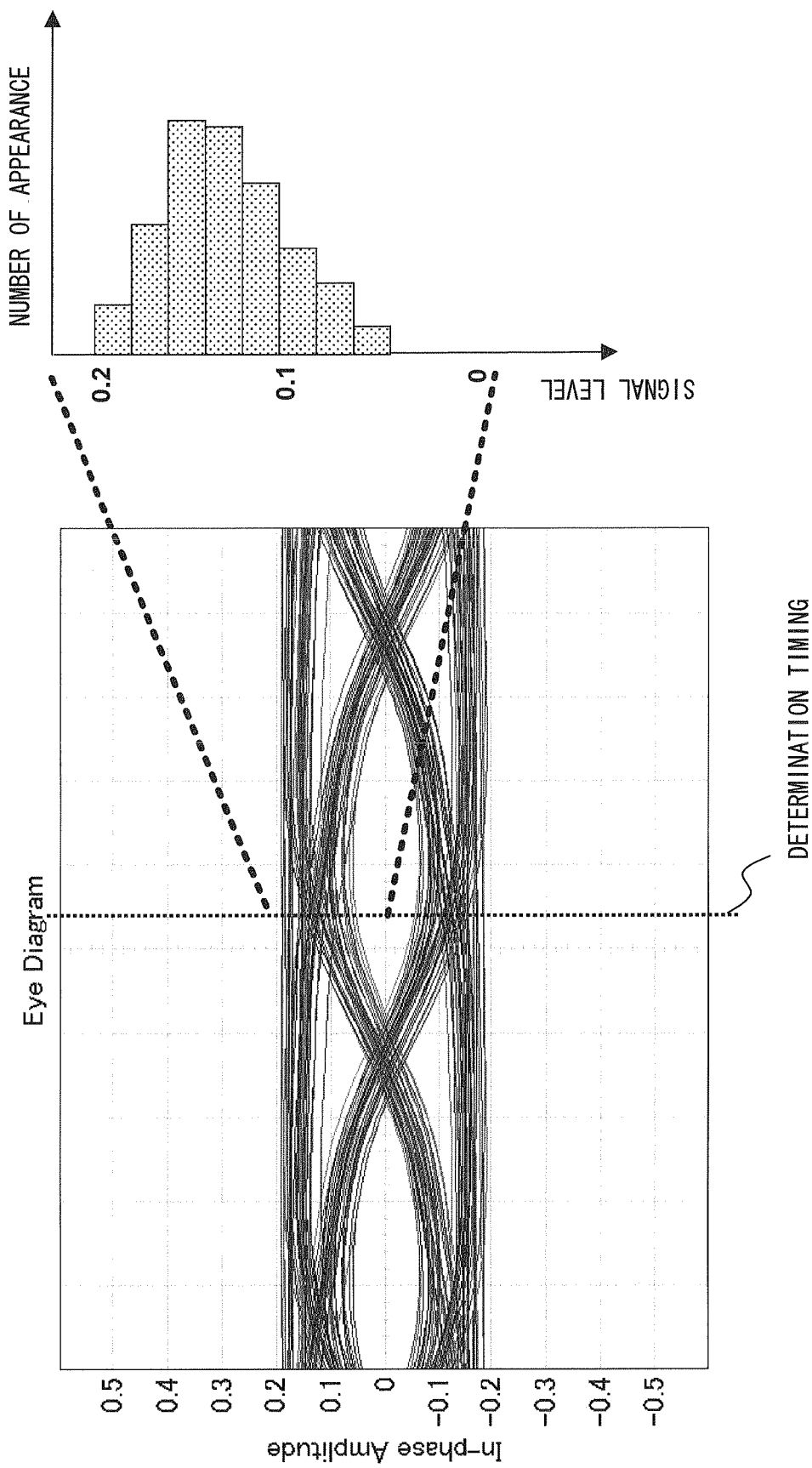
FIG. 46 illustrates a diagram describing altering processing in a conventional adaptive equalizer.

FIG. 43 illustrates a flowchart representing the amplitude estimating operation. Note that processing from step 361 to step 371 illustrated in FIG. 43 may be executed in parallel to, for example, the adaptive controlling operation illustrated in FIG. 7.

First, the timing controlling part 118 sequentially sets the EQ controlling code indicating EQ coefficient as an evaluation target to the equalizer 103 via the EQ controlling code setting counter 220 (step 361). Next, the timing controlling part 118 sequentially sets a range of detection included in the scanning zone to the number counting parts 113, 124 via the reference voltage setting counter 216 and the reference voltage generator 215 (step 362).

Thereafter, the number counting part 113 counts the number Nd of appearances of a data sample value (D sample value) included in the range of detection by sampling at the determination timing for a predetermined counting period T (step 363). Further, the number counting part 124 counts the number Nb of appearances of the boundary sample value (B sample value) included in the range of detection by sampling at the boundary timing for the counting period T (step 364).

Based on a change in the number Nb of appearances obtained by the number counting part 124, the peak detecting part 125 detects a peak (B-peak) of the number distribution of sampling results at the boundary timing. When the B-peak is detected by the peak detecting part 125 (affirmative judgment in step 365), the temporary memory 296 stores the Ref voltage control code Cr corresponding to this range of detection as information indicating the temporary B-peak position (step 366). On the other hand, when the B-peak is not detected (negative judgment in step 365), step 366 is skipped.

Next, based on a change in the number Nd of appearances obtained by the number counting part 113, the peak detecting part 114 detects a peak (D-peak) of the number distribution of sampling results at the determination timing. When the D-peak is detected by the peak detecting part 114 (affirmative judgment in step 367), the memory 291 stores the Ref voltage control code Cr corresponding to this range of detection as information indicating a D-peak position (step 368). On the other hand, when the D-peak is not detected (negative judgment in step 367), step 368 is skipped.

Thereafter, the timing controlling part 118 judges whether the counting processing with respect to all the ranges of detection included in the scanning zone is completed or not (step 369). When there is any range of detection for which the counting processing is not performed (negative judgment in step 369), the timing controlling part 118 returns to processing of step 362. Then, the timing controlling part 118 sets a new range of detection, and starts number counting processing with respect to this range of detection.

Thus, the timing controlling part 118 performs control to repeatedly execute processing of step 362 to step 369 with respect to each range of detection included in the scanning zone. Then, when the counting processing for all the ranges of detection is completed (affirmative judgment in step 369), the memory 297 judges whether the optimum EQ coefficient Ep is updated or not in the course of the above-described processing (step 370). Only when the optimum EQ coefficient Ep is updated, the memory 297 stores the Ref voltage control code Cr stored in the temporary memory 296 as information indicating the B-peak position (step 371). Thereafter, the timing controlling part 118 judges whether the evaluation processing for all the EQ coefficients is completed or not (step 372).

When there is any unvalued EQ coefficient (negative judgment in step 372), the timing controlling part 118 returns to the processing of step 361, and clears the information indicating the temporary B-peak position stored in the temporary memory 296 (step 373). In addition, in this step 373, the timing controlling part 118 may clear the peak value detected in the peak detecting part 125. Then, a new EQ controlling code Ce is set, and the evaluation processing for a new EQ coefficient indicated by this EQ controlling code Ce is started.

Thus, the timing controlling part 118 performs control to repeatedly execute the processing of step 361 to step 373 for each EQ coefficient. Then, when the evaluation processing for all the EQ coefficients is completed, the subtracter 298 estimates the amplitude of the output signal of the equalizer 103 based on the subtraction result with respect to the Ref voltage control codes stored in the memory 291 and the memory 297, respectively (step 374).

In this manner, by the equalizer controlling circuit 110 illustrated in FIG. 42, the amplitude of the output signal of the equalizer 103 obtained in response to input of the single-ended signal can be estimated in parallel to the processing of optimizing the EQ coefficient.

FIG. 44 illustrates a timing chart describing the amplitude estimating operation. Note that the example of FIG. 44 illustrates changes in counting results with respect to amplitude estimating processing when number counting processing is performed by dividing the scanning zone into five ranges of detection.

Based on the number Nb of appearances of B samples illustrated in FIG. 44, the peak detecting part 125 initially detects the first peak in a counting period $T_{01}$. Accordingly, the Ref voltage control code Cr [001] corresponding to this range of detection is stored as the temporary B-peak position in the temporary memory 296. Thereafter, when a new peak is detected by the peak detecting part 125 in a counting period $T_{03}$, information indicating the temporary B-peak position in the temporary memory 296 is updated as a Ref voltage control code Cr [011].

On the other hand, based on the number Nd of appearances of D samples, the Ref voltage control code Cr [001] indicating the D-peak position corresponding to the peak detected by the peak detecting part 115 in the counting period $T_{01}$ is maintained for the period in which the EQ controlling code Ce [000] is set. In addition, in response to the peak detection in the counting period $T_{01}$, the coefficient storing part 219 stores the above-described EQ controlling code Ce [000] to thereby update the optimum EQ coefficient Ep. Accordingly, in the end of the period in which this EQ controlling code Ce [000] is set, the memory 297 stores, as information indicating the B-peak position, the Ref voltage control code Cr [011] stored as the temporary B-peak position in the temporary memory 296.

Thereafter, based on the number Nb of appearances of B samples, the peak detecting part 125 detects the peak of the number distribution in the counting periods $T_{11}$, $T_{13}$ illustrated in FIG. 44. In response to the peak detection, the information indicating the temporary B-peak position in the temporary memory 296 is updated by the Ref voltage control codes [001], [011] corresponding to the respective ranges of detection. Then, in the end of the period in which the EQ controlling code Ce [001] is set, the memory 297 stores, as information indicating the B-peak position, the Ref voltage control code Cr [011] stored as the temporary B-peak position in the temporary memory 296.

On the other hand, no clear peak appears in the number distribution indicated by the number Nd of appearances of D samples in counting periods $T_{71}$ to $T_{75}$ illustrated in FIG. 44. In this case, the peak detecting part 115 does not detect a peak having a peak value larger than the peak value up to this point, and thus the coefficient storing part 219 maintains the optimum EQ coefficient Ep stored in the course of processing up to this point as it is. Therefore, the information indicating the B-peak position in the memory 297 would not be updated in the end of the period in which the EQ controlling code Ce [111] is set, which is illustrated in FIG. 44. Therefore, even when the peak detecting part 125 detects a peak of the number distribution in a counting period $T_{72}$ based on the number Nb of appearances of B samples, the Ref voltage control code Cr stored in the temporary memory 296 would not be reflected on the memory 297 in response to this.

In addition, the number of ranges of detection included in the scanning zone is not limited to five illustrated in FIG. 44. For example, the above-described number counting processing may be performed for each of ranges of detection dividing the scanning zone into more number, so as to specify the amplitude of the output signal of the equalizer 103 with higher precision.

Further, the receiving device includes comparators $241_{B0}$, $241_{B1}$ performing sampling operation at the boundary timing as illustrated in FIG. 19. Therefore, these comparators $241_{B0}$, $241_{B1}$ may be used to form the number counting part 124.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiving device comprising:
   an equalizer circuit shaping a waveform of an input signal according to an equalizer coefficient;
   a Clock Data Recovery circuit recovering, from the input signal being shaped by the equalizer circuit, received data represented by the input signal and a clock signal which indicates a timing of the received data;
   a number counting part counting a number of times a voltage value included in a range of detection is obtained by sampling the input signal after being shaped by the equalizer circuit at the timing of the received data, the range of detection having a predetermined width;
   a zone scanning part scanning the range of detection in a scanning zone to make the number counting part count, in a time-division manner, a number of times of obtaining each voltage value included in the scanning zone by sampling the shaped input signal, the scanning zone being a predetermined range including a variation range of a voltage value of the input signal;
   a coefficient altering part altering the equalizer coefficient of the equalizer circuit;
   a peak detecting part detecting a maximum value of a counting result as a peak value for each equalizer coefficient being altered by the coefficient altering part, the counting result being obtained by the number counting part in a process where the range of detection is scanned; and
   a coefficient specifying part specifying, as a first coefficient, the equalizer coefficient, which is set to the equalizer circuit when the peak value is detected by the peak detecting part, wherein
   the zone scanning part scans the range of detection by changing, in every predetermined counting period and by a voltage corresponding to a width of the range of detection, a reference voltage indicating an upper limit of the range of detection; and
   the number counting part includes:
      a comparator comparing the reference voltage with the voltage value obtained by the sampling of the input signal;
      an upper counter counting a number of the voltage value obtained by the sampling being judged to be equal to or larger than the reference voltage by the comparator;
      a lower counter counting a number of the voltage value obtained by the sampling being judged to be smaller than the reference voltage by the comparator;
      a memory storing a counting result of the lower counter every time the counting period passes and outputting a counting result obtained by the lower counter in a last counting period; and
      an adder calculating a sum of a counting result obtained by the upper counter for a current counting period and the counting result obtained by the lower counter in the last counting period output from the memory as a number of times a voltage value distributed outside the range of detection corresponding to the current counting period is obtained by the sampling.

2. A receiving device comprising:
   an equalizer circuit shaping a waveform of an input signal according to an equalizer coefficient;
   a Clock Data Recovery circuit recovering, from the input signal being shaped by the equalizer circuit, received data represented by the input signal and a clock signal which indicates a timing of the received data;
   a number counting part counting a number of times a voltage value included in a range of detection is obtained by sampling the input signal after being shaped by the equalizer circuit at the timing of the received data, the range of detection having a predetermined width;
   a zone scanning part scanning the range of detection in a scanning zone to make the number counting part count, in a time-division manner, a number of times of obtaining each voltage value included in the scanning zone by sampling the shaped input signal, the scanning zone being a predetermined range including a variation range of a voltage value of the input signal;

a coefficient altering part altering the equalizer coefficient of the equalizer circuit;

a peak detecting part detecting a maximum value of a counting result as a peak value for each equalizer coefficient being altered by the coefficient altering part, the counting result being obtained by the number counting part in a process where the range of detection is scanned; and a coefficient specifying part specifying, as a first coefficient, the equalizer coefficient, which is set to the equalizer circuit when the peak value is detected by the peak detecting part, wherein the zone scanning part scans the range of detection by changing, in every predetermined counting period and by a voltage corresponding to a width of the range of detection, a reference voltage indicating an upper limit of the range of detection; and the number counting part includes:

a comparator comparing the reference voltage with the voltage value obtained by the sampling of the input signal;

an upper counter counting a number of the voltage value obtained by the sampling being judged to be larger than the reference voltage by the comparator;

a subtracter calculating, every time the counting period passes, a difference between a total number of samples obtained by sampling in the counting period and a counting result of the upper counter;

a memory storing a subtraction result obtained by the subtracter every time the counting period passes and outputting a subtraction result obtained by the subtracter in a last counting period; and an adder calculating a sum of a counting result obtained by the upper counter for a current counting period and the subtraction result obtained by the subtracter in the last counting period output from the memory as a number of times a voltage value distributed outside the range of detection corresponding to the current counting period is obtained by the sampling.

3. A receiving device comprising:

an equalizer circuit shaping a waveform of an input signal according to an equalizer coefficient;

a Clock Data Recovery circuit recovering, from the input signal being shaped by the equalizer circuit, received data represented by the input signal and a clock signal which indicates a timing of the received data;

a number counting part counting a number of times a voltage value included in a range of detection is obtained by sampling the input signal after being shaped by the equalizer circuit at the timing of the received data, the range of detection having a predetermined width;

a zone scanning part scanning the range of detection in a scanning zone to make the number counting part count, in a time-division manner, a number of times of obtaining each voltage value included in the scanning zone by sampling the shaped input signal, the scanning zone being a predetermined range including a variation range of a voltage value of the input signal;

a coefficient altering part altering the equalizer coefficient of the equalizer circuit;

a peak detecting part detecting a maximum value of a counting result as a peak value for each equalizer coefficient being altered by the coefficient altering part, the counting result being obtained by the number counting part in a process where the range of detection is scanned; and a coefficient specifying part specifying, as a first coefficient, the equalizer coefficient, which is set to the equalizer circuit when the peak value is detected by the peak detecting part, wherein the zone scanning part scans the range of detection by changing, in every predetermined counting period and by a voltage corresponding to a width of the range of detection, a reference voltage indicating an upper limit of the range of detection; and the number counting part includes:

a comparator comparing the reference voltage with the voltage value obtained by the sampling of the input signal;

an upper counter counting a number of the voltage value obtained by the sampling being judged to be larger than the reference voltage by the comparator;

a memory storing a counting result of the upper counter every time the counting period passes and outputting a counting result obtained by the upper counter in a last counting period; and a subtracter calculating a difference between a counting result obtained by the upper counter for a current counting period and the counting result obtained by the upper counter in the last counting period output from the memory as a number of times a voltage value inside the range of detection corresponding to the current counting period is obtained by the sampling.

4. A receiving device comprising:

an equalizer circuit shaping a waveform of an input signal according to an equalizer coefficient;

a Clock Data Recovery circuit recovering, from the input signal being shaped by the equalizer circuit, received data represented by the input signal and a clock signal which indicates a timing of the received data;

a number counting part counting a number of times a voltage value included in a range of detection is obtained by sampling the input signal after being shaped by the equalizer circuit at the timing of the received data, the range of detection having a predetermined width;

a zone scanning part scanning the range of detection in a scanning zone to make the number counting part count, in a time-division manner, a number of times of obtaining each voltage value included in the scanning zone by sampling the shaped input signal, the scanning zone being a predetermined range including a variation range of a voltage value of the input signal a coefficient altering part altering the equalizer coefficient of the equalizer circuit;

a peak detecting part detecting a maximum value of a counting result as a peak value for each equalizer coefficient being altered by the coefficient altering part, the counting result being obtained by the number counting part in a process where the range of detection is scanned;

a coefficient specifying part specifying, as a first coefficient, the equalizer coefficient, which is set to the equalizer circuit when the peak value is detected by the peak detecting part;

an estimating part estimating, in a course of specifying the first coefficient by the coefficient specifying part, an amplitude of an output signal of the equalizer based on information indicating the range of detection where the peak value is detected by the peak detecting part;

a variable gain amplifier amplifying the output signal of the equalizer; and an adjusting part adjusting a gain of the variable gain amplifier based on the amplitude of the output signal of the equalizer being estimated by the estimating part.

5. The receiving device according to claim 4, wherein
when the input signal is a differential signal, the estimating part sets an absolute value of a value as the estimated value of the amplitude of the output signal of the equalizer, in which the value indicates a voltage of an upper limit or a lower limit of the range of detection where the peak value is detected by the peak detecting part.

6. The receiving device according to claim 4, wherein
when the input signal is a single-ended signal, the estimating part includes:
- a first specifying part specifying a first voltage corresponding to the range of detection where the peak value is detected in a counting result which is obtained by the number counting part counting the number of times the voltage value included in the range of detection and obtained by sampling the output signal of the equalizer at the timing of the received data;
- a second specifying part specifying a second voltage corresponding to the range of detection where the peak value is detected in a counting result which is obtained by the number counting part counting the number of times the voltage value included in the range of detection and obtained by sampling the output signal of the equalizer at a timing which is different from the timing of the received data; and
- a calculating part calculating an estimated value of the amplitude of the output signal of the equalizer based on a difference between the first voltage and the second voltage.

7. The receiving device according to claim 4, wherein
the adjusting part includes an introducing part inputting the output signal of the equalizer to the variable gain amplifier when an estimated value of the amplitude of the output signal of the equalizer is smaller than a predetermined threshold, and adjusts the gain of the variable gain amplifier in order for an amplitude of an output signal of the variable gain amplifier to be larger than the predetermined threshold.

* * * * *